(12) United States Patent
Tanikella et al.

(10) Patent No.: US 12,509,402 B2
(45) Date of Patent: Dec. 30, 2025

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Brahmanandam V. Tanikella, Northborough, MA (US); Charles J. Gasdaska, Shrewsbury, MA (US); Michael J. Lemberger, Dudley, MA (US)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

(*) Notice: Subject to any disclaimer, the term of this patent is extended or adjusted under 35 U.S.C. 154(b) by 535 days.

(21) Appl. No.: 17/687,606

(22) Filed: Mar. 5, 2022

(65) Prior Publication Data

US 2022/0332651 A1    Oct. 20, 2022

Related U.S. Application Data

(60) Provisional application No. 63/266,284, filed on Dec. 30, 2021, provisional application No. 63/157,236, filed on Mar. 5, 2021.

(51) Int. Cl.
*B33Y 70/00*     (2020.01)
*B28B 1/00*      (2006.01)
(Continued)

(52) U.S. Cl.
CPC ............ *C04B 35/583* (2013.01); *B28B 1/001* (2013.01); *B28B 17/026* (2013.01); *B33Y 30/00* (2014.12);
(Continued)

(58) Field of Classification Search
CPC ............ C04B 35/583; C04B 35/62605; C04B 2235/36; C04B 2235/386;
(Continued)

(56) References Cited

U.S. PATENT DOCUMENTS

| | | |
|---|---|---|
| 985,116 A | 2/1911 | Nichols |
| 2,242,877 A | 5/1941 | Albertson |

(Continued)

FOREIGN PATENT DOCUMENTS

| | | |
|---|---|---|
| AU | 613584 B2 | 8/1991 |
| CN | 1147783 A | 4/1997 |

(Continued)

OTHER PUBLICATIONS

Jimenez et al. Parametric analysis to quantify process input influence on the printed densities of binder jetted alumina ceramics. Additive Manufacturing. 30, 100864. (Year: 2019).*

(Continued)

*Primary Examiner* — Amber R Orlando
*Assistant Examiner* — Anastasia A. Kuvayskaya
(74) *Attorney, Agent, or Firm* — Abel Schillinger, LLP; Arpan Ghosh

(57) ABSTRACT

A method for forming an abrasive article via an additive manufacturing technique including forming a layer of powder material comprising a precursor bond material and abrasive particles, compacting at least a portion of the layer to form a compacted layer, binding at least a portion of the compacted layer and repeating the steps of forming, compacting and binding to form a green body abrasive article.

20 Claims, 19 Drawing Sheets

(51) Int. Cl.
*B28B 17/02* (2006.01)
*B33Y 30/00* (2015.01)
*B33Y 40/10* (2020.01)
*B33Y 70/10* (2020.01)
*B33Y 80/00* (2015.01)
*C04B 35/583* (2006.01)
*C04B 35/626* (2006.01)

(52) U.S. Cl.
CPC .............. *B33Y 40/10* (2020.01); *B33Y 70/00* (2014.12); *B33Y 70/10* (2020.01); *B33Y 80/00* (2014.12); *C04B 35/62605* (2013.01); *C04B 2235/36* (2013.01); *C04B 2235/386* (2013.01); *C04B 2235/6026* (2013.01); *C04B 2235/77* (2013.01); *C04B 2235/94* (2013.01)

(58) Field of Classification Search
CPC ........ C04B 2235/6026; C04B 2235/77; C04B 2235/94; B28B 1/001; B28B 17/026; B33Y 30/00; B33Y 40/10; B33Y 70/00; B33Y 80/00; B24D 3/10; B24D 3/28; B24D 18/0009
See application file for complete search history.

(56) References Cited

U.S. PATENT DOCUMENTS

| | | |
|---|---|---|
| RE22,457 E | 3/1944 | Jeppson et al. |
| 2,367,404 A | 1/1945 | Kott |
| 3,023,551 A | 3/1962 | Osenberg |
| 3,123,948 A | 3/1964 | Kistler et al. |
| 3,144,739 A | 8/1964 | Brutvan et al. |
| 3,146,560 A | 9/1964 | Edward |
| 3,258,817 A | 7/1966 | Smiley |
| 3,477,180 A | 11/1969 | Robertson |
| 3,594,141 A | 7/1971 | Houston et al. |
| 3,609,925 A | 10/1971 | Comella-Riera |
| 3,650,714 A | 3/1972 | Farkas |
| 3,871,840 A | 3/1975 | Wilder et al. |
| 4,128,971 A | 12/1978 | Dunnington et al. |
| 4,164,098 A | 8/1979 | Akita |
| 4,211,294 A | 7/1980 | Multakh |
| 4,274,769 A | 6/1981 | Multakh |
| 4,314,827 A | 2/1982 | Leitheiser et al. |
| 4,369,046 A | 1/1983 | Bruschek et al. |
| 4,483,108 A | 11/1984 | Howard |
| 4,552,231 A | 11/1985 | Pay et al. |
| 4,574,003 A | 3/1986 | Gerk |
| 4,623,364 A | 11/1986 | Cottringer et al. |
| 4,661,126 A | 4/1987 | Inagami et al. |
| 4,744,802 A | 5/1988 | Schwabel |
| 4,770,671 A | 9/1988 | Monroe et al. |
| 4,881,951 A | 11/1989 | Wood et al. |
| 4,918,872 A | 4/1990 | Sato et al. |
| 4,923,512 A | 5/1990 | Timm et al. |
| 4,960,441 A | 10/1990 | Pellow et al. |
| 5,011,508 A | 4/1991 | Wald et al. |
| 5,067,969 A | 11/1991 | Matsuda |
| 5,090,968 A | 2/1992 | Pellow |
| 5,092,920 A | 3/1992 | Nakai et al. |
| 5,123,217 A | 6/1992 | Ishikawa et al. |
| 5,139,978 A | 8/1992 | Wood |
| 5,178,644 A | 1/1993 | Huzinec |
| 5,178,849 A | 1/1993 | Bauer |
| 5,201,916 A | 4/1993 | Berg et al. |
| 5,204,055 A | 4/1993 | Sachs et al. |
| 5,227,104 A | 7/1993 | Bauer |
| 5,252,264 A | 10/1993 | Forderhase et al. |
| 5,282,875 A | 2/1994 | Wood et al. |
| 5,354,155 A | 10/1994 | Adams |
| 5,366,523 A | 11/1994 | Rowenhorst et al. |
| 5,387,380 A | 2/1995 | Cima et al. |
| 5,429,647 A | 7/1995 | Larmie |
| 5,441,710 A | 8/1995 | Marois |
| 5,449,388 A | 9/1995 | Wiand |
| 5,490,882 A | 2/1996 | Sachs et al. |
| 5,498,269 A | 3/1996 | Larmie |
| 5,518,443 A | 5/1996 | Fisher |
| 5,547,479 A | 8/1996 | Conwell et al. |
| 5,551,963 A | 9/1996 | Larmie |
| 5,611,724 A | 3/1997 | Degraaff |
| 5,618,762 A | 4/1997 | Shirakawa et al. |
| 5,660,621 A | 8/1997 | Bredt |
| 5,725,162 A | 3/1998 | Garg et al. |
| 5,766,277 A | 6/1998 | DeVoe et al. |
| 5,776,214 A | 7/1998 | Wood |
| 5,868,125 A | 2/1999 | Maoujoud |
| 5,874,050 A | 2/1999 | Matias |
| 5,891,206 A | 4/1999 | Ellingson |
| 5,900,207 A | 5/1999 | Danforth et al. |
| 5,942,015 A | 8/1999 | Culler et al. |
| 5,976,205 A | 11/1999 | Andrews et al. |
| 5,996,571 A | 12/1999 | Jedick |
| 6,086,648 A | 7/2000 | Rossetti et al. |
| 6,123,744 A | 9/2000 | Huzinec |
| 6,146,567 A | 11/2000 | Sachs et al. |
| 6,192,875 B1 | 2/2001 | Koroku et al. |
| 6,209,420 B1 | 4/2001 | Butcher et al. |
| 6,354,362 B1 | 3/2002 | Smith et al. |
| 6,376,590 B2 | 4/2002 | Kolb et al. |
| 6,403,002 B1 | 6/2002 | van der Geest |
| 6,413,286 B1 | 7/2002 | Swei et al. |
| 6,416,560 B1 | 7/2002 | Palmgren |
| 6,511,265 B1 | 1/2003 | Mirchandani et al. |
| 6,551,366 B1 | 4/2003 | D'Souza et al. |
| 6,593,391 B2 | 7/2003 | Teutsch et al. |
| 6,645,412 B2 | 11/2003 | Priedeman, Jr. |
| 6,749,496 B2 | 6/2004 | Mota et al. |
| 6,767,499 B1 | 7/2004 | Hory et al. |
| 6,814,926 B2 | 11/2004 | Geving et al. |
| 6,858,050 B2 | 2/2005 | Palmgren |
| 7,015,268 B2 | 3/2006 | Manwiller et al. |
| 7,125,490 B2 | 10/2006 | Clendenning et al. |
| 7,311,752 B2 | 12/2007 | Tepper et al. |
| 7,332,140 B2 | 2/2008 | Matias |
| 7,497,977 B2 | 3/2009 | Nielsen et al. |
| 7,524,345 B2 | 4/2009 | Nevoret et al. |
| 7,867,302 B2 | 1/2011 | Nevoret et al. |
| 7,875,091 B2 | 1/2011 | Nevoret et al. |
| 7,883,563 B2 | 2/2011 | Kawata et al. |
| 7,887,608 B2 | 2/2011 | Schwabel et al. |
| 7,946,907 B2 | 5/2011 | Heyen |
| 8,109,177 B2 | 2/2012 | Kembaiyan |
| 8,252,087 B2 | 8/2012 | Burba, III et al. |
| 8,308,830 B2 | 11/2012 | Egan et al. |
| 8,486,490 B2 | 7/2013 | Fuwa et al. |
| 8,568,205 B2 | 10/2013 | Gosamo et al. |
| 8,597,088 B2 | 12/2013 | Hoang et al. |
| 8,668,859 B2 | 3/2014 | Pettis |
| 8,715,381 B2 | 5/2014 | Ramanath et al. |
| 8,778,252 B2 | 7/2014 | Mackie et al. |
| 8,870,571 B2 | 10/2014 | Lowder et al. |
| 8,991,211 B1 | 3/2015 | Arlotti et al. |
| 9,144,237 B2 | 9/2015 | Sakurada et al. |
| 9,156,999 B2 | 10/2015 | Ng et al. |
| 9,388,898 B2 | 7/2016 | Tokumo |
| 9,421,666 B2 | 8/2016 | Krishnan et al. |
| 9,456,884 B2 | 10/2016 | Uckelmann et al. |
| 9,545,669 B2 | 1/2017 | Åklint et al. |
| 9,597,730 B2 | 3/2017 | Mironets et al. |
| 9,731,982 B2 | 8/2017 | Adams |
| 9,776,304 B2 | 10/2017 | Schulze |
| 9,783,718 B2 | 10/2017 | Stevenson et al. |
| 9,815,029 B2 | 11/2017 | Zhong et al. |
| 9,822,291 B2 | 11/2017 | Erickson |
| 10,016,852 B2 | 7/2018 | Broda |
| 10,052,742 B2 | 8/2018 | Fukazawa et al. |
| 10,144,114 B2 | 12/2018 | Schulze |
| 10,183,329 B2 | 1/2019 | Gunther |
| 10,188,975 B2 | 1/2019 | Fu et al. |
| 10,189,211 B2 | 1/2019 | Volk et al. |
| 10,272,493 B2 | 4/2019 | Krebs et al. |
| 10,328,372 B2 | 6/2019 | Mazumder et al. |

(56) References Cited

U.S. PATENT DOCUMENTS

| | | | |
|---|---|---|---|
| 10,399,201 B2 | 9/2019 | Ganapathiappan et al. |
| 10,682,702 B2 | 6/2020 | Haro Gonzalez et al. |
| 10,723,041 B2 | 7/2020 | Wang |
| 10,882,160 B2 | 1/2021 | Redfield et al. |
| 10,888,973 B2 | 1/2021 | Franke et al. |
| 11,203,162 B2 | 12/2021 | Wighton et al. |
| 11,577,458 B2 | 2/2023 | Rifaut et al. |
| 2002/0095875 A1 | 7/2002 | D'Evelyn et al. |
| 2003/0150442 A1 | 8/2003 | Boland et al. |
| 2004/0226405 A1 | 11/2004 | Geving et al. |
| 2004/0244540 A1 | 12/2004 | Oldham et al. |
| 2004/0248770 A1 | 12/2004 | Grau et al. |
| 2005/0101237 A1 | 5/2005 | Vecchiarelli et al. |
| 2006/0059785 A1 | 3/2006 | Sung |
| 2006/0162967 A1 | 7/2006 | Brackin et al. |
| 2006/0185255 A1 | 8/2006 | Nevoret et al. |
| 2006/0185256 A1 | 8/2006 | Nevoret et al. |
| 2006/0185257 A1 | 8/2006 | Nevoret et al. |
| 2006/0208388 A1 | 9/2006 | Bredt et al. |
| 2006/0231293 A1 | 10/2006 | Ladi et al. |
| 2007/0020457 A1 | 1/2007 | Adefris |
| 2007/0241482 A1 | 10/2007 | Giller et al. |
| 2008/0085660 A1 | 4/2008 | Orlhac |
| 2008/0182017 A1 | 7/2008 | Singh et al. |
| 2008/0187769 A1 | 8/2008 | Huzinec et al. |
| 2010/0035530 A1 | 2/2010 | Gosamo et al. |
| 2010/0193254 A1 | 8/2010 | Lind et al. |
| 2010/0193255 A1 | 8/2010 | Stevens et al. |
| 2010/0255254 A1 | 10/2010 | Culler et al. |
| 2010/0320005 A1 | 12/2010 | Burhan et al. |
| 2011/0243675 A1 | 10/2011 | Fach |
| 2011/0293918 A1 | 12/2011 | Lucas et al. |
| 2012/0298425 A1 | 11/2012 | Cuillier De Maindreville et al. |
| 2013/0052453 A1 | 2/2013 | Filou et al. |
| 2013/0168071 A1 | 7/2013 | Hugelier et al. |
| 2013/0240479 A1 | 9/2013 | Moriya et al. |
| 2013/0277891 A1 | 10/2013 | Teulet |
| 2013/0280994 A1 | 10/2013 | Kang |
| 2013/0283700 A1 | 10/2013 | Bajaj et al. |
| 2013/0316149 A1 | 11/2013 | Atkins et al. |
| 2014/0069023 A1 | 3/2014 | Hoang et al. |
| 2014/0163717 A1 | 6/2014 | Das et al. |
| 2014/0255198 A1 | 9/2014 | El-Wardany et al. |
| 2014/0262541 A1 | 9/2014 | Parsana et al. |
| 2015/0008046 A1 | 1/2015 | Cuillier De Maindreville et al. |
| 2015/0029071 A1 | 1/2015 | Hwang et al. |
| 2015/0069649 A1 | 3/2015 | Bai et al. |
| 2015/0089881 A1 | 4/2015 | Stevenson et al. |
| 2015/0126099 A1 | 5/2015 | Krishnan et al. |
| 2015/0183089 A1 | 7/2015 | Iyengar |
| 2015/0259986 A1 | 9/2015 | Stockey |
| 2015/0290771 A1 | 10/2015 | Li |
| 2015/0306664 A1 | 10/2015 | Aklint et al. |
| 2015/0330154 A1 | 11/2015 | Pearce et al. |
| 2015/0360289 A1 | 12/2015 | Liou et al. |
| 2015/0375368 A1 | 12/2015 | Gosamo |
| 2016/0010469 A1 | 1/2016 | Guo |
| 2016/0038866 A1 | 2/2016 | Gibson et al. |
| 2016/0159699 A1 | 6/2016 | Lazur |
| 2016/0184972 A1 | 6/2016 | Serebrennikov et al. |
| 2016/0221122 A1 | 8/2016 | D'Orlando et al. |
| 2016/0271757 A1 | 9/2016 | Kanyanta et al. |
| 2016/0289520 A1 | 10/2016 | Bujnowski et al. |
| 2016/0332236 A1 | 11/2016 | Stoyanov |
| 2017/0050241 A1 | 2/2017 | Thomas et al. |
| 2017/0057011 A1 | 3/2017 | Hyatt et al. |
| 2017/0066873 A1 | 3/2017 | Gardet |
| 2017/0072469 A1 | 3/2017 | Maderud et al. |
| 2017/0136540 A1 | 5/2017 | Dods |
| 2017/0144242 A1 | 5/2017 | McQueen et al. |
| 2017/0216915 A1 | 8/2017 | Holcomb et al. |
| 2017/0232512 A1 | 8/2017 | Joerger |
| 2017/0291372 A1 | 10/2017 | Milshtein et al. |
| 2017/0297106 A1 | 10/2017 | Myerberg et al. |
| 2017/0342303 A1 | 11/2017 | Stevenson et al. |
| 2018/0001548 A1 | 1/2018 | Dietrich et al. |
| 2018/0104793 A1 | 4/2018 | Franke et al. |
| 2018/0117793 A1 | 5/2018 | Wang |
| 2018/0126515 A1 | 5/2018 | Franke et al. |
| 2018/0133803 A1 | 5/2018 | Karuppoor |
| 2018/0178348 A1 | 6/2018 | Xiao et al. |
| 2018/0178351 A1 | 6/2018 | Lindvall et al. |
| 2018/0214988 A1 | 8/2018 | Alves |
| 2018/0237329 A1 | 8/2018 | Drewnowski et al. |
| 2018/0305266 A1 | 10/2018 | Gibson et al. |
| 2018/0333781 A1 | 11/2018 | Ederer et al. |
| 2019/0022826 A1 | 1/2019 | Franke et al. |
| 2019/0047214 A1 | 2/2019 | Franke et al. |
| 2019/0112422 A1 | 4/2019 | Tallia et al. |
| 2019/0168305 A1 | 6/2019 | Boyle |
| 2019/0184641 A1 | 6/2019 | Swier et al. |
| 2019/0185351 A1 | 6/2019 | Huang et al. |
| 2019/0193159 A1 | 6/2019 | Gibson et al. |
| 2019/0243339 A1 | 8/2019 | Katogi et al. |
| 2020/0001429 A1 | 1/2020 | Rapaka et al. |
| 2020/0016725 A1* | 1/2020 | Adefris .................. B24D 3/06 |
| 2020/0070311 A1 | 3/2020 | Smithson et al. |
| 2020/0079028 A1 | 3/2020 | Miller et al. |
| 2020/0101534 A1 | 4/2020 | Gibson |
| 2020/0139507 A1 | 5/2020 | Yamamura et al. |
| 2020/0230695 A1 | 7/2020 | Protzmann et al. |
| 2020/0384694 A1 | 12/2020 | Ceriani |
| 2021/0001452 A1 | 1/2021 | Xiao et al. |
| 2021/0196436 A1 | 7/2021 | Raby et al. |
| 2021/0379836 A1 | 12/2021 | Fadurdo Orellana et al. |
| 2022/0203616 A1 | 6/2022 | Korten et al. |
| 2022/0282144 A1 | 9/2022 | Tanikella et al. |
| 2022/0332651 A1 | 10/2022 | Tanikella et al. |
| 2023/0111065 A1 | 4/2023 | Schumacher et al. |
| 2023/0211463 A1 | 7/2023 | Tanikella et al. |
| 2023/0211469 A1 | 7/2023 | Tanikella et al. |
| 2023/0211471 A1 | 7/2023 | Tanikella et al. |

FOREIGN PATENT DOCUMENTS

| | | |
|---|---|---|
| CN | 1212494 C | 7/2005 |
| CN | 1640596 A | 7/2005 |
| CN | 1962061 A | 5/2007 |
| CN | 102233269 B | 11/2011 |
| CN | 101804603 B | 5/2012 |
| CN | 102462996 A | 5/2012 |
| CN | 102658528 A | 9/2012 |
| CN | 102824789 A | 12/2012 |
| CN | 102936141 A | 2/2013 |
| CN | 202777185 U | 3/2013 |
| CN | 103264361 A | 8/2013 |
| CN | 103748309 A | 4/2014 |
| CN | 104014215 A | 9/2014 |
| CN | 104047547 A | 9/2014 |
| CN | 102873401 B | 11/2014 |
| CN | 203944262 U | 11/2014 |
| CN | 203980474 U | 12/2014 |
| CN | 203984693 U | 12/2014 |
| CN | 104259892 B | 1/2015 |
| CN | 104531065 B | 4/2015 |
| CN | 104566665 A | 4/2015 |
| CN | 104908166 A | 9/2015 |
| CN | 104924499 A | 9/2015 |
| CN | 104990154 A | 10/2015 |
| CN | 105563352 A | 5/2016 |
| CN | 105921793 A | 9/2016 |
| CN | 106280528 A | 1/2017 |
| CN | 106312843 A | 1/2017 |
| CN | 106425898 A | 2/2017 |
| CN | 106553137 A | 4/2017 |
| CN | 106674876 A | 5/2017 |
| CN | 104285281 B | 6/2017 |
| CN | 106926446 A | 7/2017 |
| CN | 106938335 A | 7/2017 |
| CN | 107150154 A | 9/2017 |
| CN | 107206570 A | 9/2017 |
| CN | 105562825 B | 10/2017 |
| CN | 107538359 A | 1/2018 |
| CN | 107636109 A | 1/2018 |

(56) References Cited

FOREIGN PATENT DOCUMENTS

| | | |
|---|---|---|
| CN | 105649538 B | 2/2018 |
| CN | 105415216 B | 3/2018 |
| CN | 107825305 A | 3/2018 |
| CN | 107838820 A | 3/2018 |
| CN | 107866752 A | 4/2018 |
| CN | 107866753 A | 4/2018 |
| CN | 107900927 A | 4/2018 |
| CN | 107914216 A | 4/2018 |
| CN | 107921471 A | 4/2018 |
| CN | 108081158 A | 5/2018 |
| CN | 207415166 U | 5/2018 |
| CN | 108326764 A | 7/2018 |
| CN | 106493651 B | 10/2018 |
| CN | 108612482 A | 10/2018 |
| CN | 108620583 A | 10/2018 |
| CN | 108747868 A | 11/2018 |
| CN | 208132742 U | 11/2018 |
| CN | 208132743 U | 11/2018 |
| CN | 208132744 U | 11/2018 |
| CN | 109157296 A | 1/2019 |
| CN | 208543373 U | 2/2019 |
| CN | 109483418 A | 3/2019 |
| CN | 109534845 A | 3/2019 |
| CN | 110340817 A | 10/2019 |
| CN | 210452395 U | 5/2020 |
| CN | 109366374 B | 11/2020 |
| DE | 3937697 A1 | 5/1991 |
| DE | 19834559 A1 | 2/2000 |
| DE | 19909882 A1 | 9/2000 |
| DE | 102009006189 A1 | 7/2010 |
| DE | 102015115406 A1 | 3/2017 |
| DE | 102017221111 A1 | 6/2018 |
| DE | 102017113369 A1 | 12/2018 |
| DE | 202018104180 U1 | 12/2018 |
| DE | 10-2019-219859 A1 | 6/2021 |
| DE | 10-2019-219867 A1 | 6/2021 |
| EP | 0127339 B1 | 3/1988 |
| EP | 1066134 B1 | 5/2002 |
| EP | 1878486 A1 | 1/2008 |
| EP | 3053677 A1 | 8/2016 |
| EP | 1778601 B1 | 9/2017 |
| EP | 3281695 A1 | 2/2018 |
| EP | 2025454 B1 | 4/2018 |
| EP | 3009233 A1 | 12/2018 |
| EP | 3418002 A1 | 12/2018 |
| EP | 3307483 B1 | 6/2020 |
| GB | 2527938 A | 1/2016 |
| JP | H02237759 A | 9/1990 |
| JP | H04372366 A | 12/1992 |
| JP | H05046404 U | 6/1993 |
| JP | H0691536 A | 4/1994 |
| JP | H0811051 A | 1/1996 |
| JP | H09309108 A | 12/1997 |
| JP | 2982661 B2 | 11/1999 |
| JP | H11322408 A | 11/1999 |
| JP | 3086103 B2 | 9/2000 |
| JP | 2002-248691 A | 9/2002 |
| JP | 2005199619 A | 7/2005 |
| JP | 2006187848 A | 7/2006 |
| JP | 2008119312 A | 5/2008 |
| JP | 2008-302454 A | 12/2008 |
| JP | 2010527888 A | 8/2010 |
| JP | 2014000155 A | 1/2014 |
| JP | 2014-221499 A | 11/2014 |
| JP | 2014529523 A | 11/2014 |
| JP | 2016049579 A | 4/2016 |
| JP | 5996195 B2 | 9/2016 |
| JP | 2016172306 A | 9/2016 |
| JP | 6010834 B2 | 10/2016 |
| JP | 2017-154411 A | 9/2017 |
| JP | 2018080359 A | 5/2018 |
| JP | 6643643 B2 | 2/2020 |
| KR | 10-0578045 B1 | 5/2006 |
| KR | 10-1062801 B1 | 9/2011 |
| KR | 20150117723 A | 10/2015 |
| KR | 101760271 B1 | 7/2017 |
| KR | 10-2018-0129059 A | 12/2018 |
| KR | 10-2323009 B1 | 11/2021 |
| MX | 2011001443 A | 4/2011 |
| WO | 93-25336 A1 | 12/1993 |
| WO | 94-02562 A1 | 2/1994 |
| WO | 96-33638 A1 | 10/1996 |
| WO | 98-56566 A1 | 12/1998 |
| WO | 99-15293 A1 | 4/1999 |
| WO | 99-48646 A1 | 9/1999 |
| WO | 01-72502 A1 | 10/2001 |
| WO | 2003026714 A1 | 4/2003 |
| WO | 2003092748 A1 | 11/2003 |
| WO | 03-106148 A1 | 12/2003 |
| WO | 2004-110719 A2 | 12/2004 |
| WO | 2005075000 A1 | 8/2005 |
| WO | 2007026387 A2 | 3/2007 |
| WO | 2009009558 A1 | 1/2009 |
| WO | 2010016959 A2 | 2/2010 |
| WO | 2013-026972 A1 | 2/2013 |
| WO | 2014-140689 A1 | 9/2014 |
| WO | 2014137890 A1 | 9/2014 |
| WO | 2014-165390 A1 | 10/2014 |
| WO | 2014161816 A2 | 10/2014 |
| WO | 2015-069849 A1 | 5/2015 |
| WO | 2016022449 A1 | 2/2016 |
| WO | 2016032883 A1 | 3/2016 |
| WO | 2016-058091 A1 | 4/2016 |
| WO | 2016123505 A1 | 8/2016 |
| WO | 2016-192140 A1 | 12/2016 |
| WO | 2016-209696 A1 | 12/2016 |
| WO | 2016-210057 A1 | 12/2016 |
| WO | 2017-007999 A1 | 1/2017 |
| WO | 2017034951 A1 | 3/2017 |
| WO | 2017-137482 A1 | 8/2017 |
| WO | 2017127887 A1 | 8/2017 |
| WO | 2017-173009 A1 | 10/2017 |
| WO | 2017214179 A1 | 12/2017 |
| WO | 2018010730 A2 | 1/2018 |
| WO | 2018-080778 A1 | 5/2018 |
| WO | 2018118566 A1 | 6/2018 |
| WO | 2018160297 A1 | 9/2018 |
| WO | WO-2019017956 A1 * | 1/2019 ............ B29B 17/00 |
| WO | 2019187112 A1 | 10/2019 |
| WO | 2019194823 A1 | 10/2019 |
| WO | 2019210111 | 10/2019 |
| WO | 2019230214 A1 | 12/2019 |
| WO | 2020012501 A1 | 1/2020 |
| WO | 2020102025 A1 | 5/2020 |
| WO | 2020-128779 A2 | 6/2020 |
| WO | 2020220143 A1 | 11/2020 |
| WO | 2021-001730 A1 | 1/2021 |
| WO | 2021-009673 A1 | 1/2021 |
| WO | 2021-038438 A1 | 3/2021 |
| WO | 2021-038465 A1 | 3/2021 |
| WO | 2021076986 A1 | 4/2021 |
| WO | 2021-116859 A1 | 6/2021 |
| WO | 2021119290 A1 | 6/2021 |
| WO | 2021119319 A1 | 6/2021 |
| WO | 2021156730 A1 | 8/2021 |
| WO | 2021221918 A1 | 11/2021 |
| WO | 2022006201 A1 | 1/2022 |
| WO | 2022-107038 A1 | 5/2022 |
| WO | 2022090904 A1 | 5/2022 |
| WO | 2022187721 A1 | 9/2022 |
| WO | 2023130059 A1 | 7/2023 |
| WO | 2023130082 A1 | 7/2023 |
| WO | 2023130088 A1 | 7/2023 |

OTHER PUBLICATIONS

Jimenez et al. SI. Parametric analysis to quantify process input influence on the printed densities of binder jetted alumina ceramics. Additive Manufacturing. 30, 100864. (Year: 2019).*

Mirzababaei et al. Metal Powder Recyclability in Binder Jet Additive Manufacturing, Journal of Minerals, Metals &Material Society, vol. 72, 2020, pp. 3070-3079 (Year: 2020).*

(56) References Cited

OTHER PUBLICATIONS

Ayres et al. Influence of resin infiltrants on mechanical and thermal performance in plaster binder jetting additive manufacturing, Additive Manufacturing, 30, 2019, 100885 (Year: 2019).*
Tian, Chenchen, et al., "Study on design and performance of metal-bonded diamond grinding wheels fabricated by selective laser melting (SLM)", Materials and Design 156 (2018), pp. 52-61 <https://doi.org/10.1016/j.matdes.2018.06.029>.
Tian, Chenchen, et al., "The effect of porosity on the mechanical property of metal-bonded diamond grinding wheel fabricated by selective laser melting (SLM)", Materials Science & Engineering A 743 (2019), pp. 697-706 <https://doi.org/10.1016/j.msea.2018.11.138>.
Tian, Chenchen, et al., "Porous structure design and fabrication of metal-bonded diamond grinding wheel based on selective laser melting (SLM)", The International Journal of Advanced Manufacturing Technology (2019) 100: 1451-1462 <https://doi.org/10.1007/s00170-018-2734-y>.
Tian, Chenchen, et al., "Study on formability, mechanical property and finite element modeling of 3D-printed composite for metal-bonded diamond grinding wheel application", Journal of Manufacturing Processes 54 (2020), pp. 38-47 <https://doi.org/10.1016/j.jmapro.2020.02.028>.
Qiu, Yanfei, et al., "Effect of additive particles on the performance of ultraviolet-cured resin-bond grinding wheels fabricated using additive manufacturing technology", The International Journal of Advanced Manufacturing Technology (2018) 97: 9873-3882 <https://doi.org/10.1007/s00170-018-2231-3>.
Yang, Zhibo, et al., "A study on diamond grinding wheels with regular grain distribution using additive manufacturing (AM) technology", Materials and Design 104 (2016) pp. 292-297 <http://dx.doi.org/10.1016/j.matdes.2016.04.104>.
Du, Zhi-jun, et al., "Selective laser sintering and grinding performance of resin bond diamond grinding wheels with arrayed internal cooling holes", Ceramics International 45 (2019) pp. 20873-20881 <https://doi.org/10.1016/j.ceramint.2019.07.076>.
Search Results, Mar. 4, 2021, 14 pages.
3M, "3D Printed Superabrasives", 2024, 6 pages <https://www.3m.com/3M/en_US/metalworking-us/applications/grinding/precision-grinding/technology/superabrasives/precision-structured-wheels/>.
3M, "Precision Grinding and Microfinishing", 2024, 3 pages <https://www.3m.com/3M/en_US/metalworking-us/applications/grinding/precision-grinding/>.
3M, "Precision Grinding and Finishing Technology", 2024, 3 pages <https://www.3m.com/3M/en_US/metalworking-us/applications/grinding/precision-grinding/featured-technology/>.
Mishek, Danny, "Time and Money Saved with RP/RT Strategy", Apr. 1, 2007, 4 pages <https://www.moldmakingtechnology.com/articles/time-and-money-saved-with-rp-rt-strategy>.
Yang, Zhibo, et al., "Interface Microstructure and Formation Mechanism of Diamond Abrasives Laser Brazed with Ni—Cr Solder", Rare Metal Materials and Engineering, 45, 5, 1152-1156, 2016, Abstract Only.
Sears, James W., "Developing New Applications Based on Laser Additive Manufacturing of WC Cermets and WC Forming Alloys (Invited Paper)", Chinese Journal of Lasers, 36, 12, 3245-3250, 2009, Abstract Only.
Webster, J., et al., "Innovations in abrasive products for precision grinding", CIRP Annals—Manufacturing Technology, 53, 2, 597-617, 2004Conference: 54th General Assembly of CIRP, Krakow, Poland, Aug. 22-28, 2004, Abstract Only.
Maekawa, K., et al., "Fabrication of metal-bonded grinding/polishing tools by greentape laser sintering method", Precision Machining of Advanced Materials, 196, 133-140, 2001, Abstract Only.
Yang, Zhibo, et al., "3D Printing of Diamond Tools for Dental Ceramics Processing", Advanced Engineering Materials, 20, 3, 2018 Language: English, Abstract Only.
Peng, Ruitao, et al., "Performance of a pressurized internal-cooling slotted grinding wheel system", International Journal of Advanced Manufacturing Technology, 94, 5-8, 2239-2254, 2018, Abstract Only.
Stoyanov, Pantcho, et al., "Microstructural and mechanical characterization of Mo-containing Stellite alloys produced by three dimensional printing", Procedia CIRP 45 (2016) pp. 167-170.
Myers, Kyle, "Structure-Property Relationship of Binder Jetted Fused Silica Preforms to Manufacture Ceramic-Metallic Interpenetrating Phase Composites", Youngstown State University, May 2016, 252 pages.
Search Results, Apr. 19, 2019, 18 pages.
Search Results, May 2020, 11 pages.
Search Results, Nov. 2022, 7 pages.
Advanti Technology P L, "3D Metal Printer ExOne" May 1, 2014 <https://www.youtube.com/watch?v=Zql0B0V-ttw>.
Xu, Xipeng, et al., "The fabrication of grinding wheels with 3-dimensional controllable abrasives arrangement using stereolithography apparatus method", Huaqiao University, China, 2nd International Conference on 3D Printing Technology and Innovations, 2018, abstract only.
Lu, Jing, et al., "Protecting diamond abrasive from being corroded in the vitrified bond wheel manufactured by 3D printing", Institute of Manufacturing Engineering, Huaqiao University, Xiamen, P.R. China, 2nd International Conference on 3D Printing Technology and Innovations, 2018, abstract only.
Yang, Zhibo, Li Kaiqiang, Hu Junchen, Zhang Shiyu. Temperature field simulation of grinding wheel preparation by selective laser sintering of nickel-based binder[J]. Heat Treatment of Metals, 2018, 43(10): 210-216, abstract only.
Zhang, Shubo, et al., "The design and fabrication of porous sintered grinding wheel based on Selective Laser Melting technology", Journal of Physics: Conference Series, vol. 1074, 2018, 10 pages <DOI: 10.1088/1742-6596/1074/1/012157>.
Tanaka, T., et al., "New development of a grinding wheel with resin cured by ultraviolet light", Journal of Materials Processing Technology, vol. 113, Issues 1-3, Jun. 15, 2001, pp. 385-391, abstract only.
Tanaka, T., et al., "Development of Grinding Wheels by Stereolithography and Investigation of their Characteristics", Key Engineering Materials, Apr. 2003, 238-239:277-282, abstract only <DOI: 10.4028/www.scientific.net/KEM.238-239.277>.
Okushima, Kenichi, et al., "Development of resin-bonded grinding wheel by stereolithography", Journal of the Japan Society for Precision Engineering 69(10): 1459-1463, Oct. 2003, abstract only <DOI: 10.2493/jjspe.69.1459>.
Yamamoto, Daiki, et al., "ELID grinding wheel fabrication technology applying PELID and 3D printer" Journal of the Japan Society for Abrasive Technology, 2016, vol. 60, Issue 5, pp. 267-268, abstract only <DOI: https://doi.org/10.11420/jsat.60.267>.
Tsukada, Namiki, et al., "Construction of laminated grinding wheel production system using PELID", Jan. 2016, The Proceedings of the Conference on Information Intelligence and Precision Equipment IIP 2016:H-2-3, abstract only <DOI: 10.1299/jsmeiip.2016.H-2-3>.
Iinuma, Ryosuke et al., "Grinding wheel fabrication using twin nozzle PELID and its characteristics", Jan. 2017, The Proceedings of Ibaraki District Conference 2017.25:715, abstract only <DOI: 10.1299/jsmeibaraki.2017.25.715>.
Ohno, Ryouhei, et al., "Development of ELID grinding wheel using PELID and nano-diamond", 2016, 2 pages, English abstract.
Saito, Hiroki, et al., "Development of Resin ball grinding wheel using PELID", Jan. 2016, The Proceedings of Ibaraki District Conference 2016.24:709, abstract only <DOI: 10.1299/jsmeibaraki.2016.24.709>.
Yano, Toui, et al., "Development and evaluation of ELID grinding wheel using 3D printer and PELID", Jan. 2017, The Proceedings of Ibaraki District Conference 2017.25:714, Abstract only <DOI: 10.1299/jsmeibaraki.2017.25.714>.
Jimenez, Edgar Mendoza, et al., "Parametric analysis to quantify process input influence on the printed densities of binder jetted alumina ceramics," Additive Manufacturing 39 (2019) 100864, 9 pages.

(56) References Cited

OTHER PUBLICATIONS

Cao, S., et al., "Investigation on urea-formaldehyde resin as an in-powder adhesivefor the fabrication of Al2O3/borosilicate-glass composite parts bythree dimensional printing (3DP)", Journal of Materials Processing Technology 217 (2015) pp. 241-252.
Melcher, R., et al., "Fabrication of Al2O3-based composites by indirect 3D-printing", Materials Letters 60 (2006) pp. 572-575.
Seleznev, Maxim, et al., "Novel Near-Net-Shape Tool-Less Method for Manufacturing Cast Metal Matrix Composites: Three-Dimensional Printing of Ceramic Preforms Combined with Investment Casting Technology", SAE Transactions, vol. 109, Section 5: Journal of Materials & Manufacturing (2000), pp. 235-242.
Winkel, Alexander, et al., "Sintering of 3D-Printed Glass/Hap Composites", Journal of the American Ceramic Society, vol. 95, No. 11, Nov. 2012, pp. 3387-3393.
Zhang, Wei, et al., "Three-Dimensional Printing of Complex-Shaped Alumina/Glass Composites", Advanced Engineering Materials 2009, 11, No. 12, pp. 1038-1043.
Spierings, Adriaan Bernardus, et al., "Processing of metal-diamond-composites using selective laser melting", Rapid Prototyping Journal, vol. 21, No. 2, 2015, pp. 130-136.
Zocca, Andrea, et al., "Additive Manufacturing of Ceramics: Issues, Potentialities, and Opportunities", Journal of the American Ceramic Society, Jul. 2015, vol. 98, No. 7, pp. 1983-2001.
Guo, Nannan, et al., "Additive Manufacturing: technology, applications and research needs," Front. Mech. Eng., 2013, 8(3), pp. 215-243.
Yin, Xiaowei, et al., "Three-Dimensional Printing of Nanolaminated Ti3AlC2 Toughened TiAl3—Al2O3 Composites," Journal of the American Ceramic Society, Jul. 2007, vol. 90, No. 7, pp. 2128-2134.
Rosso, M., "Ceramic and metal matrix composites: route and properties", Polytechnic of Turin, Dep. Of Material Science and Chemical Engineering, 12th International Scientific Conference: Achievements in Mechanical and Materials Engineering, 16 pages.
Bak, David, "Rapid prototyping or rapid production? 3D printing processes move industry towards the latter", Assembly Automation, 2003, vol. 23, No. 4, pp. 340-345.
3M Technology, "3D Printed Abrasives", YouTube Video, Uploaded Jun. 4, 2019, 1 page. <https://www.youtube.com/watch?v=TtYte1l-BsM>.
"New Infographic: How It Works . . . Software-Driven 3D Post-Printing with AUTOMAT3D™", Jun. 20, 2018, 5 pages.
AmericaMakes, "Success Story: Hybrid Direct Manufacturing: Integrating Additive and Subtractive Methods—Improving Productivity by Integrating Automatic Finishing with Direct Metal Additive Manufacturing," 2017, 2 pages.
Kumbhar_N.N. et al., "Post Processing Methods used to Improve Surface Finish of Products which are Manufactured by Additive Manufacturing Technologies: A Review", J. Inst. Eng. India Ser. C (Aug. 2018) 99(4):481-487, 7 pages.
International Search Report from PCT Application No. PCT/US2019/029239 dated Sep. 11, 2019, 5 pages.
International Search Report from PCT Application No. PCT/US2020/056111 dated Feb. 10, 2021, 5 pages.
International Search Report from PCT Application No. PCT/US2020/064322 dated Mar. 16, 2021, 5 pages.
International Search Report for PCT/US2021/028910 dated Aug. 5, 2021, 4 pages.
International Search Report for PCT/US2022/019047 dated Jun. 17, 2022, 5 pages.
International Search Report for PCT/US2022/019046 dated Jun. 17, 2022, 4 pages.
Beyer, Dr. Peter, "Exploring the New Dimensions of 3D Abrasives Technology," The Meister Toolbox, Jul. 7, 2016, 2 pages.
Lewis, Jennifer A., et al., "Direct Ink Writing of Three-Dimensional Ceramic Structures," J. Am. Ceram. Soc., 89 [12] 3599-3609, 2006, 11 pages.
Cabala et al., "Silver nanoparticle surface functionalized alumina filters for disinfection of potable water," Material Today: Proceedings 2 (2015) 321-330.
Wehling et al. "Silver nanoparticle-doped zirconia capillaries for enhanced bacterial filtration." Material Science and Engineering C 48 (2015) 179-187.
Yang et al., "Development and Characterization of Porous Silver-Incorporated Hydroxyapatite Ceramic for Separation and Elimination of Microorganisms." Published online Wiley InterScience Aug. 29, 2006.
Li et al. "Removal and retention of viral aerosols by a novel alumina nanofiber filter." Aerosol Science 40 (2009) 65-71.
Negus et al., "Simple methods to incroporate silver and copper generate antmicrobial glasses and porous glass-bonded ceramics." ACS bulletin vol. 96, No. 5.
Tepper, et al., "Novel Nanofibre Filter Medium Attracts Waterborne Pathogens," Jul./Aug. 2002, www.filtsep.com, 4 pages.
Virus Absorbing Air Filter, 21.2, (1991), 521-523.
International Search Report for Application No. PCT/US2020/064282 dated Apr. 8, 2021, 3 pages.
International Search Report & Written Opinion for PCT/US2017/058808, mailed Feb. 19, 2018, 12 pages.
International Search Report for Application No. PCT/US2022/082650 dated May 4, 2023, 4 pages.
International Search Report for Application No. PCT/US2022/082641 dated May 2, 2023, 4 pages.
International Search Report for Application No. PCT/US2022/082606 dated May 9, 2023, 4 pages.
ExOne Binder Jetting Technology, "What is Binder Jetting?", <https://www.exone.com/en-US/case-studies/what-is- binder-jetting>, retrieved Oct. 3, 2019, 2 pages.
Abrasive Technology—Current Development and Applications I, Proceedings of the Third International Conference on Abrasive Technology (ABTEC '99), Brisbane, Australia, Nov. 1999, 556 pages (Abstract).
Beyer, Dr. Peter, "Exploring the New Dimensions of 3D Abrasives Technology," The Meister Toolbox, Jul. 7, 2016, 2 pages, <https://meister-abrasives-toolbox.com/2016/07/07/exploring-the-new-dimensions-of-3d-abrasives-technology/>.
Doremalen, et al., "Aerosol and Surface Stability of SARS-CoV-2 as Compared with SARS-CoV-1", The New England Journal of Medicine, 382;16, Apr. 16, 2020, 4 pages <https://www.nejm.org/doi/full/10.1056/NEJMc2004973>.
Ensoll Tools, "CBN Wire Loops or Diamond Wire Loops is Fit for Metal Cutting?", <http://www.ensolltools.com/en/news/new-88-81.html> Accessed May 12, 2022.
Chaplin, Brian P., "Critical Review of Electrochemical Advanced Oxidation Proceses for Water Treatment Applications," Department of Chemical Engineering, University of Illinois at Chicago, Environmental Science: Processes and Impacts, The Royal Society of Chemistry, 2013, 24 pages.
Morawska, Lidia, et al., "Airborne transmission of SARS-CoV-2: The world should face the reality", International Laboratory for Air Quality and Health, Environment International 139 (2020) 105730.
Olsen, Sonja J., et al., "Transmission of the Severe Acute Respiratory Syndrome on Aircraft", The New England Journal of Medicine, 349:25, Dec. 18, 2003.
Li Ming, et al., "Binder Jetting Additive Manufacturing of Metals: A Literature Review", vol. 1: Additive Manufacturing; Manufacturing Equipment and Systems; Bio and Sustainable Manufacturing, vol. 1, Jun. 10, 2019 (Jun. 10, 2019), XP055954813, DOI: 10.1115/MSEC2019-2994, ISBN: 978-0-7918-5874-5 *table 4*.

* cited by examiner

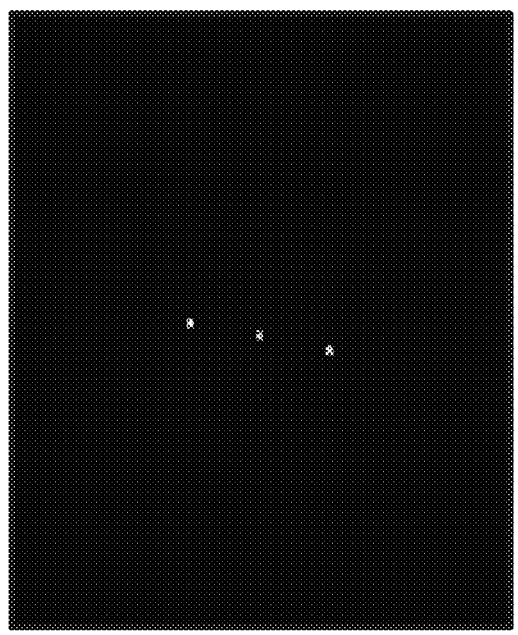
FIG. 4E
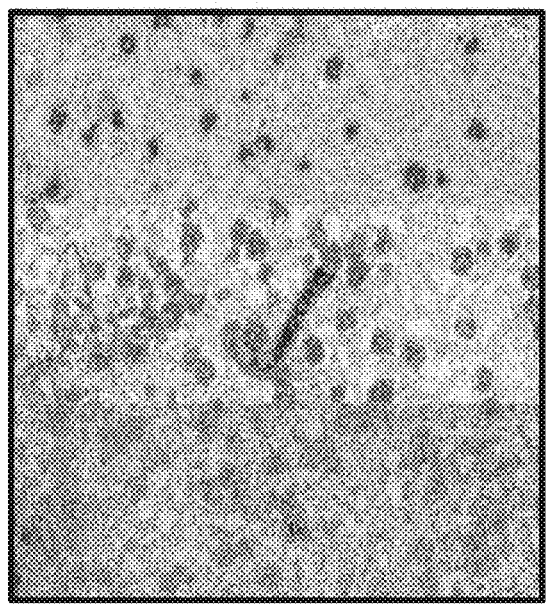 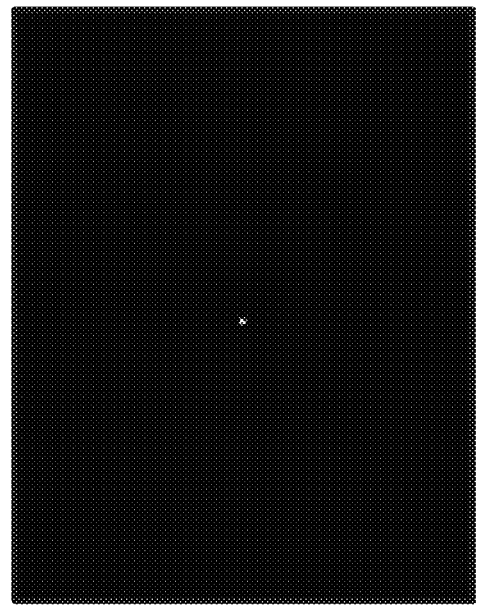
FIG. 5A  FIG. 5B

Sample 6  Sample 7  Sample 8

ABRASIVE ARTICLES AND METHODS FOR FORMING SAME

CROSS-REFERENCE TO RELATED APPLICATION(S)

This application claims priority under 35 U.S.C. § 119(e) to U.S. Provisional Application No. 63/157,236, entitled "ABRASIVE ARTICLES AND METHODS FOR FORMING SAME," by Brahmanandam V. TANIKELLA et al., filed Mar. 5, 2021, and to U.S. Provisional Application No. 63/266,284, entitled "ABRASIVE ARTICLES AND METHODS FOR FORMING SAME," by Brahmanandam V. TANIKELLA et al., filed Dec. 30, 2021, all of which are assigned to the current assignee hereof and incorporated herein by reference in their entireties.

FIELD OF THE DISCLOSURE

The present disclosure relates to forming abrasive articles and aspects of one or more green bodies and/or finally-formed abrasive articles.

BACKGROUND

Abrasive articles are used in material removal operations, such as cutting, grinding, or shaping various materials. Abrasive articles or green bodies of abrasive articles can be formed via additive manufacturing. There is a need to develop improved abrasive articles.

BRIEF DESCRIPTION OF THE DRAWINGS

Embodiments are illustrated by way of example and are not limited in the accompanying figures.

FIGS. 4A-E include processed cross-sections of abrasive articles according to an embodiment.

FIGS. 5A and 5B include images from a bonded abrasive formed through conventional processing techniques of hot pressing.

DESCRIPTION

Figure 1A:
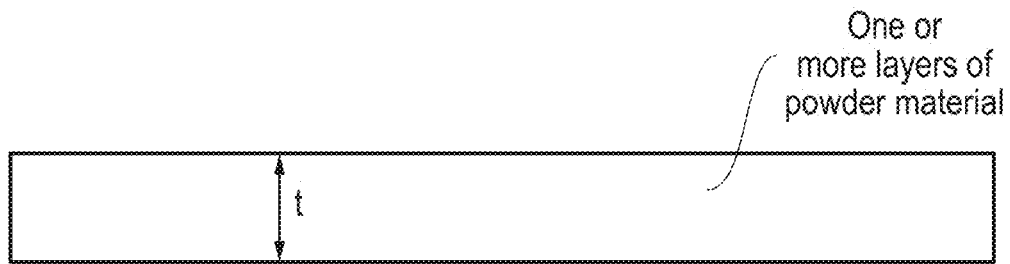
FIGS. 1A-E include illustrations of a process of forming an abrasive article according to an embodiment.

The present disclosure may be better understood, and its numerous features and advantages made apparent to those skilled in the art by referencing the accompanying drawings.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to methods for forming abrasive articles and the features of the resulting abrasive articles. While prior disclosures have provided some limited examples of forming abrasive articles via additive manufacturing, such abrasive articles are limited in their size, quantity, and quality. In fact, Applicants of the present disclosure have conducted notable empirical studies and have found that the knowledge necessary to create high quality abrasive articles according to conventional additive manufacturing techniques is noted, specifically in the context of dry powder layering and binding techniques. To-date, disclosures in the prior art are limited to micro-abrasive bodies. This is because formation of large-scale, high-quality abrasive articles via dry powder layering and binding techniques is not easily scalable. Numerous hurdles limit the advance of the technology, including but not limited to, the capability of creating dense parts, dimensional stability during and after forming, and the empirical studies needed to fully understand and appreciate the complexities of the process variables. Such process variables include, but is not limited to, composition of the powder material, flowability of the powder material, a force applied by a compaction object to the layer or a plurality of layers of powder, a traverse speed of a compaction object, average thickness of the layer prior to compaction, a particle size distribution of the powder, number of previously formed layers underlying the layer of powder, the number of compacted layers underlying the layer of powder, the density of any layers underlying the layer of powder, the amount of binder in any layers underlying the layer of powder, the relative dimensions of the layer relative to one or more layers underlying the layer, an average thickness of the layer prior to compaction, a printhead deposition resolution, saturation limits of the binder, composition of the binder material, and others. The formation of composite components, such as abrasive articles, via additive manufacturing on a commercial scale has notable boundaries that have not been previously recognized. For a commercial scale additive manufacturing process, utilization of raw materials without recycling would be inefficient and wasteful. Based on empirical studies, the Applicants have noted certain unexpected issues in scaling a lab-scale additive manufacturing process to a commercial scale process. For example, the use of recycled material (e.g., recycled powder material) may cause significant and unexpected changes to the manufacturability and quality of the parts formed from such powder.

FIG. 1A includes an illustration of a portion of the process, including forming one or more layers of powder material that can include abrasive particles, and may include a mixture of abrasive particles and precursor bond material. The layer of powder can have an average thickness (t). The layer of powder material can be dispensed as described in embodiments herein.

Figure 1B:
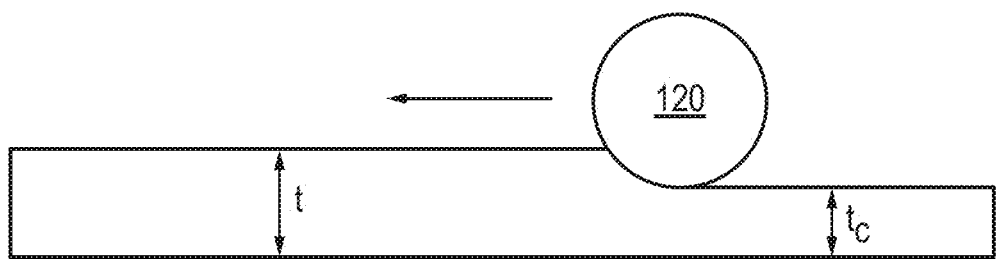

FIG. 1B includes an illustration of a process of compacting at least a portion of the layer with a compaction object (120). The compaction object 120 can traverse the layer and compact the layer to form a compacted layer having an average thickness (tc). The compacted layer thickness (tc) can be less than the layer thickness (t) prior to compaction as described according to embodiments herein. As will be appreciated, in some instances, multiple layers of powder material may be formed and compaction can be completed on more than one layer of powder material simultaneously. In some optional embodiments, a smoothing roller may traverse the surface of the layer of powder, but smoothing rollers do not apply sufficient force to cause compaction, rather they scrape the surface of the layer to remove and smooth any large undulations.

Figure 1C:
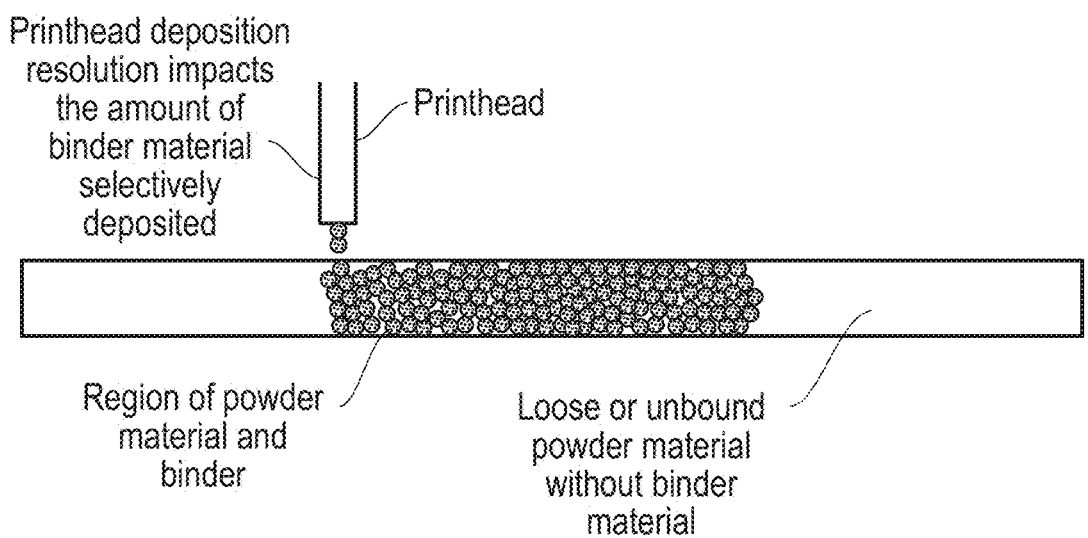

FIG. 1C includes binding at least a portion of the compacted layer of powder material with a binder material. The binder material can have any of the features described in the claims herein. The amount of binder material is sufficient to bind the powder material. The regions that do not include binder material can be defined as either dispensed powder or depowdered powder, which may be removed and captured after processing is completed and used as recycled powder. Dispensed powder is defined as the powder material which is dispensed during the additive manufacturing process but not strongly attached to or bound to the binder material or the formed abrasive articles. Depowdered powder is defined as the powder removed from the surface or volume of the formed abrasive articles. Notably, at the edges of the region between the bound powder material and dispensed powder material, the binder material may exist in some of the depowdered powder. Accordingly, as described in claimed embodiments herein, the recycled powder may include some content of organic material, such as binder material that was included in the captured dispensed or depowdered powder material, particularly at the regions bordering the bound and dispensed powder. Methods may be used to treat the recycled powder material, including organic material to remove a certain content of organic material prior to recycling the powder material and using in one or more subsequent additive manufacturing processes to form abrasive articles.

Figure 1D:
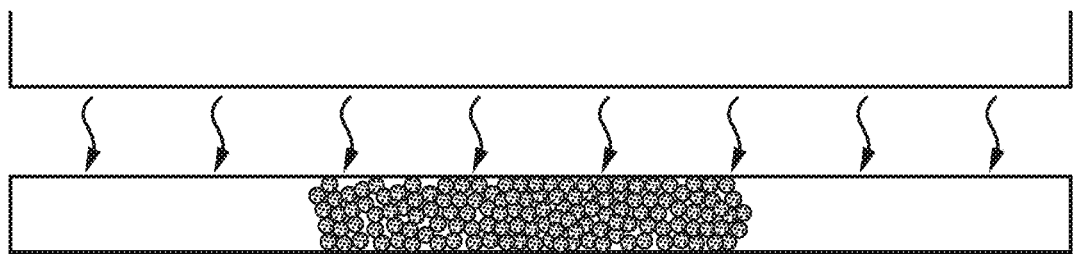

FIG. 1D includes a process for binding the powder material by treating the layer to convert the binder from a liquid material to a solid material to bind the powder material. The process can include curing of at least a portion of the binder material as claimed in embodiments herein.

Figure 1E:
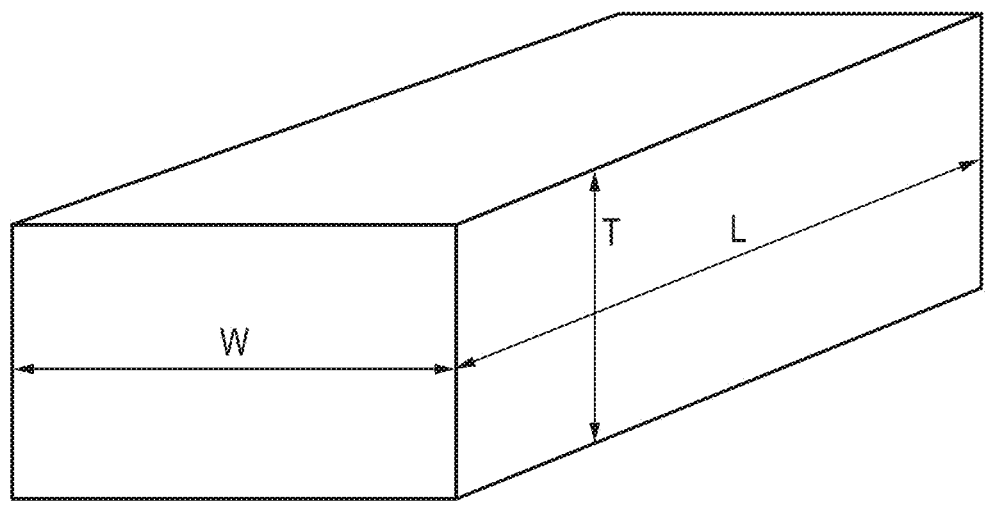

FIG. 1E is an illustration of an abrasive article, which may represent a green body or finally-formed abrasive article. It will be appreciated that the abrasive articles of the embodiments herein can have any three-dimensional shape and FIG. 1E is illustrative of only one possible shape. The length (L) defines the longest dimension of the body, and the width (W) defines a dimension of the body substantially perpendicular to the length and may be a value less than the length and greater than the thickness (T). The thickness (T) of the body may extend in a direction perpendicular to a plane defined by the length and width. The dimensions of any body of embodiments herein may have a relationship of length, width, and thickness defined as L≥W≥T. In those instances wherein the body is in the form of a cylinder with the axial axis being the longest, the length is the longest dimension in the axial direction, the width can be a first diameter of an end surface, and the thickness can be another diameter. In the case of an abrasive article in the form of a disk, wherein the diameter is the greatest dimension, the diameter defines the length of the body, the width defines a diameter perpendicular to the length (and may be the same as the length, and the thickness defines the dimension of the body in an axial direction perpendicular to the plane of the circular end surface. All dimension measurements were determined using calipers. When measuring dimensions Length>=Width>=Thickness.

The abrasive articles can have contents and compositions of abrasive particles, bond material, precursor bond material, and any additives as described in the embodiments herein.

Figure 2A:
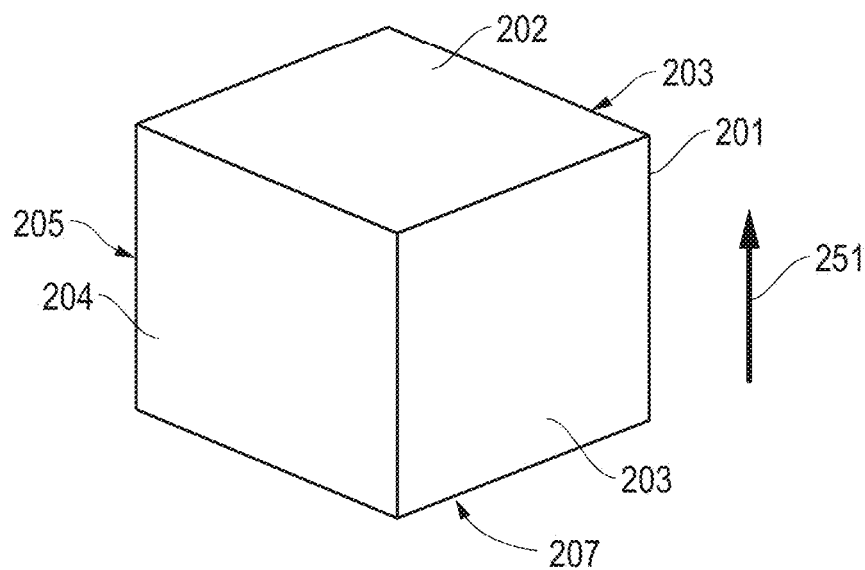
FIGS. 2A and 2B include perspective view illustrations of abrasive articles according to an embodiment.
Figure 2B:
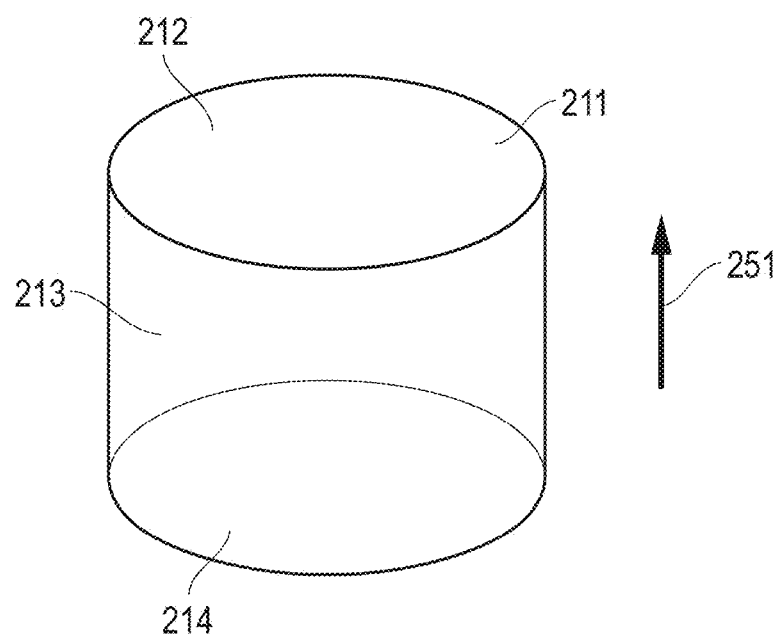

FIGS. 2A and 2B include perspective view illustrations of abrasive articles, which may be green bodies or finally-formed abrasive articles according to embodiments herein. The bodies of FIGS. 2A and 2B can be formed by any of the methods of the embodiments herein and formed in a build direction 251. The body 201 can have surfaces 208, 203, or 204 that are transverse relative to the build direction and surfaces that are not transverse to the build direction 202 and 207. The body 211 can be in the shape of a cylinder having a surface 213 transversely relative to the build direction and surfaces 212 and 214 that are not transverse to the build direction. It will be appreciated that the abrasive articles may be in any number of shapes and not limited to those explicitly shown herein. It will be appreciated that the bodies may be formed using a variety of build directions. In certain embodiments, the build direction may impact certain features of the abrasive articles, as green body abrasive articles and/or finally-formed abrasive articles. In certain instances, the transverse surfaces may have a different Sdr than the other surfaces. In an embodiment, the transverse surfaces may have a higher Sdr than surfaces having a different orientation to the transverse surfaces, and more specifically, surfaces having different orientations relative to the build direction 251. It will be appreciated that the build direction may be manipulated to control which surfaces have a relatively high or low Sdr. For example, an abrasive may be constructed such that the smallest surfaces are not transverse to the build direction, minimizing the amount of surface area with a low Sdr. Different Sdr values may be valuable for different applications. For example, a high Sdr surface may be useful as an abrasive working surface in low pressure grinding applications. A high or low Sdr surface may also more easily bind or adhere to a substrate or another surface using a binder, an adhesive, or other coupling means, depending on the composition of the coupling means. In an embodiment, a transverse surface can be an abrasive working surface of the body. In another embodiment, a surface that is not a transverse surface can be an abrasive working surface of the body. In embodiments, either a transverse surface or a surface that is not transverse can be coupled to another surface via a binder or adhesive. In an embodiment, the transverse surfaces may have visible layering or roughness that is not present on the other surfaces.

Figure 3:
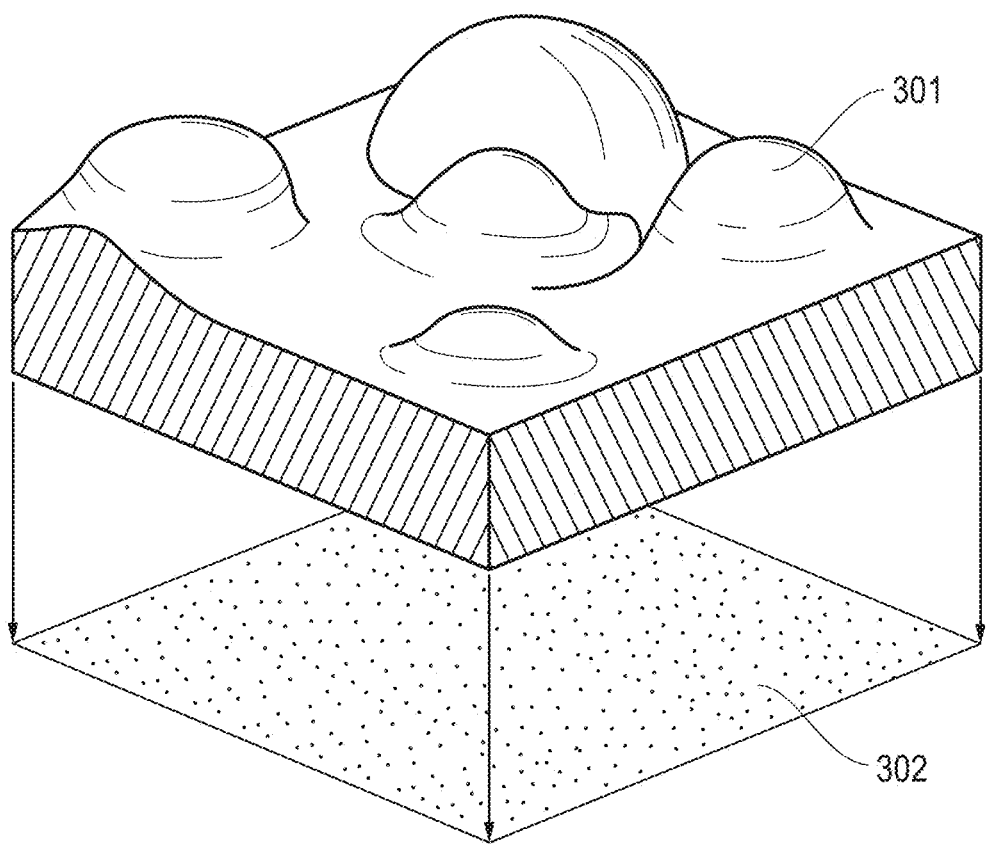
FIG. 3 includes an illustration of the measuring principle of the developed interfacial area ratio Sdr.

FIG. 3 includes an illustration of the measuring principle of the developed interfacial area ratio Sdr. The developed interfacial area ratio Sdr expresses the percent increase in surface area 301 (provided by the surface texture) in relation to a corresponding underlying projected area 302 (ideal flat plane) and was measured according to ISO standard method ISO25178-2:2012.

The developed interfacial area ratio Sdr expresses the percentage rate of an increase in a surface area $A_1$ 301 that is related to the surface texture in comparison to a projected area $A_0$ 702, wherein $A_0$ 302 corresponds to an ideal plane underneath the measured surface texture. An illustration of the relation of surface area $A_1$ 301 to projected area $A_0$ 302 is shown in FIG. 3. The Sdr measurements were conducted with an Olympus LEXT OLS5000 laser confocal microscope. The analyzed surface area was 257×257 µm, at a 50 times magnification, with a filter cylinder. Four measurements per sample were conducted at different locations, and an average Sdr value was calculated according to the equation: =

$$\frac{1}{A}\left[\int\int_A \left(\sqrt{\left[1+\left(\frac{\partial z(x,y)}{\partial x}\right)^2 + \left(\frac{\delta z(x,y)}{\delta y}\right)^2\right]} - 1\right) dx dy\right].$$

The Sdr can be also expressed by the following formula: $Sdr=[(A_1/A_0)-1]\times 100(\%)$.

In an embodiment, the additive manufacturing process can be performed with a specific printer head deposition resolution that may result in improved manufacturing or performance of the abrasive body. It will be appreciated that the printhead deposition resolution may be between any of the minimum and maximum values claimed herein. Without wishing to be tied to one theory, some data suggests that manipulating the resolution may alter the Sdr on the surfaces of the body. A small resolution may lead to a smaller Sdr on surfaces transverse to the build direction, as well as a smaller difference in Sdr between transverse surfaces and surfaces that are not transverse to the build direction. The same may be true for the thickness of the layers before and/or after compaction.

In one aspect, the binder jetting can include using as starting material a powder material having a multi-modal particle distribution. The multimodal particle size distribution of the powder material may be related to different sizes of a single phase material or creation of a mixture from different powder components, including, for example, but not limited to, a mixture including a first particulate material (e.g., abrasive particles having a first particle size distribution) and a second particulate material (e.g., particulate bond material or bond material precursor having a second particle size distribution that is different from the first particle size distribution).

In one particular aspect, the powder material for the binder jetting can be bi-modal particle distribution, wherein a first plurality of particles can have an average particle size (D50) of at least 1 µm and not greater than 10 µm, and a second plurality of particles can have an average particle size (D50) of at least 20 µm and not greater than 50 µm.

In another aspect, a weight % ratio of the first plurality of particles to the second plurality of particles can be from 1:0.1 to 1:10. In certain aspects, the weight % ratio can be not greater than 1:0.3, or not greater than 1:0.5, or not greater than 1:1, or not greater than 1:2, or not greater than 1:3, or not greater than 1:4, or not greater than 1:5, or not greater than 1:6, or not greater than 1:7, or not greater than 1:8, or not greater than 1:9, or not greater than 1:10.

In an embodiment, the abrasive particles can include oxides, carbides, nitrides, borides, diamonds, or any combination thereof. In an embodiment, the abrasive particles can include alumina, zirconia, ceria, diamond, or any combination thereof.

In an embodiment, the abrasive body can include at least 2 vol % abrasive particles for a total volume of the body or at least 5 vol %, or at least 10 vol %, or at least 15 vol %, or at least 20 vol %, or at least 25 vol %, or at least 30 vol %, or at least 35 vol %, or at least 40 vol %, or at least 45 vol %, or at least 50 vol %, or at least 55 vol %, or at least 60 vol %, or at least 65 vol %, or at least 70 vol %, or at least 75 vol %, or at least 80 vol %, or at least 85 vol %, or at least 90 vol %. In an embodiment, the body can include not greater than 95 vol % abrasive particles for a total volume of the body or not greater than 90 vol %, or not greater than 85 vol %, or not greater than 80 vol %, or not greater than 75 vol %, or not greater than 70 vol %, or not greater than 65 vol %, or not greater than 60 vol %, or not greater than 55 vol %, or not greater than 50 vol %, or not greater than 45 vol %, or not greater than 40 vol %, or not greater than 35 vol %, or not greater than 30 vol %, or not greater than 25 vol %, or not greater than 20 vol %, or not greater than 15 vol %, or not greater than 10 vol %, or not greater than 5 vol %. It will be appreciated that the vol % of abrasive particles can be between any of the minimum and maximum values noted above.

In an embodiment, the body can include a bond material or bond material precursor comprising an organic material or inorganic material or any combination thereof. In an embodiment, the bond material can comprise thermoplastics, thermosets, resins, or any combination thereof. In an embodiment, the bond material can comprise phenolic resin, polyimides, polyamides, polyesters, aramids, epoxies, or any combination thereof. In an embodiment, the bond material can comprise a transition metal element. In an embodiment, the bond material can comprise an amorphous phase, polycrystalline phase, or any combination thereof. In an embodiment, the bond material can comprise ceramic material, vitreous material, or any combination thereof, or wherein the ceramic material is polycrystalline, or wherein the vitreous material is amorphous. In an embodiment, the bond material can comprise an oxide. In an embodiment, the bond material can comprise an alumina-containing vitreous material. In an embodiment, the bond material can comprise silica-containing vitreous material. In an embodiment, the bond material can comprise at least one of alumina, silica, boron oxide, bismuth oxide, zinc oxide, barium oxide, magnesium oxide, calcium oxide, lithium oxide, sodium oxide, potassium oxide, cesium oxide, strontium oxide, zirconium oxide, manganese oxide, or any combinations thereof.

In an embodiment, an abrasive body can have a first surface having a first developed interfacial area ratio (Sdr1) and a second surface having a second developed interfacial area ratio (Sdr2). In an embodiment, Sdr1 can be greater than Sdr2. In another embodiment, Sdr1 can be less than Sdr2. In still another embodiment, the difference between Sdr1 and Sdr2 can be not greater than 25%, such as not greater than 20%, or not greater than 15%, or not greater than 10%, or not greater than 5%, or even not greater than 1%. In an embodiment, the first surface can be a transverse surface relative to the build direction of the abrasive article.

In an embodiment, a certain percentage of the surface area of the body can be a relatively high Sdr surface. It will be understood that a surface with a relatively high Sdr has an Sdr greater than the average Sdr of the entire body. In an embodiment at least 5% of the exterior surface area of the body can be a relatively high Sdr surface, or at least 7%, or at least 10%, or at least 12%, or at least 14%, or at least 16%, or at least 20%, or at least 22%, or at least 24%, or at least 26%, or at least 28%, or at least 30%, or at least 32%, or at least 34%, or at least 36%, or at least 38%, or at least 40%, or at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%, or at least 72%, or at least 74%, or at least 76%, or at least 78%, or at least 80%, or at least 82%, or at least 84%, or at least 86%, or at least 88%, or at least 90%, or at least 93%, or at least 95%. In an embodiment not greater than 95% of the exterior surface area of the body can be a relatively high Sdr surface, or not greater than 93%, or not greater than 90%, or not greater than 88%, or not greater than 86%, or not greater than 84%, or not greater than 82%, or not greater than 80%, or not greater than 78%, or not greater than 76%, or not greater than 74%, or not greater than 72%, or not greater than 70%, or not greater than 68%, or not greater than 66%, or not greater than 64%, or not greater than 62%, or not greater than 60%, or not greater than 58%, or not greater than 56%, or not greater than 54%, or not greater than 52%, or not greater than 50%, or not greater than 48%, or not greater than 46%, or not greater than 44%, or not greater than 42%, or not greater than 40%, or not greater than 38%, or not greater than 36%, or not greater than 34%, or not greater than 32%, or not greater than 30%, or not greater than 28%, or at least 26%, or not greater than 24%, or not greater than 22%, or not greater than 20%, or not greater than 18%, or not greater than 16%, or not greater than 14%, or not greater than 10%, or not greater than 7%, or not greater than 5%. It will be appreciated that the percent of surface area with a relatively high Sdr can be between any of the minimum and maximum values noted above.

In an embodiment, the first surface may have a particular Sdr1 that may facilitate improved performance and/or manufacturing of the abrasive article. In an embodiment, Sdr1 may be at least 40%, or at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%. In another embodiment, Sdr1 is not greater than 140%, or not greater than 135%, or not greater than 130%, or not greater than 125%, or not greater than 120%, or not greater than 115%, or not greater than 110%, or not greater than 105%, or not greater than 100%, or not greater than 95%, or not greater than 90%, or not greater than 85%, or not greater than 80%. It will be appreciated that Sdr1 will be between any of the minimum and maximum values noted above.

In an embodiment, the abrasive body may have a second surface with a particular Sdr2 that may facilitate improved performance of the abrasive article. In an embodiment, Sdr2 may be not greater than 110%, or not greater than 105%, or not greater than 100%, or not greater than 95%, or not greater than 90%, or not greater than 85%, or not greater than 80%, or not greater than 75%. In another embodiment, Sdr2 is at least 5%, at least 10%, at least 15%, at least 20%, at least 25%, at least 30%, or at least 35%, or at least 40%, or at least 45%. It will be appreciated that Sdr2 will be between any of the minimum and maximum values noted above.

In an embodiment, a first surface can have an Sdr1 that is different than the Sdr2 of a second surface by a particular amount that may facilitate improved manufacturing or performance of the abrasives article. In one non-limiting embodiment, Sdr1 can have a value that is greater relative to Sdr2. In an embodiment, the first surface can have an Sdr1 that is at least 1% different than Sdr2, or at least 2%, or at least 3%, or at least 4%, or at least 5%, or at least 6%, or at least 7%, or at least 8%, or at least 9%, or at least 10%, different than the Sdr2 of the second surface. In another embodiment, the first surface can have an Sdr1 that is not greater than 25% different than Sdr2, or not greater than 24%, or not greater than 23%, or not greater than 22%, or not greater than 21%, or not greater than 20%, or not greater than 19%, or not greater than 18%, or not greater than 17%, or not greater than 16%, or not greater than 15% different than Sdr2. It will be appreciated that the percent difference between Sdr1 and Sdr2 can be between any of the minimum and maximum values noted above. It will be appreciated that there may be more than two surfaces with different Sdr values, and the differences noted above in Sdr1 and Sdr2, can be equally applicable between two or more surfaces (e.g., exterior surfaces) of a body.

In an embodiment, the ratio of Sdr1:Sdr2 can be not greater than 1:2, or not greater than 1:1.9, or not greater than 1:1.8, or not greater than 1:1.7, or not greater than 1:1.6, or not greater than 1:1.5, or not greater than 1:1.4, or not greater than 1:1.3. In an embodiment, the ratio of Sdr1:Sdr2 can be at least 1:1.01, or at least 1:1.03, or at least 1:1.05.

In an embodiment, the first surface, optionally a working surface, may be oriented at a particular angle relative to the second surface. The angle can be at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90°. In another embodiment, the angle can be at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°. It will be appreciated that the angle between the first surface and the second surface may be between any of the minimum and maximum values noted above. In a non-limiting embodiment, the first surface and the second surface may be orthogonal to each other.

In an embodiment, the first surface may have a particular surface roughness (Sa1) that may facilitate improved performance and/or manufacturing of the abrasive body. In an embodiment, Sa1 may be at least 1 micron, or at least 1.5 microns, or at least 2 microns, or at least 2.5 microns, or at least 3 microns, or at least 3.5 microns, or at least 4 microns, or at least 4.5 microns, or at least 5 microns. In another embodiment, Sa1 may not be greater than 30 microns, not greater than 28 microns, not greater than 25 microns, not greater than 22 microns, not greater than 18 microns, or not greater than 15 microns. It will be appreciated that Sa1 may be between any of the minimum and maximum values noted above.

In an embodiment, the second surface may have a particular surface roughness (Sa2) that may facilitate improved performance and/or manufacturing of the abrasive body. In an embodiment, Sa2 may be at least 1 micron, at least 2 microns, at least 3 microns, at least 4 microns, or at least 5 microns. In another embodiment, Sa2 may not be greater than 25 microns, not greater than 23 microns, not greater than 21 microns, not greater than 19 microns, not greater than 17 microns, or not greater than 15 microns, or not greater than 14 microns, or not greater than 13 microns. It will be appreciated that Sa2 may be between any of the minimum and maximum values noted above.

In an embodiment, a first surface can have a Sa1 that is different than the Sa2 of a second surface by a particular amount that may facilitate improved manufacturing or performance of the abrasive article. In an embodiment, the first surface can have a Sa1 that is at least 0.2 microns different than the Sdr2 of the second surface, or at least 0.4 microns, or at least 0.6 microns, or at least 0.8 microns, or at least 1 micron. In another embodiment, the first surface can have a Sa1 that is not greater than 6 microns different than Sa2, or not greater than 5.5 microns, or not greater than 5 microns, or not greater than 4.5 microns, or not greater than 4 microns, or not greater than 3.5 microns, or not greater than 3 microns, different than Sa2. It will be appreciated that the percent difference between Sa1 and Sa2 can be between any of the minimum and maximum values noted above.

Figure 4A:
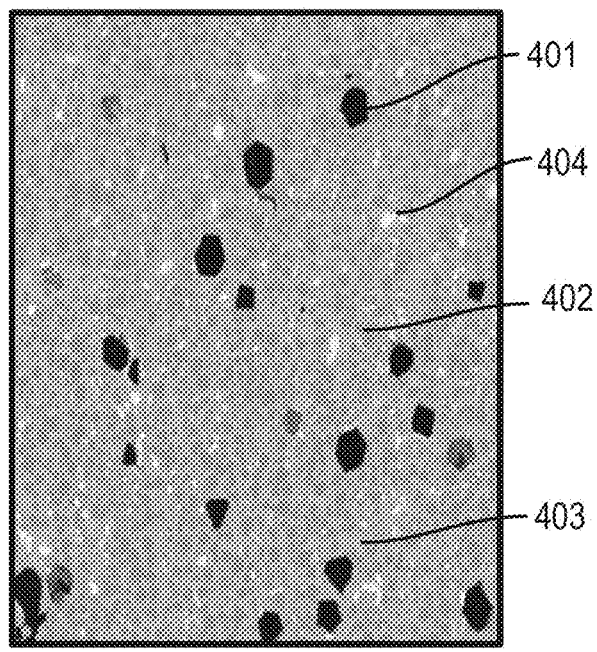
Figure 4B:
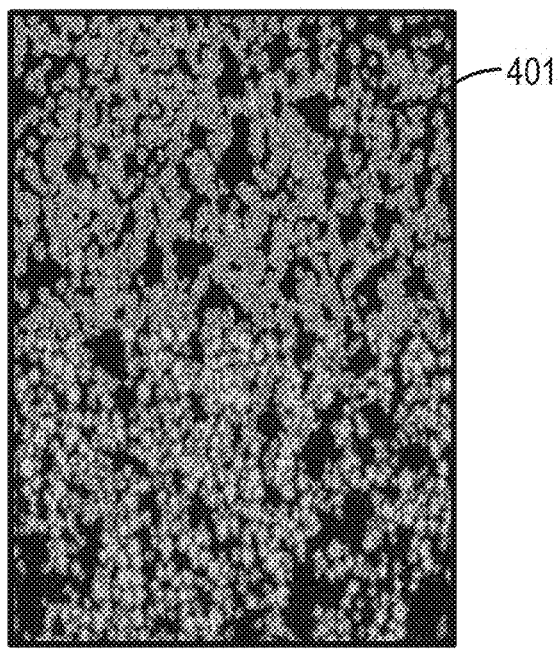
Figure 4C:
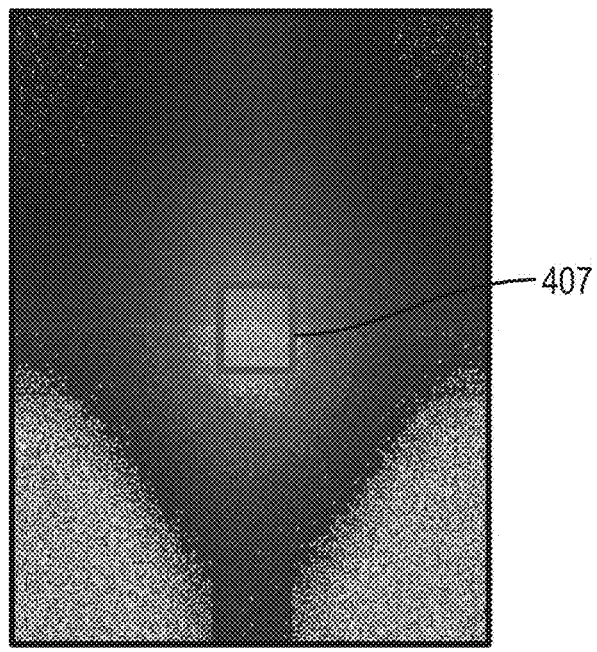
Figure 4D:
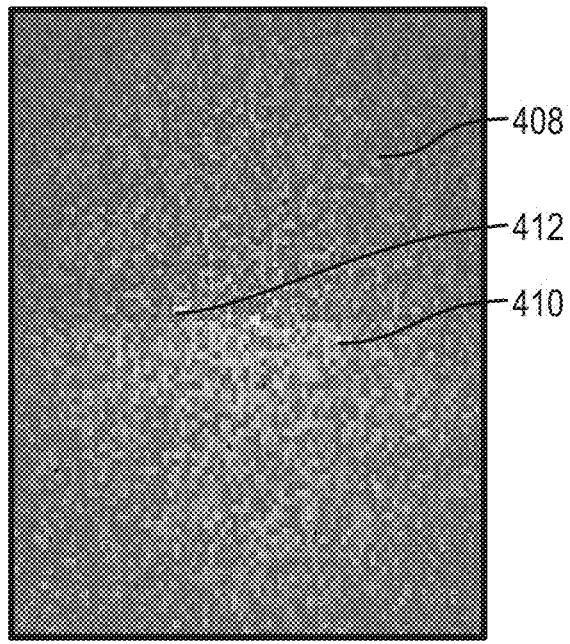

The frequency domain images are obtained by utilizing the Fourier Transform through Python to process the SEM images. Three SEM images of three cross sections of a bonded abrasive body are taken. FIGS. 4A to 4E include images of a cross-section of a body of a finally-formed abrasive article formed in accordance with an additive manufacturing technique. FIG. 4A includes a scanning electron microscopic image of a cross-section of a body. As illustrated, the abrasive body can include abrasive particles 401 joined by a bond matrix including a bond material 402 and an infiltrant material 403, and a filler material 404. FIG. 4A can be processed by adjusting the threshold such that only the bond material remains present in the image of FIG. 4B. FIG. 4C includes an image that has been further processed by focusing on the center, the brightest area, of FIG. 4B. FIG. 4D is an image of the magnified area within the box 407 in FIG. 4C. As illustrated in FIG. 4D, noise 408 is in greyscale, and frequency signals 410 and 412 have brightness above the noise. Removing the noise from FIG. 4D, a frequency domain image is generated and illustrated in FIG. 4E. The bright dot in the center is the zero-frequency component indicating the average brightness of the image in FIG. 4B, and the other two symmetrically distributed bright dots represent the frequency of the bond material 402. The Fast Fourier Transform value refers to the average number of dots other than the zero frequency components shown in frequency domain images of at least three cross-sectional images from the same body. For example, the Microstructure Feature value can be determined by dividing the sum of the number of dots that are not the center dot of each frequency domain image by the total number of the frequency domain images.

In a further embodiment, the Microstructure Feature value can include a Spacing Value. The abrasive body can include an average distance determined based on frequency domain images (i.e., the image of FIG. 4E) of at least three cross-sectional images of the body of an abrasive article. As used herein, the Spacing Value can be determined using the average distance. The average distance is an average value of the distance between the zero-frequency component (i.e., the center dot) and one other dot of frequency domain images of at least three cross-sections of the abrasive body. For example, the average distance can be calculated by dividing the total distance between the center dot and one other dot of each of the frequency domain images by the number of the distances that make up the total. The Spacing Value of an abrasive body can be a relative value that can be obtained by dividing the average distance of the abrasive body by the average distance of an abrasive body having layers having a printed thickness of 120 microns.

More particularly, the Spacing Value can be determined as follows. The bonded abrasive body includes layers having a printed thickness of 120 microns. All the SEM images are processed to obtain images illustrated in FIG. 4E. As illustrated in the frequency domain image of FIG. 4E, the distance from the center of the center dot to the center of one other dot is measured using Image J for each of the frequency domain images. The average of the 3 distances is calculated and referred to as Da1. The average distance is then divided by itself to have a Spacing Value of the body.

FIGS. 5A and 5B represent images from a bonded abrasive formed through conventional processing techniques of hot pressing. FIG. 5A is a cross-sectional SEM image processed in the same manner as noted above according to the Fast Fourier Transform to obtain the image of FIG. 5B. The Microstructure Feature value of the sample is 1.

Figure 6A:
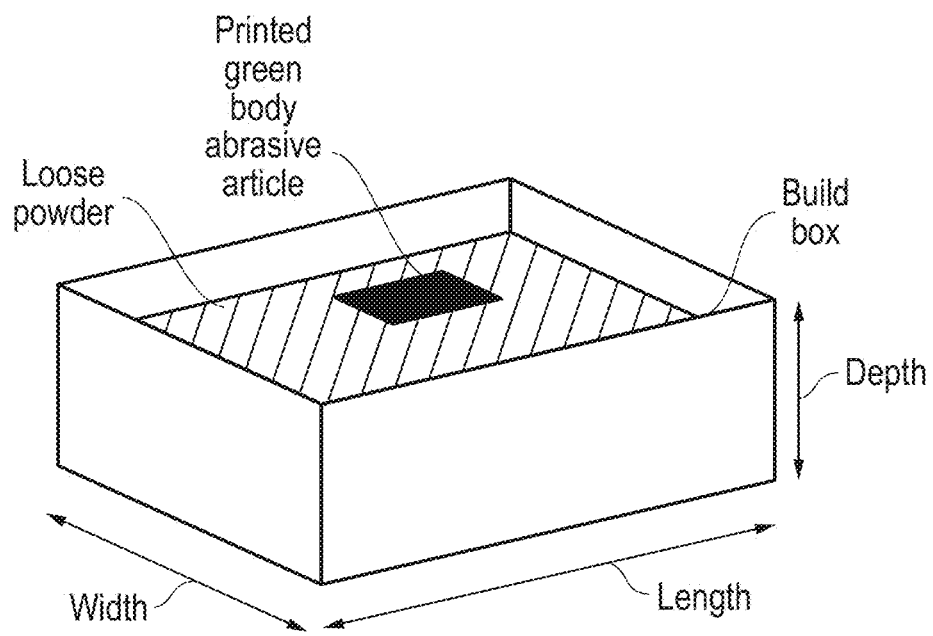
FIG. 6A includes an illustration of a build box including loose or unbound powder.

FIG. 6A includes an illustration of a build box including depowdered and/or dispensed powder with a printed green body abrasive article contained in the loose powder before it is extracted from the powder bed.

Figure 6B:
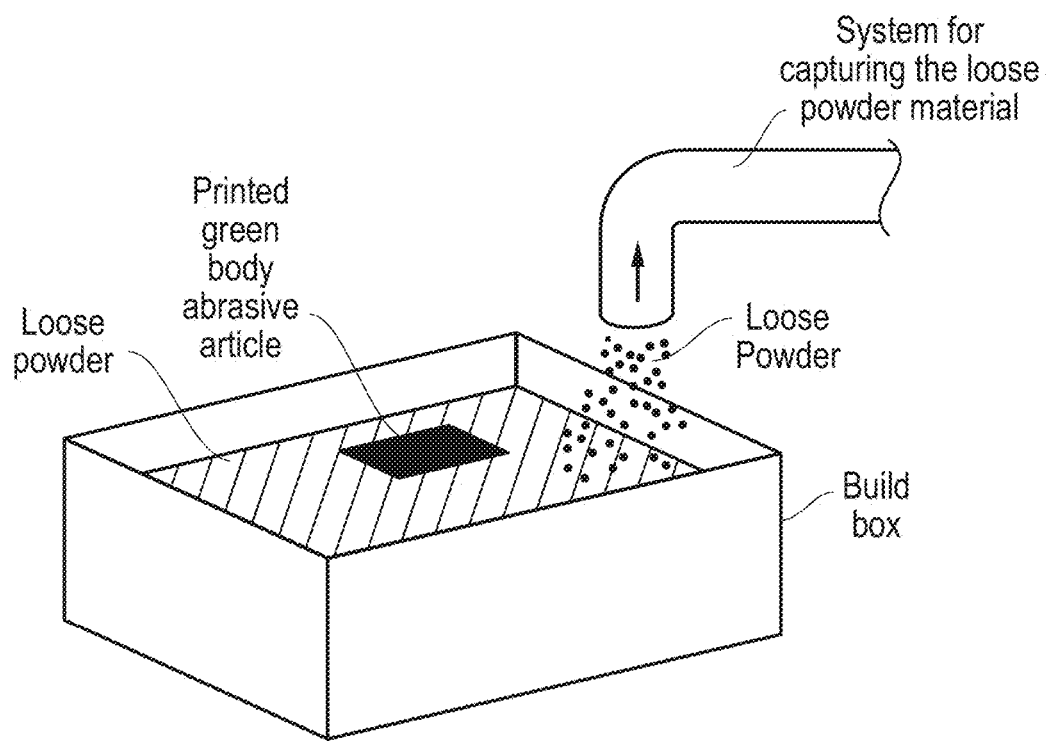
FIG. 6B includes an illustration of a process for capturing the loose powder after completing a forming operation.

FIG. 6B includes an illustration of a process for capturing the depowdered and/or dispensed powder after completing a forming operation to form the green body abrasive article. The depowdered and/or dispensed powder can be captured via suction or any other suitable means. The depowdered and/or dispensed powder can be stored in a container. Additionally, or alternatively, the depowdered and/or dispensed powder, which may include some content of organic materials from the forming process, may be treated to remove a certain content of organic materials. Accordingly, the depowdered and/or dispensed powder material can be recycled powder material that is suitable for use in a subsequent forming operation to form one or more green body abrasive articles.

Figure 6C:
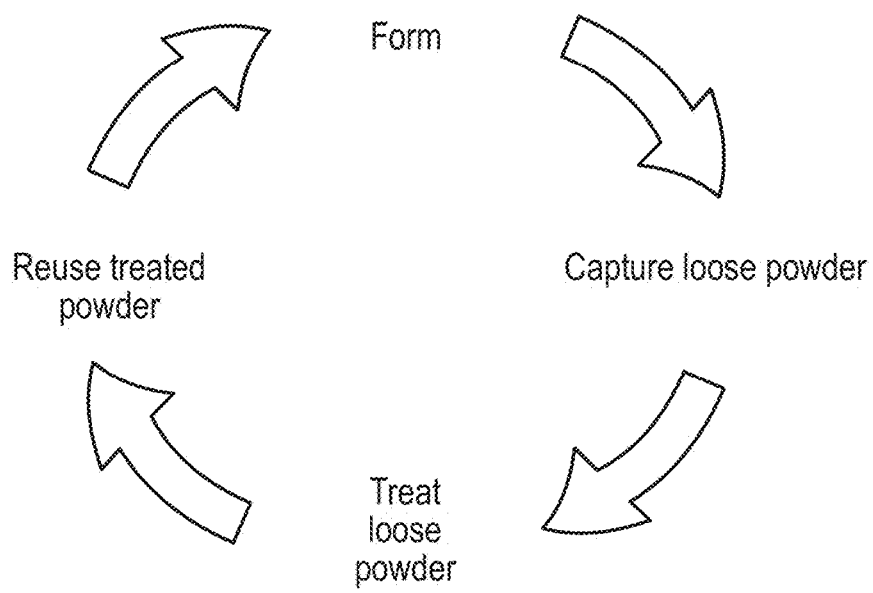
FIG. 6C is a graphic representation of the process for recycling the unused and loose powder material.

FIG. 6C is a graphic representation of the process for recycling the depowdered and/or dispensed powder material.

Figure 7A:
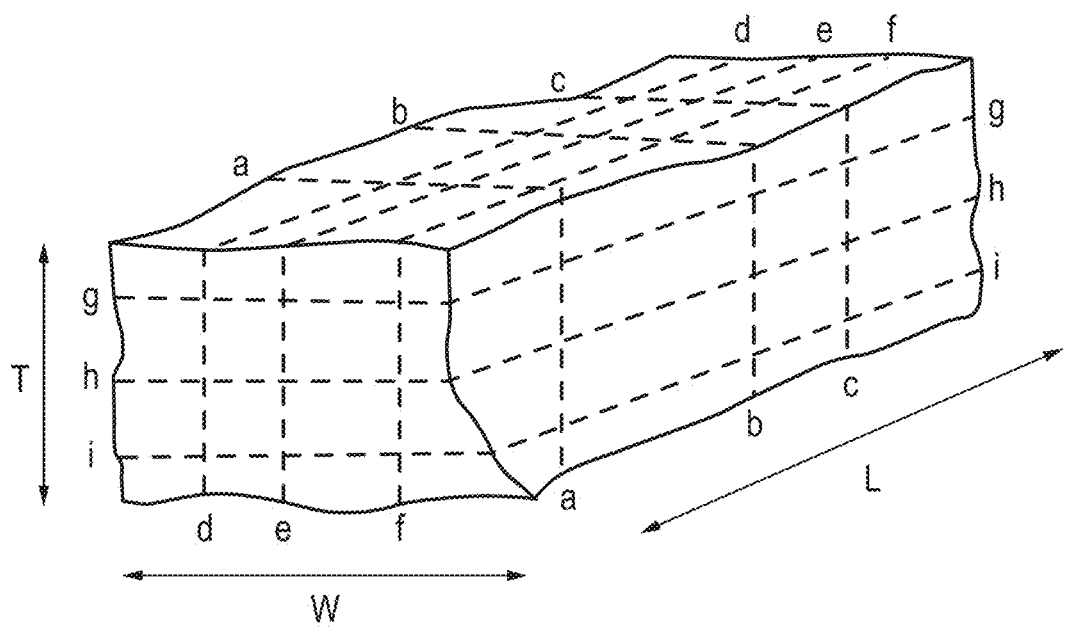
FIG. 7A is a perspective view illustration of a body of an abrasive article.
Figure 7B:
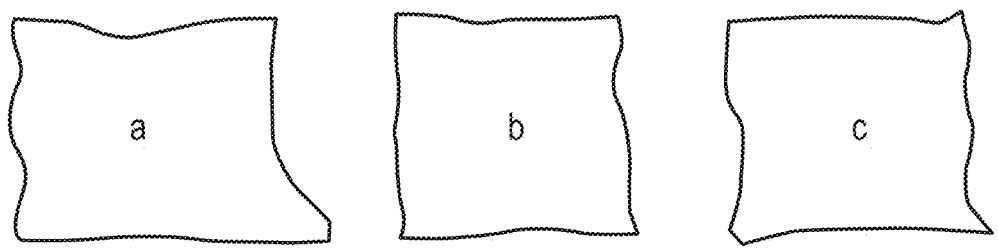
FIGS. 7B-D include cross-sectional images of the abrasive article of FIG. 7A.
Figure 7C:
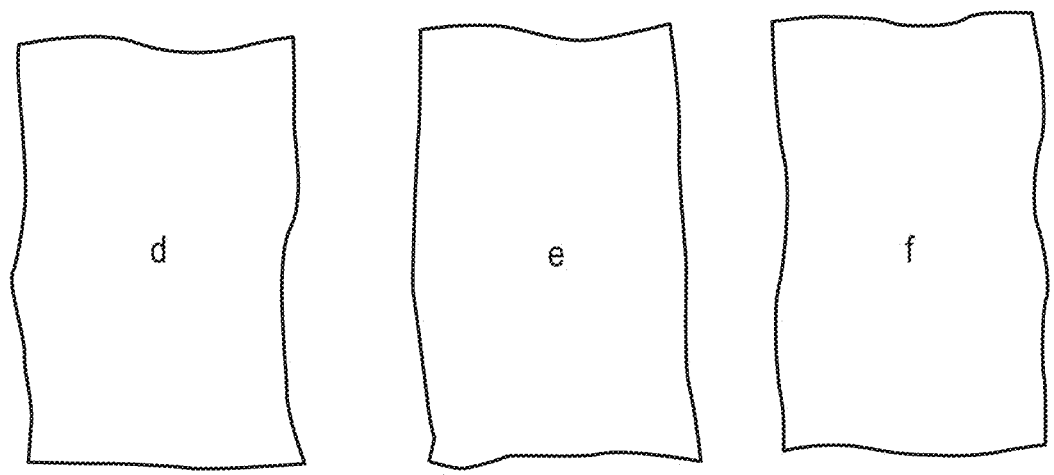
Figure 7D:
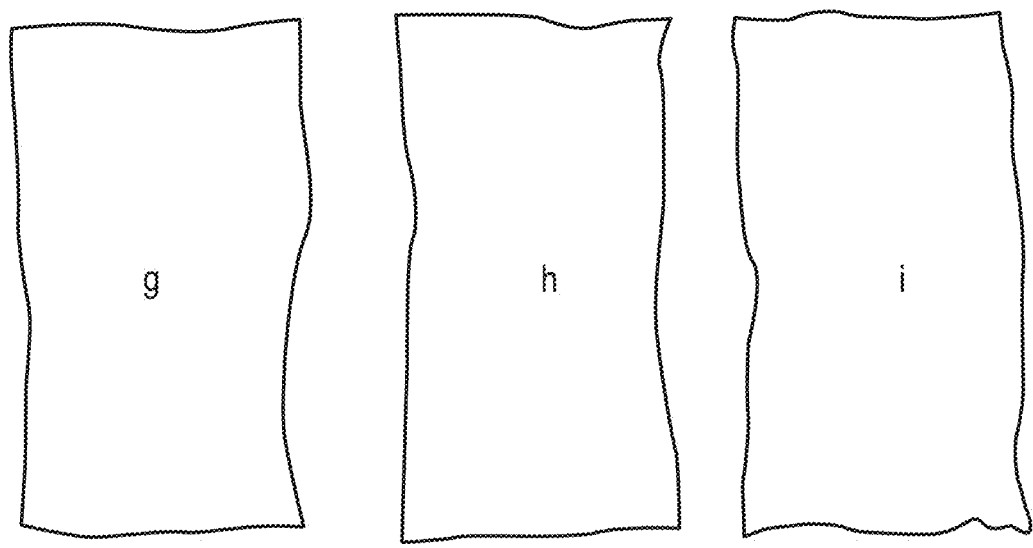

FIG. 7A is a perspective view illustration of a body of an abrasive article. As illustrated, the body has a length, width, and thickness and can be evaluated along any of these axes by destructive or non-destructive methods to evaluate one or more properties associated with the body. Such properties can include, but are not limited to, density variation-L, density variation-W, density variation-T, dimensional variation-L, dimensional variation-W, dimensional variation-T, hardness variation-L, hardness variation-W, hardness variation-T, MOR variation-L, MOR variation-W, MOR variation-T, MOE variation-L, MOE variation-W, and MOE variation-T. All dimension measurements were determined using calipers. When measuring dimensions Length>=Width>=Thickness. The batch dimensional variation-L is equal to the standard deviation of all length measurements in a batch divided by the average batch length. The batch dimensional variation-W and batch dimensional variation-T are calculated the same way using width and thickness, respectively. The Batch volume variation is the standard deviation of the volumes within a batch. Hardness measurements are taken according to hardness Rockwell test L. Hardness values were taken from the surface of the article that was compacted during manufacturing. Hardness variation is the standard deviation of hardness measurements taken on a single sample. Batch hardness variation is the standard deviation of hardness measurements taken across a batch of multiple samples. FIG. 7B includes three cross-sectional images of cross-sections "a," "b," and "c" along a length of the body. Such cross-sections can be generated by cutting the samples for evaluation of one or more properties claimed herein. Alternatively, the cross-sections may be generated from 3D scans of the body to evaluate certain dimensional features and evaluate the quality and consistency of the geometric features of the body. FIG. 7C includes three cross-sectional images of cross-sections "d," "e," and "f" along the width of the body. FIG. 7D includes three cross-sectional images of cross-sections "g," "h," and "i" along the thickness of the body. In certain instances, the difference in cross-sectional area of each of the cross-sections may be used to quantify the geometric quality of the body.

In still other embodiments, the abrasive article may be part of a batch, and wherein the batch of abrasive articles has a batch dimensional variation-L of at least 0.01 mm. In still other embodiments, the batch of abrasive articles can have a batch dimensional variation-L of less than 0.3 mm, such as less than 0.29 mm, or less than 0.28 mm, or less than 0.27 mm, or less than 0.26 mm, or less than 0.25 mm, or less than 0.24 mm, or less than 0.23 mm, or less than 0.22 mm, or less than 0.21 mm, or less than 0.20 mm, or less than 0.19 mm, or less than 0.18 mm, or less than 0.17 mm. It will be appreciated that the batch dimensional variation-L can be within a range, including any of the minimum and maximum values above.

In still other embodiments, the abrasive article may be part of a batch, and wherein the batch of abrasive articles has a normalized batch dimensional variation-L of not greater than 0.5% of the average length of the bodies as measured by (batch length standard deviation/average batch length)×100%, such as not greater than 0.45% of the average length of the bodies, or not greater than 0.40% of the average length of the bodies, or not greater than 0.35% of the average length of the bodies, or not greater than 0.30% of the average length of the bodies, or not greater than 0.25% of the average length of the bodies, or not greater than 0.20% of the average length of the bodies. In still other embodiments, the batch of abrasive articles can have a normalized batch dimensional variation-L of at least 0.001% of the average length of the bodies. It will be appreciated that the normalized batch dimensional variation-L can be within a range, including any of the minimum and maximum values above.

In still other embodiments, the abrasive article may be part of a batch, and wherein the batch of abrasive articles has a batch dimensional variation-W of less than 0.3 mm, such as less than 0.25 mm, or less than 0.2 mm, or less than 0.15 mm, or less than 0.1 mm. In still other embodiments, the batch of abrasive articles can have a batch dimensional variation-W of at least 0.001 mm. It will be appreciated that the batch dimensional variation-L can be within a range, including any of the minimum and maximum values above.

In still other embodiments, the abrasive article may be part of a batch, and wherein the batch of abrasive articles has a normalized batch dimensional variation-W of less than 1.2% of the width of the bodies as measured by (batch width standard deviation/average batch width)×100%, such as less than 1.1% of the width of the bodies, or less than 1.0% of the width of the bodies, or less than 0.9% of the width of the bodies, or less than 0.8% of the width of the bodies, or less than 0.7% of the width of the bodies, or less than 0.6% of the width of the bodies. In still other embodiments, the batch of abrasive articles can have a normalized batch dimensional variation-W of at least 0.001% of the average length of the bodies. It will be appreciated that the normalized batch dimensional variation-W can be within a range, including any of the minimum and maximum values above.

In still other embodiments, the abrasive article may be part of a batch, and wherein the batch of abrasive articles has a batch dimensional variation-T of less than 0.3 mm, such as less than 0.29 mm, or less than 0.28 mm, or less than 0.27 mm, or less than 0.26 mm, or less than 0.25 mm, or less than 0.24 mm, or less than 0.23 mm, or less than 0.22 mm, or less than 0.21 mm, or less than 0.20 mm, or less than 0.19 mm, or less than 0.18, mm or less than 0.17 mm. In still other embodiments, the batch of abrasive articles can have a batch dimensional variation-T of at least 0.001 mm. It will be appreciated that the batch dimensional variation-T can be within a range, including any of the minimum and maximum values above.

In still other embodiments, the abrasive article may be part of a batch, and wherein the batch of abrasive articles has a normalized batch dimensional variation-T of less than 9% as measured by (batch thickness standard deviation/average batch thickness)×100%, such as less than 8%, or less than 7%, or less than 6%. In still other embodiments, the batch of abrasive articles can have a normalized batch dimensional variation-T of at least 0.001%. It will be appreciated that the normalized batch dimensional variation-T can be within a range, including any of the minimum and maximum values above.

In still other embodiments, the abrasive article may be part of a batch, and wherein the batch of abrasive articles has a batch volume standard deviation. For example, the batch of abrasive articles can have a batch volume standard deviation of less than 23.5 $mm^3$ or less than 22 $mm^3$ or less than 21 $mm^3$ or less than 20 $mm^3$ or less than 19 $mm^3$ or less than 18 $mm^3$ or less than 17 $mm^3$ or less than 16 $mm^3$ or less than about 15 $mm^3$. In still other embodiments, the batch of abrasive articles can have a batch volume standard deviation of at least 1 mm³ or at least 2 mm³ or at least 3 mm³ or at least 4 mm³ or at least 5 mm³ or at least 6 mm³ or at least 7 mm³ or at least 8 mm³ or at least 9 mm³ or at least 10 mm³ or at least 11 mm³ or at least 12 mm³ or at least 13 mm³ or at least 14 mm³ or at least about 15 mm³. It will be appreciated that the batch volume standard deviation can be within a range, including any of the minimum and maximum values above.

In still other embodiments, the abrasive article may be part of a batch, and wherein the batch of abrasive articles has an average length L derived from multiple measurements from the batch of abrasive articles. For example, the batch of abrasive articles can have an average length L of at least 10 mm, such as at least 20 mm, or at least 30 mm, or at least 40 mm, or at least 50 mm, or at least 60 mm, or at least 70 mm, or at least 80 mm, or at least 90 mm, or at least 100 mm, or at least 110 mm, or at least 120 mm, or at least 130 mm. In still other embodiments, the batch of abrasive articles can have an average length L of not greater than 500 mm, such as not greater than 400 mm, or not greater than 300 mm, or not greater than 200 mm, or not greater than 150 mm. It will be appreciated that average length L can be within a range, including any of the minimum and maximum values above.

In still other embodiments, the abrasive article may be part of a batch, and wherein the batch of abrasive articles has an average width W derived from multiple measurements from the batch of abrasive articles. For example, the batch of abrasive articles can have an average width W of at least 1 mm, such as at least 2 mm, or at least 3 mm, or at least 4 mm, or at least 6 mm, or at least 8 mm, or at least 10 mm, or at least 15 mm, or at least 20 mm, or at least 30 mm. In still other embodiments, the batch of abrasive articles can have an average width W of not greater than 150 mm, such as not greater than 120 mm, or not greater than 100 mm, or not greater than 80 mm, or not greater than 60 mm, or not greater than 50 mm. It will be appreciated that average width W can be within a range, including any of the minimum and maximum values above.

In still other embodiments, the abrasive article may be part of a batch, and wherein the batch of abrasive articles has an average thickness T derived from multiple measurements from the batch of abrasive articles. For example, the batch of abrasive articles can have an average thickness T of at least 1 mm, such as at least 2 mm, or at least 3 mm, or at least 4 mm, or at least 5 mm, or at least 6 mm, or at least 7 mm, or at least 8 mm, or at least 9 mm, or at least 10 mm, or at least 12 mm, or at least 15 mm, or at least 20 mm. In still other embodiments, the batch of abrasive articles can have an average thickness T of not greater than 150 mm, such as not greater than 120 mm, or not greater than 100 mm, or not greater than 80 mm, or not greater than 60 mm, or not greater than 50 mm. It will be appreciated that average thickness T can be within a range, including any of the minimum and maximum values above. Additionally, as illustrated, the body has four major planar surfaces and two end surfaces. Any of the four major planar surfaces extending between the two smaller end surfaces can be used to evaluate certain properties as claimed herein, including, for example, but not limited to, nWarp, nFlatness, or nBow. The measurements for nWarp, nFlatness, and nBow can be measured by a detailed three-dimensional scan on the body via 3D tomography with X-ray radiation to create a representative three-dimensional model of the abrasive article. In the instance of the property nDimensional variation, multiple measurements at random locations between two opposing major planar surfaces can be made to evaluate the nDimensional variation. Such a measurement can be made in the dimension of thickness in a direction generally perpendicular to the plane defined by the length and width of the body. A multitude of randomly selected points on the first major surface are selected and the shortest distance to the second major surface through the body is recorded as a dimension. The dimensions are averaged to define the average Dimensional variation. The average is then normalized to the surface area of the first major surface. If one of the major surfaces is smaller than the other, the smaller surface is used. The nDimensional variation is the average value of the dimensional variation normalized (divided) by the area of the smaller of the major planar surfaces.

According to another embodiment, the body of an abrasive article, which may be in the form of a green body abrasive article or a finally-formed abrasive article may have a particular volumetric form factor that may be achieved through one or more forming processes of the embodiments herein and facilitate improved abrasive operations. In one embodiment, for a single abrasive article (green body or finally-formed body), the volumetric form factor can be a comparison between the shape of the body in three-dimensions as compared to an intended shape. In certain aspects, abrasive articles are intended to comply with strict dimensional tolerances, and deviations from the intended dimensional tolerances must be addressed by one or more methods, typically a post-forming subtractive process. In some instances, depending upon the severity of the deviation of the body from an intended shape, the body may be scrapped.

Figure 8A:
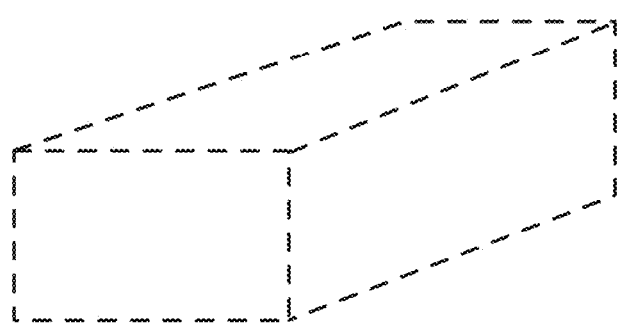
FIG. 8A includes a perspective view illustration of an intended shape of an abrasive article.
Figure 8B:
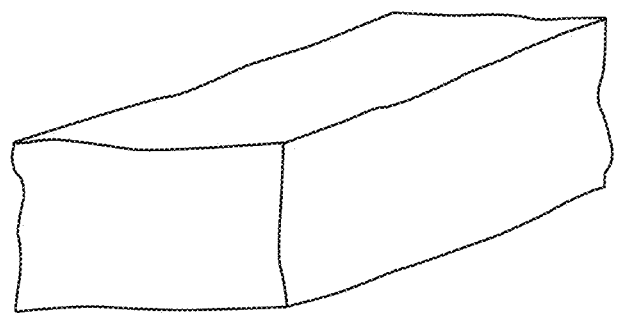
FIG. 8B includes a perspective view illustration of a formed abrasive article FIG. 8C includes a perspective view of a comparison of a formed abrasive article and an intended shape.
Figure 8C:
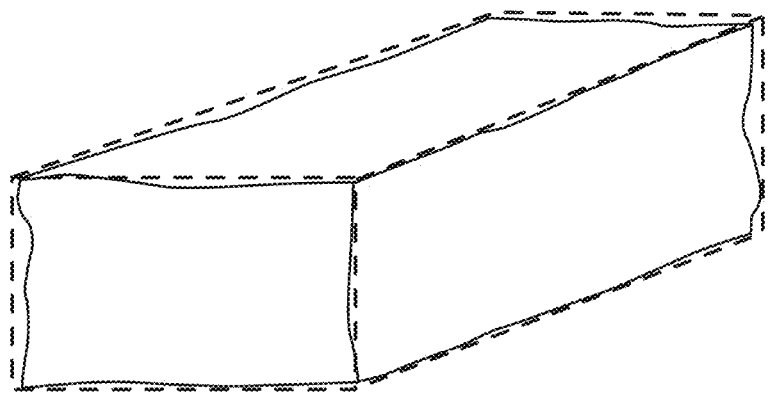

FIG. 8A includes a perspective view illustration of an intended shape of an abrasive article. The intended shape may be a well-known standard that may be stored as electronic data, such as in the form of a three-dimensional model on a computer-readable medium. FIG. 8B includes a perspective view illustration of a formed abrasive article. The volumetric form factor for a single abrasive article can be a value of how well the formed abrasive article (e.g., FIG. 8B) matches to the intended shape (e.g., FIG. 8A). One such comparison is illustrated as FIG. 8C.

According to one aspect, a detailed three-dimensional scan can be conducted on the body via 3D tomography with X-ray radiation to create a representative three-dimensional model of the abrasive article. The model of the abrasive article can be compared to the model of the intended shape. The model of the abrasive article can be compared to the model of the intended shape using slices of the body and measuring the deviations in one or more select planes through the model of the abrasive article. Additionally, or alternatively, the deviations between the two models may be evaluated for the whole of the volume.

Figure 9A:
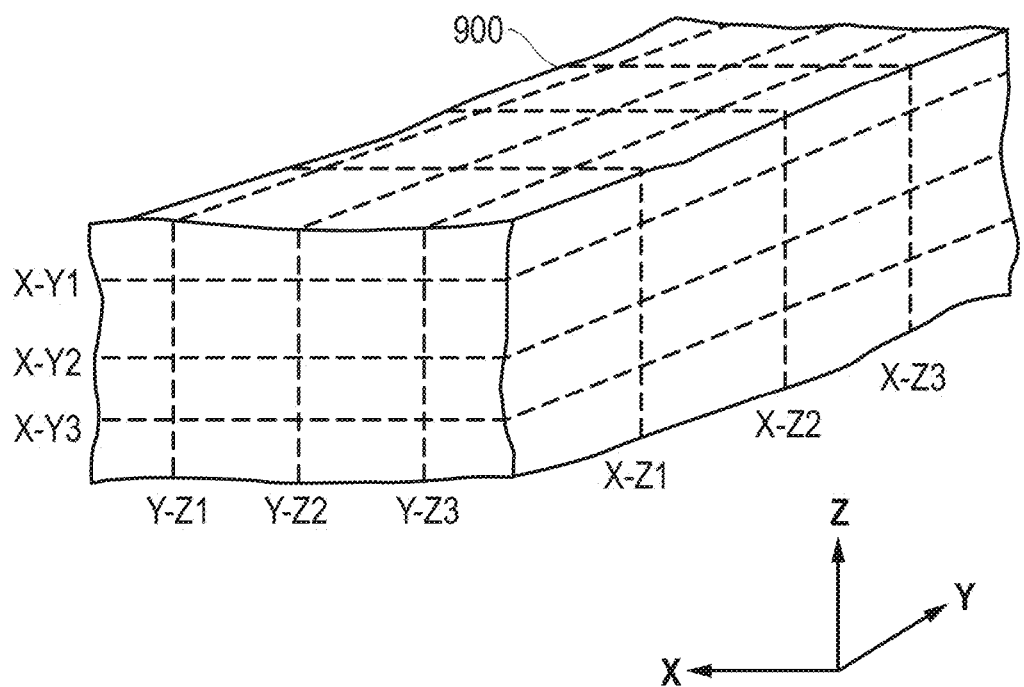
FIGS. 9A and 9B include scans of abrasive articles.
Figure 9B:
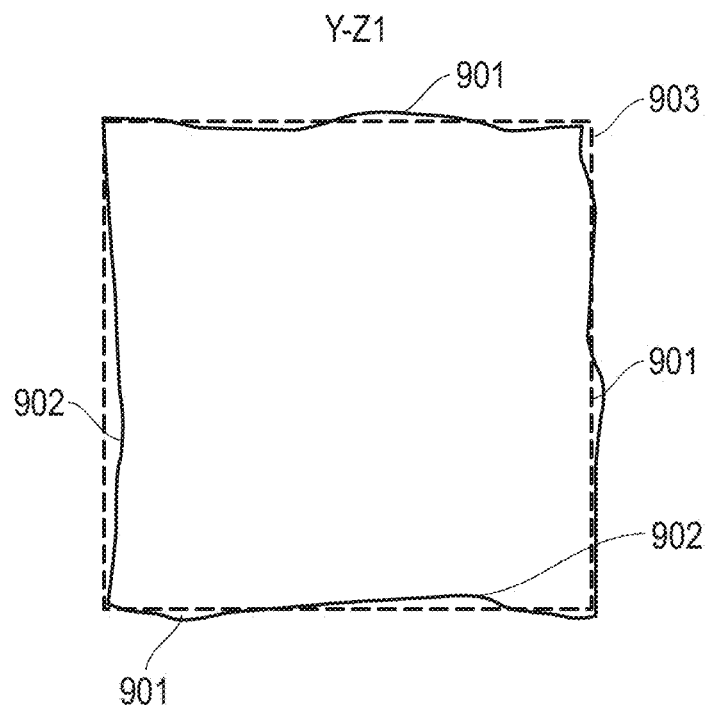

In one particular embodiment, at least three scans are completed in three different planes on the model of the abrasive article, as shown in FIG. 9A. FIG. 9A illustrates nine total planes, spaced apart from each other, and cutting through the model of the abrasive article 900 for the planes X-Y, X-Z, and Y-Z. The scanned images can be extracted as 2D images of the body and can be compared to corresponding 2D data (e.g., 903) from the model of the intended shape. Image analysis software can compare the differences in the 2D images of the abrasive article and intended shape and evaluate the difference in area between the images for each of the nine planes. As shown in FIG. 9B, an additional area 901 outside of an intended surface can be given a positive value. Negative area 902 on the model of the abrasive article relative to the model of the intended shape can be given a negative value. The total of positive and negative areas is summed for each scan. The values for each of the nine scans are averaged and recorded as the average volumetric form value of the model of the abrasive article. The volumetric form factor is calculated as the absolute value of the ratio of the average volumetric form value divided by the volumetric form value of the model of the intended shape. That is, $Vff=|Vav/Vmi|$, wherein Vff represents the volumetric form factor, Vav represents the average volumetric form value, and Vmi represents the volumetric form value of the model of the intended shape.

According to one embodiment, the Vff can be at least 0.1, such as at least 0.2, or at least 0.25, or at least 0.3, or at least 0.35, or at least 0.4, or at least 0.45, or at least 0.5, or at least 0.55, or at least 0.6, or at least 0.65, or at least 0.7, or at least 0.71, or at least 0.72, or at least 0.73, or at least 0.74, or at least 0.75, or at least 0.76, or at least 0.77, or at least 0.78, or at least 0.79, or at least 0.80, or at least 0.81, or at least 0.72, or at least 0.73, or at least 0.74, or at least 0.75, or at least 0.76, or at least 0.77, or at least 0.78, or at least 0.79, or at least 0.80, or at least 0.81, or at least 0.82, or at least 0.83, or at least 0.84, or at least 0.85, or at least 0.86, or at least 0.87, or at least 0.88, or at least 0.89, or at least 0.90, or at least 0.91, or at least 0.92, or at least 0.93, or at least 0.94, or at least 0.95, or at least 0.96, or at least 0.97, or at least 0.98, or at least 0.99, or at least 1.0, or at least 1.01, or at least 1.02, or at least 1.03, or at least 1.04, or at least 1.05, or at least 1.06, or at least 1.07, or at least 1.08, or at least 1.09, or at least 1.10, or at least 1.11, or at least 1.12, or at least 1.13, or at least 1.14, or at least 1.15, or at least 1.16, or at least 1.17, or at least 1.18, or at least 1.19, or at least 1.20, or at least 1.21, or at least 1.22, or at least 1.23, or at least 1.24, or at least 1.25, or at least 1.26, or at least 1.27, or at least 1.28, or at least 1.29, or at least 1.30, or at least 1.31, or at least 1.32, or at least 1.33, or at least 1.34, or at least 1.35, or at least 1.36, or at least 1.37, or at least 1.38, or at least 1.39, or at least 1.40, or at least 1.45, or at least 1.50, or at least 1.55, or at least 1.60, or at least 1.65, or at least 1.70, or at least 1.75, or at least 1.80, or at least 1.85, or at least 1.90, or at least 1.95, or at least 2.00. Still, in a non-limiting embodiment, the Vff can be not greater than 10, such as not greater than 9.5, or not greater than 9, or not greater than 8.5, or not greater than 8, or not greater than 7.5, or not greater than 7, or not greater than 6.5, or not greater than 6, or not greater than 5.5, or not greater than 5, or not greater than 4.5, or not greater than 4, or not greater than 3.5, or not greater than 3, or not greater than 2.5, or not greater than 2, or not greater than 1.5, or not greater than 1.45, or not greater than 1.40, or not greater than 1.39, or not greater than 1.38, or not greater than 1.37, or not greater than 1.36, or not greater than 1.35, or not greater than 1.34, or not greater than 1.33, or not greater than 1.32, or not greater than 1.31, or not greater than 1.30, or not greater than 1.29, or not greater than 1.28, or not greater than 1.27, or not greater than 1.26, or not greater than 1.25, or not greater than 1.24, or not greater than 1.23, or not greater than 1.22, or not greater than 1.21, or not greater than 1.20, or not greater than 1.19, or not greater than 1.18, or not greater than 1.17, or not greater than 1.16, or not greater than 1.15, or not greater than 1.14, or not greater than 1.13, or not greater than 1.12, or not greater than 1.11, or not greater than 1.10, or not greater than 1.09, or not greater than 1.08, or not greater than 1.07, or not greater than 1.06, or not greater than 1.05, or not greater than 1.04, or not greater than 1.03, or not greater than 1.02, or not greater than 1.01, or not greater than 1.00, or not greater than 0.99, or not greater than 0.98, or not greater than 0.97, or not greater than 0.96, or not greater than 0.95, or not greater than 0.94, or not greater than 0.93, or not greater than 0.92, or not greater than 0.91, or not greater than 0.90, or not greater than 0.89, or not greater than 0.88, or not greater than 0.87, or not greater than 0.86, or not greater than 0.85, or not greater than 0.84, or not greater than 0.83, or not greater than 0.82, or not greater than 0.81, or not greater than 0.80, or not greater than 0.79, or not greater than 0.78, or not greater than 0.77, or not greater than 0.76, or not greater than 0.75, or not greater than 0.74, or not greater than 0.73, or not greater than 0.72, or not greater than 0.71, or not greater than 0.70. It will be appreciated that the Vff can be within a range including any of the minimum and maximum values noted above, including, for example, but not limited to at least 0.10, and not greater than 10, or within a range of at least 0.50, and not greater than 1.50, or within a range of at least 0.80, and not greater than 1.2, or within a range including at least 0.90, and not greater than 1.10, or even within a range including at least 0.95, and not greater than 1.05.

According to another aspect, a batch of abrasive articles, which may be green body abrasive articles, or finally-formed abrasive articles, may have a particular batch volumetric form factor variation. The batch volumetric form factor variation (batch Vff) can be the standard deviation of the volumetric form factor for a batch of abrasive articles. According to one embodiment, the batch Vff can be not greater than 0.30, such as not greater than 0.25, or not greater than 0.20, or not greater than 0.18, or not greater than 0.16, or not greater than 0.14, or not greater than 0.12, or not greater than 0.10, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01, or not greater than 0.009, or not greater than 0.008, or not greater than 0.007, or not greater than 0.006, or not greater than 0.005. Still, in one non-limiting embodiment, the batch Vff can be at least 0.00001, or at least 0.0001, or at least 0.0005, or at least 0.001, or at least 0.01, or at least 0.1, or at least 0.2, or at least 0.4, or at least 0.6. It will be appreciated that the batch Vff can be within a range including any of the minimum and maximum values noted above, including, for example, but not limited to within a range of at least 0.00001, and not greater than 0.3, such as within a range of at least 0.00001 and not greater than 0.2, or within a range of at least 0.00001 and not greater than 0.05, or even within a range of at least 0.00001 and not greater than 0.01.

It will be appreciated that a single forming operation may form a plurality of discrete green body abrasive articles, which can be formed into a plurality of finally-formed abrasive articles. A plurality of abrasive articles may be referred to as a batch of abrasive articles and may be green bodies or finally-formed abrasive articles. In one embodiment, the abrasive articles of a batch can be formed in a single forming process within the same build box. The properties noted in the foregoing and claimed herein can be used to evaluate the abrasive articles on a batch basis. That is, evaluation of one or more geometric features and/or properties of each body within a batch can be compared to evaluate the quality of a batch as a whole. According to one embodiment, a batch may include a certain minimum size or volume of material, such as described in any of the embodiments herein. In another non-limiting embodiment, a batch may include a plurality of abrasive articles formed in a single additive manufacturing build cycle, which may include a plurality of abrasive articles (green or finally-formed) that are formed in the same build box during the same build cycle.

The embodiments herein are based on empirical studies. Significant challenges exist when using certain additive manufacturing processes, including, for example, binder jetting to form abrasive articles on a commercial scale.

While prior disclosures have disclosed the formation of abrasive articles via additive manufacturing, such products are not widely available because of the notable difficulties in scaling the process. The embodiments here are specifically developed based on empirical studies to advance the technology of additive manufacturing into a commercially viable option.

According to one aspect, the embodiments include a method for forming a batch of abrasive articles, particularly in the context of commercial-scale-sized batches that may also include large-sized abrasive articles. According to a particular embodiment, the process can include a binder jetting operation that may include at least the steps of a) forming a plurality of green body abrasive articles defining a batch, wherein each of the green body abrasive articles comprises a precursor bond material and abrasive particles, wherein forming is conducted by: i) creating one or more layers of raw material powder (or otherwise referred to herein as powder material), ii) selectively dispensing a binder material onto portions of the layer, wherein the binder material, and iii) repeating at least steps i) and ii) to form a green abrasive article. The green body abrasive article and/or finally-formed abrasive articles can have any of the features in the claims or embodiments herein. For example, the abrasive article may have a certain size, shape and/or geometry, including, for example, but not limited to a volume of at least 9 $cm^3$ or a length of at least 6 cm.

The method for forming the abrasive article may include additional steps. For example, in one embodiment, the process for forming the layer can include forming a layer of powder material where the powder material includes a recycled powder. In still other embodiments, the powder blend can include a virgin powder material. In one embodiment, the virgin powder material can include powder material as described in embodiments herein, including, for example, abrasive particles and precursor bond material. In another embodiment, the recycled powder can have any of the features of recycled powder described herein. For example, in one embodiment, the recycled powder can be powder material that has been used in one or more prior additive manufacturing processes. For example, the recycled powder may include abrasive particles, precursor bond material, and one or more additives (e.g., binder material) used during the additive manufacturing process. In one instance, the recycled powder comes from depowdered and/or dispensed powder from a prior additive manufacturing process. In one non-limiting instance, the recycled powder may include some content of organic material, such as binder material included in the captured depowdered and/or dispensed powder material.

Figure 10:
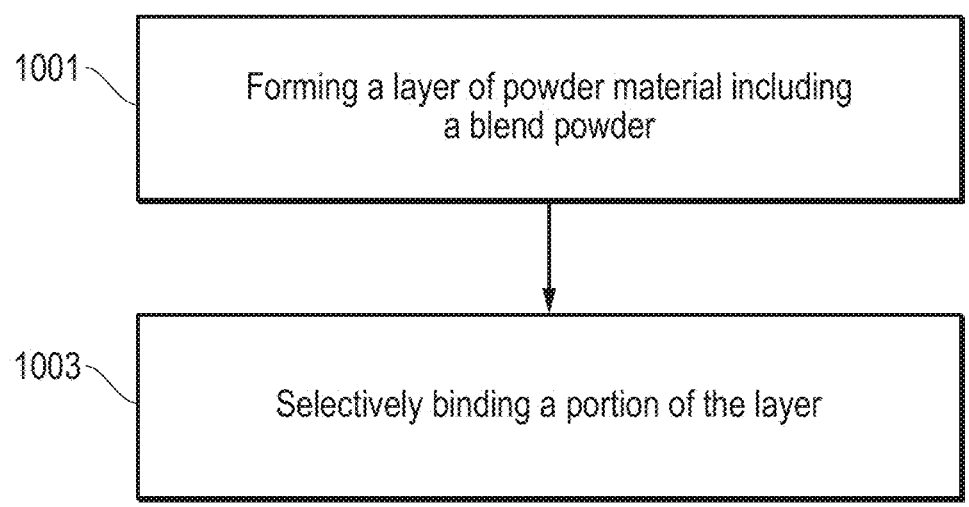
FIG. 10 includes a method for forming an abrasive article according to one embodiment.

FIG. 10 includes a method for forming an abrasive article according to one embodiment. The process may optionally include step 1001, which may include forming a layer of powder material, where the powder material includes a recycled powder. In still other embodiments, the powder material can include a powder blend. The powder blend can include recycled powder and virgin powder. The process for forming the layer can include any one or more features of any of the embodiments herein. It will be appreciated that any of the abrasive articles and/or batch of abrasive articles can have any one or a combination of features of any of the embodiments herein.

In one particular embodiment, the powder blend may include a particular content of the recycled powder and the virgin powder material for suitable large-scale manufacturing and control of product properties. In one particular embodiment, the powder blend may include at least 0.1 wt % recycled powder for a total weight of the powder blend, such as at least 0.5 wt % or at least 1 wt % or at least or at least 2 wt % or at least 5 wt % or at least 8 wt % or at least 10 wt % or at least 12 wt % or at least 15 wt % or at least 18 wt % or at least 20 wt % or at least 25 wt % or at least 30 wt % or at least 35 wt % or at least 40 wt % or at least 45 wt % or at least 50 wt % or at least 60 wt % or at least 70 wt % or at least 80 wt % or at least 90 wt %. Still, in one non-limiting embodiment, the powder blend may include not greater than 99 wt % recycled powder for a total weight of the powder blend, such as not greater than 95 wt % or not greater than 90 wt % or not greater than 85 wt % or not greater than 80 wt % or not greater than 70 wt % or not greater than 60 wt % or not greater than 50 wt % or not greater than 40 wt % or not greater than 30 wt % or not greater than 20 wt % or not greater than 10 wt %. It will be appreciated that the weight percent of the recycled powder in the powder blend can be within a range, including any of the minimum and maximum percentages noted above. In another embodiment, the green body abrasive article may include a content of recycled powder within a range, including any of the minimum and maximum percentages noted above as being relevant to the percentage of recycled powder present in the powder blend.

According to another non-limiting embodiment, the powder blend may include at least 0.1 wt % virgin powder for a total weight of the powder blend, such as at least 0.5 wt % or at least 1 wt % or at least or at least 2 wt % or at least 5 wt % or at least 8 wt % or at least 10 wt % or at least 12 wt % or at least 15 wt % or at least 18 wt % or at least 20 wt % or at least 25 wt % or at least 30 wt % or at least 35 wt % or at least 40 wt % or at least 45 wt % or at least 50 wt % or at least 60 wt % or at least 70 wt % or at least 80 wt % or at least 90 wt %. Still, in one non-limiting embodiment, the powder blend may include not greater than 99 wt % virgin powder for a total weight of the powder blend, such as not greater than 95 wt % or not greater than 90 wt % or not greater than 85 wt % or not greater than 80 wt % or not greater than 70 wt % or not greater than 60 wt % or not greater than 50 wt % or not greater than 40 wt % or not greater than 30 wt % or not greater than 20 wt % or not greater than 10 wt %. It will be appreciated that the weight percent of the virgin powder in the powder blend can be within a range, including any of the minimum and maximum percentages noted above. In another embodiment, the green body abrasive article may include a content of virgin powder within a range, including any of the minimum and maximum percentages noted above as being relevant to the percentage of virgin powder present in the powder blend.

According to another embodiment, the powder blend may include a particular balance of the recycled powder relative to the virgin powder. For example, in one non-limiting embodiment, the blend may include a blend ratio (Pr/Pv) of the weight percent of the recycled powder (Pr) and the weight percent of the virgin powder (Pv) that is at least 0.01, such as at least 0.02 or at least 0.03 or at least 0.04 or at least 0.05 or at least 0.06 or at least 0.07 or at least 0.08 or at least or at least 0.09 or at least 0.10 or at least 0.12 or at least 0.15 or at least 0.18 or at least 0.20 or at least 0.22 or at least 0.25 or at least 0.28 or at least 0.30 or at least 0.32 or at least 0.35 or at least or at least 0.38 or at least 0.40 or at least 0.5 or at least 0.6 or at least 0.7 or at least 0.8 or at least 0.9 or at least 1 or at least 1.1 or at least 1.2 or at least 1.5 or at least 2.0 or at least 3.0 or at least 4.0 or at least 5.0 or at least 6.0 or at least 7.0 or at least 8.0 or at least 9.0 or at least 10.0. Still, in another non-limiting embodiment, the blend may have a blend ratio (Pr/Pv) of the weight percent of the recycled powder (Pr) and the weight percent of the virgin powder (Pv) that is not greater than 1000, such as not greater than 800 or not greater than 500 or not greater than 200 or not greater than 100 or not greater than 90 or not greater than 80 or not greater than 70 or not greater than 60 or not greater than 50 or not greater than 40 or not greater than 30 or not greater than 20 or not greater than 15 or not greater than 10 or not greater than 8 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2. It will be appreciated that the blend ratio can be within a range, including any of the minimum and maximum values noted above.

In one embodiment, the powder blend may include a majority content of the recycled powder and virgin powder, such that the sum content of the recycled powder and virgin powder is greater than 50 wt % of the powder blend. In another embodiment, the sum of the weight percent of the recycled powder and virgin powder in the powder blend can be at least 60 wt % or at least 70 wt % or at least 80 wt % or at least 90 wt % or at least 95 wt %. In one particular embodiment, the powder blend may consist essentially of the recycled powder and virgin powder.

In another embodiment, the powder material, and the one or more layers of powder material that are formed during the additive manufacturing operation, may include a majority content of the powder blend. For example, in one instance, the powder material may include at least 55 wt % powder blend for a total weight of the powder material, such as at least 60 wt % or at least 70 wt % or at least 80 wt % or at least 90 wt % or at least 95 wt % of the powder material. In one non-limiting embodiment, the powder material consists essentially of the powder blend.

According to one embodiment, the recycled powder may have a particular content of organic material as described in any of the embodiments or claims herein. In one instance, the recycled powder includes at least 0.1 wt % organic material for a total weight of the recycled powder or at least 0.5 wt %, or at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %. In another non-limiting embodiment, the recycled powder includes not greater than 30 wt % organic material for a total weight of the recycled powder or not greater than 25 wt %, or not greater than 20 wt %, or not greater than 15 wt %, or not greater than 10 wt %, or not greater than 8 wt %, or not greater than 6 wt %, or not greater than 5 wt %. The recycled powder can have a content of organic material within a range, including any of the minimum and maximum percentages noted above. In one non-limiting embodiment, the organic material of the recycled powder is cured binder material used in a prior binding operation but not part of a green body abrasive article.

In one embodiment, the powder blend may include particular contents of virgin powder and recycled powder that may be based upon one or more powder characteristics of the recycled powder, virgin powder material and/or powder blend. For example, in one embodiment, the method may include measuring one or more powder characteristics prior to or during the process for forming a layer of powder material, including a powder blend. Examples of powder characteristics may include, but is not limited to, the content of the organic material in the recycled powder, a flowability characteristic of the blend, a flowability characteristic of the recycled powder, a flowability characteristic of the virgin powder, a relative humidity of the blend, a relative humidity of the recycled powder, a relative humidity of the virgin powder, or a combination thereof.

Without wishing to be tied to a particular theory, empirical studies conducted by the Applicants have indicated that the content of the virgin powder and recycled powder may be controlled to facilitate improved manufacturing. The recycled powder may have a different particle size distribution, relative humidity, chemistry, and/or flow characteristics as compared to the virgin powder. According to one embodiment, the one or more powder characteristics of the recycled powder, virgin powder, and/or powder blend can be measured to evaluate the powder characteristics of the powder blend to ensure suitable manufacturing.

In another non-limiting embodiment, after measuring, the process may optionally include treating the virgin powder, recycled powder and/or powder blend. Treating of the virgin powder, recycled powder, and/or powder blend can include any one or more treatments of powder material described herein. In one instance, treating can include thermally treating, chemically treating, mechanically treating, irradiating, or any combination thereof. In one non-limiting embodiment, the process of treating can include changing the relative humidity of at least one of the powder materials (i.e., virgin powder, recycled powder, and/or powder blend). According to one particular embodiment, the process may include heating at least one of the powder materials to change, such as decrease, the relative humidity and/or evolve organic materials, which may also change one or more flowability characteristics. For example, in one embodiment, the process can include measuring or calculating the relative humidity of the powder material prior to and/or during the deposition of the powder material into one or more layers. The value of the relative humidity or a flow characteristic that is used to calculate or approximate the relative humidity of the powder material may be used to control one or more process variables, including, for example, but not limited to layer thickness, percentage of compaction of the layer, the type of binder material used, the binder saturation, or any combination thereof.

In another instance, treating may include treating the recycled powder to form treated recycled powder that is different from the recycled powder. Treating of the recycled powder may be conducted to remove certain organic materials. In one instance, treating can include thermally treating, chemically treating, mechanically treating, irradiating, or any combination thereof. For example, in one embodiment, the recycled powder, and optionally the powder blend that also includes the virgin powder, may be thermally treated to reduce the organic materials. Thermally treating may include heating the powder to a suitable temperature to evolve the organic material. In another instance, treating may include washing the recycled powder with an organic material, such as alcohol, to reduce the content of organic material contained in the recycled powder and create a treated recycled powder.

The process of treating the recycled powder to create treated recycled powder is optional and is not necessarily required. However, in such embodiments where treating is used, the process may be suitable for removing a particular content of organic materials. For example, in one embodiment, treating includes removing at least 0.1 wt % of the organic material from the recycled powder to form a treated recycled powder to be used in a subsequent additive manufacturing operation to form a green body abrasive article. In other instances, the process of treating can remove at least 0.2 wt % of the organic material from the recycled powder to create the treated recycled powder, such as at least 0.3 wt % or at least 0.5 wt % or at least 1 wt % or at least 1.5 wt % or at least 2 wt % or at least 3 wt % or at least 4 wt % or at least 5 wt %. Still, in another non-limiting embodiment, treating can remove not greater than 99.9 wt % of the organic material from the recycled powder to create the treated recycled powder, such as not greater than 99 wt % or not greater than 98 wt % or not greater than 97 wt % or not greater than 96 wt % or not greater than 95 wt % or not greater than 90 wt % or not greater than 85 wt % or not greater than 80 wt % or not greater than 70 wt % or not greater than 60 wt % or not greater than 50 wt % or not greater than 40 wt % or not greater than 30 wt % or not greater than 20 wt % or not greater than 10 wt %. It will be appreciated that treating may remove a content of organic material within a range, including any of the minimum and maximum values noted above.

In light of the foregoing optional embodiments, one particular embodiment could include capturing depowdered and/or dispensed powder from a prior additive manufacturing process as recycled powder, treating the recycled powder to remove some organic materials from the recycled powder to form treated recycled powder, and using the treated recycled powder in a subsequent additive manufacturing process. In a more particular embodiment, using the treated recycled powder may include blending the treated recycled powder with virgin powder to create the powder blend. Additionally or alternatively, the method may also include measuring or calculating a relative humidity or flow characteristic of the treated recycled powder and blending the treated recycled powder and the virgin powder based on the measuring or calculating of the relative humidity or flow characteristic of the treated recycled powder. In one particular instance, the treated recycled powder may have a content of organic material that is the same as any of the minimum or maximum percentages of the organic material in the recycled powder as described herein.

In another embodiment, the process may include moving a compaction object over the one or more layers of powder material to apply a force sufficient to compact the layer to a compacted layer thickness that is less than the thickness of the layer prior to compaction. For example, in one embodiment, the process may include controlling at least one of: a) a force applied by a compaction object to the layer or a plurality of layers of powder material; b) a traverse speed of a compaction object; c) average thickness of the layer prior to compaction; d) a particle size distribution of the powder; e) number of previously formed layers underlying the layer of powder; f) the number of compacted layers underlying the layer of powder; g) the density of any layers underlying the layer of powder; h) the amount of binder in any layers underlying the layer of powder; i) the relative dimensions of the layer relative to one or more layers underlying the layer; and any combination of a)-i). In one particular embodiment, the compacting process may be controlled by the properties of the powder material, and more specifically, the powder blend. In one embodiment, any one of the items of a)-i) noted above can be controlled and/or altered based upon one or more properties of the powder blend, including, for example, but not limited to, the amount of the powder blend in the powder material, the amount of recycled powder, the type and/or content of organic material in the recycled powder, the particle size distribution of any one of the powders (i.e., virgin powder, recycled powder, powder blend), relative humidity of any one of the powders, one or more flow properties of any one of the powders, or any combination thereof.

Referring again to FIG. 10, the process may include selectively binding a portion of the layer of powder material at step 1003. As noted herein, the process may optionally include controlling a content of the recycled powder in the powder material based upon one or more characteristics of any of the powders in the powder material. However, it will be appreciated that the amount and type of recycled powder or treated recycled powder may warrant changes to other processes. For example, in one embodiment, information related to the amount and/or type of recycled powder in the powder material may be used to select the type of binder material used during selective deposition of the binder material. In another embodiment, information related to the amount and/or type of recycled powder may be used to select and/or alter the amount of binder (e.g., binder saturation) used to create the green body abrasive articles. In one embodiment, information related to the amount and/or type of recycled powder may be used to change the amount of binder selectively deposited onto a layer of the powder material.

According to one embodiment, the process may include converting the binder material to at least partially solidify the binder material and bind portions of powder material from the one or more layers. In one instance, selectively binding includes converting a binder material that is deposited only on certain portions of the one or more layers of powder material from a liquid to a solid or semi-solid state to bind particles of the powder material. The process of binding may optionally include at least one of evaporation, thermal curing, chemical curing, radiation curing, or any combination thereof. In certain instances, the binder material includes a liquid vehicle and a polymer material contained therein, wherein the polymer material can be dissolved in the liquid vehicle. In one particular case, the liquid vehicle may have one or more organic solvents and/or water. Exemplary but non-limiting organic solvents can include at least one of alcohols (e.g., butanol, ethylene glycol monomethyl ether), ketones, ethers, or any combination thereof. In one embodiment, the organic solvents may have a flash point above 100° C. Still, in another instance, one or more organic solvents may be configured to control drying speed of the liquid vehicle, to control surface tension of the liquid vehicle, or to allow dissolution of an ingredient (e.g., of a surfactant).

In one embodiment, the binder material may include a non-aqueous material. According to a particular embodiment, the binder material may be non-aqueous material. In another embodiment, the binder material may include a phenolic material. In yet a more particular embodiment, the binder material is a phenolic binder, such as, but not limited to, Product FB101EU available from ExOne. In another embodiment, the composition of the binder material may be selected based upon the wetting characteristics of the binder relative to the powder material.

Furthermore, in another aspect, the dispensing mechanism may also impact the one or more features of the abrasive article or batch of abrasive articles. According to one embodiment, the dispensing mechanism may have a binding at least a portion of the compacted layer with a printhead having a dispensing resolution of not greater than 55 picoliters, such as not greater than 50 picoliters or not greater than 45 picoliters or not greater than 40 picoliters or not greater than 35 picoliters or not greater than 30 picoliters or not greater than 25 picoliters or not greater than 20 picoliters, or not greater than 15 picoliters or not greater than 10 picoliters or not greater than 5 picoliters or not greater than 1 picoliter or not greater than 0.5 picoliters or not greater than 0.1 picoliters. Still, in another embodiment, the dispensing resolution of the printhead may be at least 0.0001 picoliters or at least 0.001 picoliters or at least 0.01 picoliters or at least 0.1 picoliters or at least 0.5 picoliters or at least 1 picoliter. It will be appreciated that the dispensing resolution of the printhead may be within a range including any of the minimum and maximum values noted above.

According to another embodiment, controlling the selective dispensing of the binder may include controlling the binder saturation. In one embodiment, too little binder saturation has been demonstrated as causing deformations such as layer shifting. Still, in another non-limiting embodiment, variable saturation of the green body, as evidenced by a change in the binder content in different portions of the body, may be done intentionally to facilitate suitable manufacturing. For example, in one non-limiting embodiment, the binder content may vary by at least 1% or at least 2% or at least 3% or at least 4% or at least 5% for a total length, a total width, or a total thickness of a body.

In some instances, the process may optionally include a compacting process using a compacting object. In one optional embodiment, the process may include compacting the layer of powder material by at least 1% and not greater than 99% of the average original layer thickness of the layer of raw material powder. For example, in one non-limiting embodiment, the process may include compacting the layer by at least 1.5% of the average original layer thickness (t) of the layer of raw material powder. Stated alternatively, the average compacted layer thickness (tc) may be at least 1.5% less than the average original layer thickness (t), such that tc≤tc−(0.015tc). According to another embodiment, the process may include compacting the layer of powder material by at least 2% of the average original layer thickness of the layer of raw material powder or at least 3% or at least 4% or at least 5% or at least 6% or at least 7% or at least 8% or at least 9% or at least 10% or at least 12% or at least 14% or at least 16% or at least 18% or at least 20% or at least 25% or at least 30% or at least 35% or at least 40% or at least 45% or at least 50% or at least 55% or at least 60% or at least 65% or at least 70% or at least 75% or at least 80% or at least 85%. Still, in another non-limiting embodiment, the process may include compacting the layer of powder material by not greater than 98% % of the average original layer thickness of the layer of raw material powder or not greater than 97% or not greater than 96% or not greater than 95% or not greater than 94% or not greater than 93% or not greater than 92% or not greater than 91% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15%. It will be appreciated that the process may include compacting the layer of powder material by a percentage within a range including any of the minimum and maximum percentages noted above, including, for example, but not limited to within a range of at least 1% and not greater than 90% or within a range including at least 2% and not greater than 85% or within a range including at least 5% and not greater than 70%.

According to another non-limiting aspect, the process may also include measuring or calculating a relative humidity or a flow characteristic of the powder material. For example, in one embodiment, the process can include measuring or calculating the relative humidity of the raw material powder material prior to and/or during the deposition of the powder material into one or more layers. The value of the relative humidity or a flow characteristic that is used to calculate or approximate the relative humidity of the powder material may be used to control the layer thickness and/or the percentage of compaction of the layer.

Figure 14:
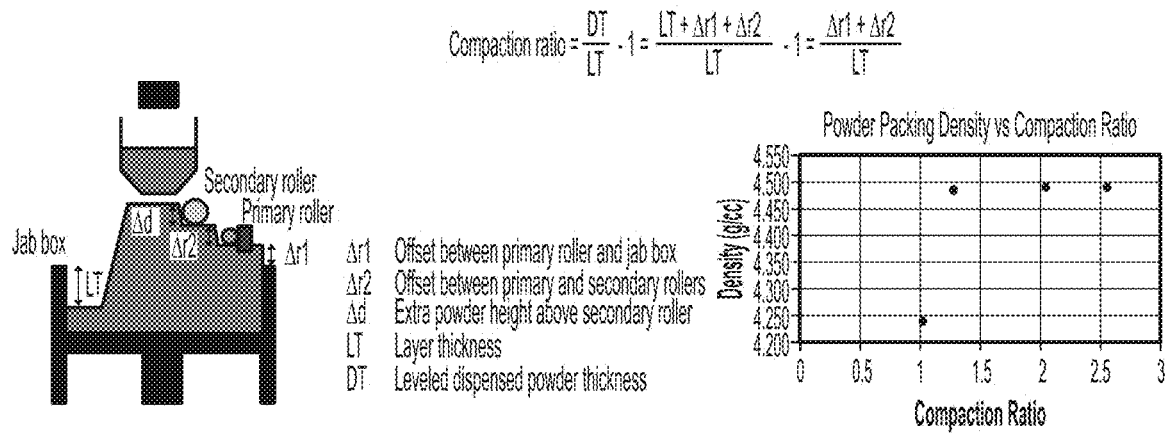
FIG. 14 includes a diagram of a method of forming an article according to an embodiment.
Figure 15:
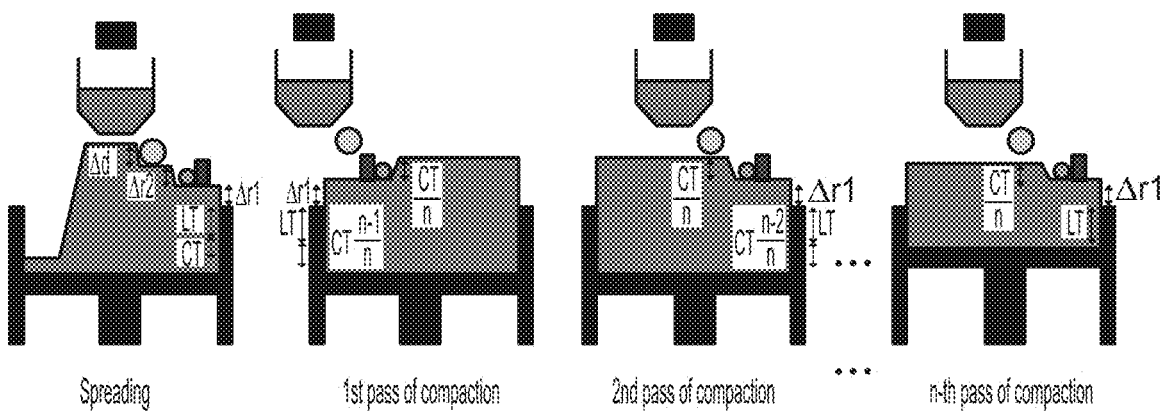
FIG. 15 includes a diagram of a method of forming an article according to an embodiment.

In another embodiment, the process may optionally include controlling one or more compaction object control variables based upon a characteristic or property of the raw material powder or the average original layer thickness. In one non-limiting aspect, the one or more compaction object control variables can include, but is not limited to a force applied by the compaction object on the layer or plurality of layers of powder material, a traverse speed of a compaction object, a size of the compaction object, a weight of the compaction object, the ratio of layer thickness (LT) to compaction thickness (CT) offset between the primary roller and job box (or build box) (Δr1), offset between primary and secondary rollers (Δr2), extra powder height above secondary roller (Δd), leveled dispensed powder thickness (DT), compaction ratio (DT/LT), or any combination thereof. FIGS. 14 and 15 provide illustrations to further illustrate some of the compaction object control variables. For example, in one non-limiting instance, the process may include controlling a compaction force of the compacting object based upon a relative humidity or a flow characteristic of the powder material. In another non-limiting embodiment, the process may include changing the compaction force based upon a measured change in a relative humidity or a flow characteristic of the powder material. In another embodiment, the process may include controlling a compaction ratio based upon a relative humidity or a flow characteristic of the powder material. In still another embodiment, the process may include changing a target compaction ratio based upon a measured change in a relative humidity or a flow characteristic of the powder material. In one embodiment, a stepped compaction process is preferred over a two-roller compaction process.

According to one aspect, the process may include selecting a target average layer thickness for one or more layers as they are formed before compacting, and selecting a compacting object control variable (e.g., compacting force, traverse speed, etc.) based upon the target average layer thickness for the one or more layers. In one particular embodiment, the process may include measuring the average original thickness of the layer of powder material after forming the layer of powder material, and comparing the target average layer thickness to the measured average layer thickness, and calculating a difference. In one non-limiting embodiment, the process may include changing the compaction force, translation speed, or other compacting object control variable based upon a difference in the measured average height and target average height. In one non-limiting embodiment, an alert is generated if the difference between the measured and target extend beyond a threshold value.

In still another embodiment, the process may include changing a compacting object control variable between a first compacting process and a second compacting process conducted at a different time relative to the first compacting process. For example, in one instance, the process can include conducting more than one compacting process, wherein the compacting processes can be conducted at different times. In one particular embodiment, the process may include forming a first layer of the raw material powder, compacting the first layer at a first time with a compacting object, forming a second layer of raw material powder after compacting the first layer at the first time, and compacting the second layer at a second time with a compacting object. According to one optional embodiment, the process of compacting the first layer can be different from the process of compacting the second layer based on one or more compacting object control variables.

According to one embodiment, the process can include forming an abrasive article (e.g., green body abrasive article) having a flexural strength suitable for handling. Flexural strength was calculated according to ASTM C1161-18. Flexural Strength Variation is the standard deviation of the Flexural Strength measurements within a batch.

For example, in one embodiment, the flexural strength can be at least 10 MPa as measured according to ASTM 1161. In another embodiment, the flexural strength may be not greater than 100 GPa. In one non-limiting embodiment, the flexural strength may be within a range, including any of the minimum and maximum values noted above.

According to another non-limiting embodiment, the process may further include forming an abrasive article (e.g., a green body abrasive article) with a particular shrinkage that may facilitate control of shape defects and/or microstructural defects. In one embodiment, the body may undergo a volume shrinkage of not greater than 20% of the volume of the green body as removed from the process and prior to significant drying as compared to the volume of the body after final treatment to create the finally-formed abrasive article. In still another embodiment, the volume shrinkage may be not greater than 18%, such as not greater than 15% or not greater than 12% or not greater than 10% or not greater than 8% or not greater than 6% or not greater than 4%. Shrinkage can be calculated as (green body volume-sintered body volume)/green body volume).

According to another embodiment, the abrasive article may be part of a batch, and wherein the batch of abrasive articles may undergo a volume shrinkage of at least 1 vol % during sintering such as at least 2 vol %, or at least 3 vol %, or at least 4 vol %, or at least 5 vol %, or at least 6 vol %, or at least 7 vol %, or at least 8 vol %, or at least 9 vol %, or at least 10 vol %. In still another embodiment, the batch of abrasive articles shrinks by less than 15 vol % during sintering, such as less than 14 vol %, or less than 13 vol %, or less than 12 vol %. It will be appreciated that the volume shrinkage of the batch of abrasive articles can be within a range, including any of the minimum and maximum values above.

It will be appreciated that the foregoing processes may be used to form a batch of abrasive articles, and wherein the resulting batch of abrasive articles can have any one or combination of features of any of the embodiments herein.

In still another embodiment, any one or more processes herein can be assisted, controlled-in-part, or controlled in entirety by one or more computing objects that include hardware and/or software. In such embodiments, the hardware and/or software may include capabilities to measure, evaluate, characterize, compare and/or control any one or more aspects of the process and/or products herein. In one embodiment, the hardware and/or software may utilize artificial intelligence, such as machine learning algorithms configured to evaluate and improve one or more aspects of the process and/or products. It will also be appreciated that the one or more computing objects can be communicatively coupled to one or more networks and/or the additive manufacturing apparatus. The computing objects can be configured to interface with one or more users and present modeling information and/or suggested changes to the process based upon evaluating one or more data sets having data related to the process variables, product characteristics and/or properties, and other historical data.

Figure 11:
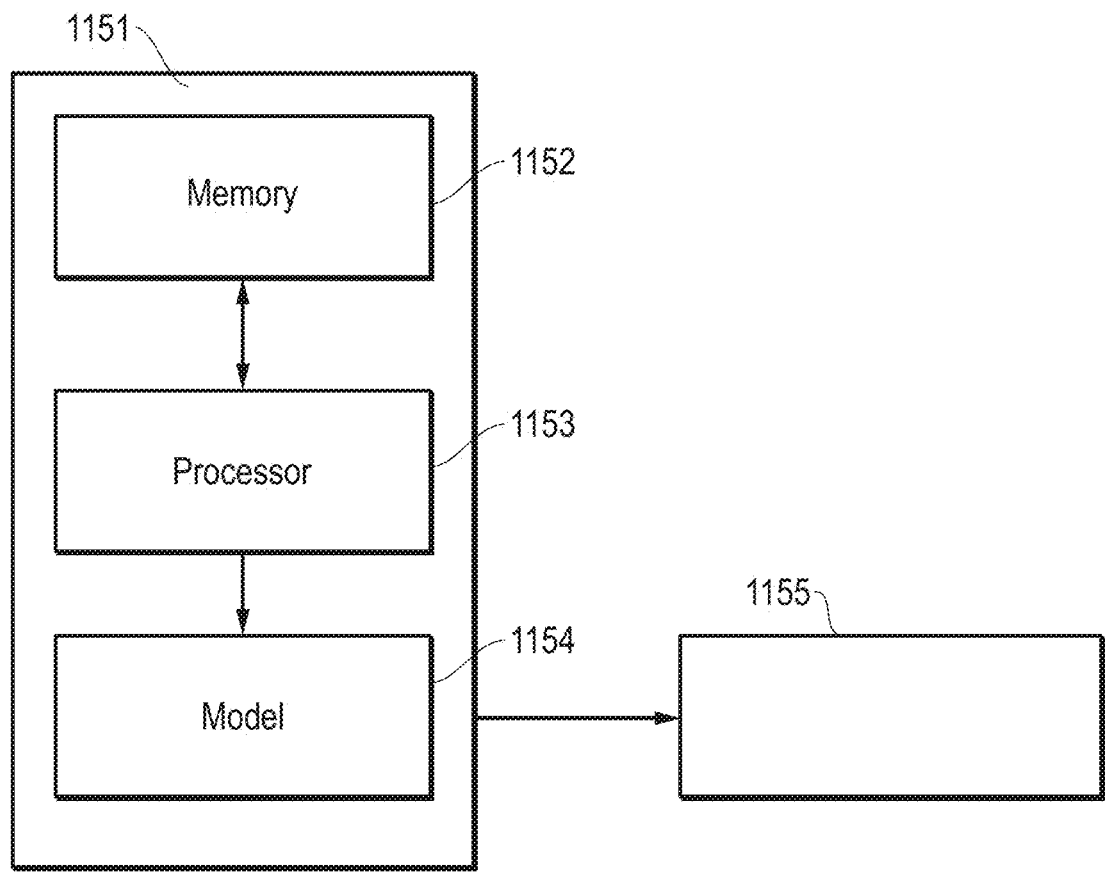
FIG. 11 includes a schematic of a system that may be used to facilitate formation of abrasive articles via additive manufacturing.

In certain instances, one or more aspects of the processes of the embodiments herein may be aided by a computing device. FIG. 11 includes a schematic of a system that may be used to facilitate formation of abrasive articles via additive manufacturing. FIG. 11 includes a computing device 1151, a memory 1152, a processor 1153, and a model 1154 that may be included as hardware or software in the computing device 1151. According to one embodiment, the memory 1152 and the processor 1153 may be communicatively coupled to an additive manufacturing apparatus and/or controller of an additive manufacturing device 1155 and configured to provide instructions or control one or more operations associated with the additive manufacturing process. For example, in one embodiment, the memory 1152 may store data related to the additive manufacturing process in a machine-readable format. In another embodiment, the processor 1153 may contain one or more computer programs that are configured to evaluate the data. In one non-limiting embodiment, the processor 1153 may be configured to compare the characteristic data of one or more of the abrasive articles to historical data to create a model 1154 for the batch of abrasive articles. According to another embodiment, a model for the batch of abrasive articles may be created based on the various aspects of the batch of abrasive articles (e.g., size, composition, target properties, raw material powder properties, characteristics, etc.), historical data, apparatus data (e.g., size of the build box, capabilities of the additive manufacturing apparatus), and the like.

In yet another embodiment, the model may be used to control the additive manufacturing process, including but not limited to the placement and orientation of the abrasive articles relative to each other as formed in the build box and even details used to control process parameters, such as any compacting object control variables. In one instance, the model may be a scheme or plan used to build a batch of abrasive articles, and in particular, may include data on the placement and/or orientation of the abrasive articles relative to each other during the additive manufacturing process. In one embodiment, the model can be in a machine-readable format and configured to be used by one or more controllers of the additive manufacturing process, including, for example, but not limited to, the movement and deposition characteristics of a printhead configured to selectively deposit binder material onto one or more layers of the powder material. In another non-limiting embodiment, the model can be in a machine-readable format and configured to be used by one or more controllers of the additive manufacturing process, including, for example, but not limited to the force and transversing speed of a compacting object relative to a layer of raw material powder. In one instance, the model may also be presented in a format suitable for a person to evaluate and confirm the proposed scheme or plan prior to it being implemented by the additive manufacturing system.

According to another embodiment, the process may include storing data related to one or more powder characteristics of the recycled powder, the powder blend and/or the virgin powder. In one aspect, the powder characteristics can be compared to historical data that may include data related to the powder characteristics from prior additive manufacturing operations. In another embodiment, a model may be created or adapted based upon one or more powder characteristics as compared to historical data. In another embodiment, the process may include using a computer program to evaluate one or more process controls of the additive manufacturing process, and more specifically, may include an adaptation of one or more additive manufacturing processing variables based upon the one or more powder characteristics of the recycled powder, the blend and/or the virgin powder.

In another non-limiting embodiment, the model may be developed or evolve via a machine learning algorithm or artificial intelligence. In one embodiment, the processor 1153 may use data related to the batch of abrasive articles to develop an initial model for forming the batch of abrasive articles. For another embodiment, the initial model may be compared to historical data, which may include data from prior models and data related to the resulting properties and characteristics of the abrasive articles formed therefrom. In certain optional instances, the processor 1153 may edit the initial model based on the historical data to develop a final model to be used to form the batch of abrasive articles.

According to one embodiment, the historical data may include information of prior additive manufacturing operations, including data related to the features of the abrasive articles and properties of the abrasive articles. In a more particular embodiment, data related to features of the abrasive articles may include data related to the size, shape, composition, and microstructure of the abrasive articles. In another non-limiting embodiment, the properties of the abrasive articles may include data related to the density, strength, hardness, modulus, or rupture (MOR), volumetric form factor, and any other properties of the green bodies or finally-formed bodies according to the embodiments herein.

In another aspect, the methods herein may be suitable for forming one or more (e.g., a plurality or batch) of abrasive articles. Such abrasive articles may be green body abrasive articles or finally-formed abrasive articles. According to one embodiment, the process may be used to form a batch or plurality of green body abrasive articles that may have a particular theoretical density, such as at least 50% or at least 51% or at least or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%. Still, in another non-limiting embodiment, the green body abrasive article may have a theoretical density of not greater than 99.9%, such as not greater than 99.5% or not greater than 99% or not greater than 96% or not greater than 94% or not greater than 90% or not greater than 85% or not greater than 80% or not greater than 75% or not greater than 70% or not greater than 65% or not greater than 60% or not greater than 55% or not greater than 50%. It will be appreciated that the green body abrasive article may have a theoretical density within a range, including any of the minimum and maximum percentages noted above.

Figure 12:
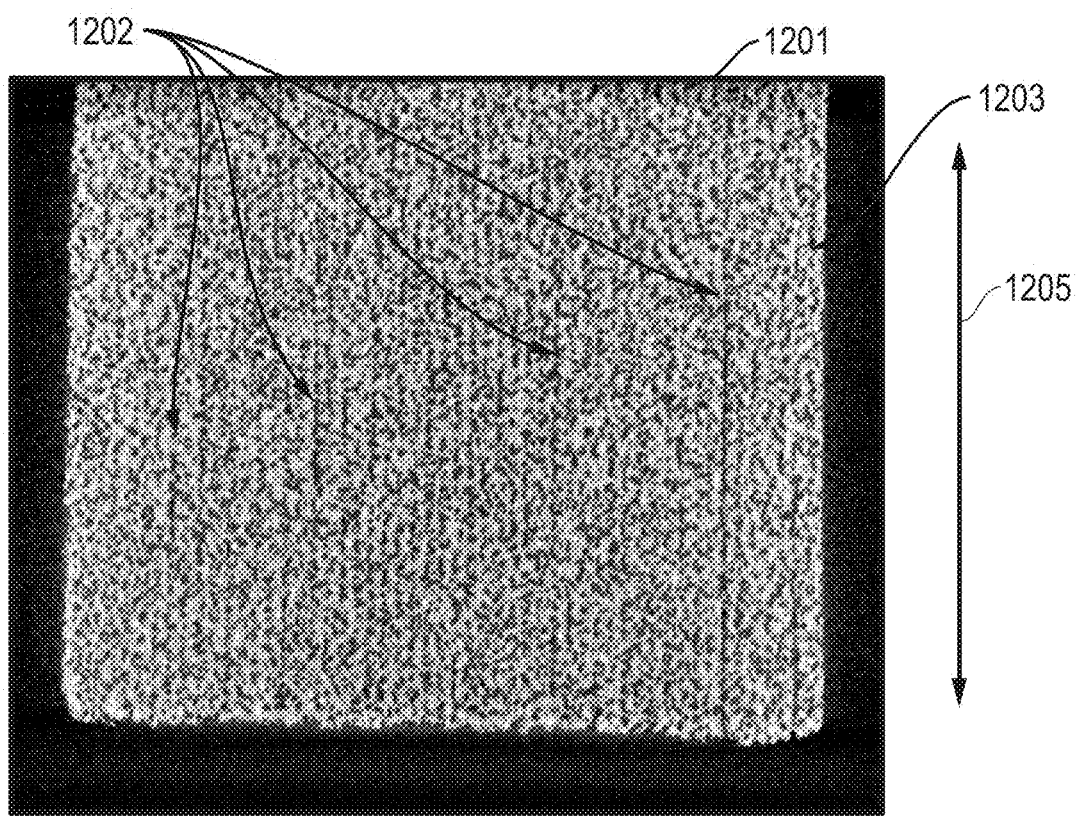
FIG. 12 includes a cross-sectional image of an abrasive article.
Figure 13:
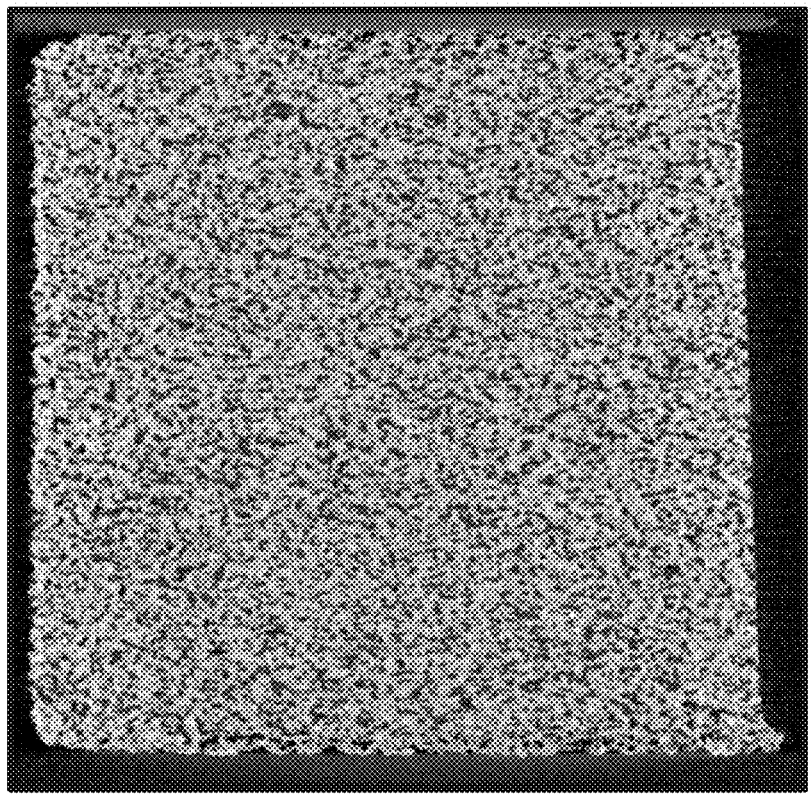
FIG. 13 includes a cross-sectional image of an abrasive article sample formed according to an embodiment.

In another aspect, the processes of the embodiments herein may facilitate formation of abrasive articles or batches of abrasive articles having a suitable microstructure. In one embodiment, the body of an abrasive article may have a particular Linear Feature Factor, which is a measure of the homogeneity of the microstructure. FIG. 12 includes a cross-sectional image of an abrasive article formed under certain conditions as provided in the Examples. As illustrated in FIG. 12, the cross-sectional image of the body of the abrasive article has evidence of lines associated with porosity that has been aligned substantially perpendicular to an applied force of compaction during the forming process. FIG. 13 includes a cross-sectional image of an abrasive article sample formed according to an embodiment having less evidence of lines of porosity extending through the body and having a more uniform microstructure and a different Linear Feature Factor.

The Linear Feature Factor can be measured according to the following sample preparation and testing conditions. The process would start with images taken in 3 planes, or alternatively, with X-ray CT scans of the body. Image analysis could be done in 3D or 2D. In one instance, the process includes picking a plurality of random points in the body (or plane) and then count the number and size of intersections with porosity. In an isotropic body, there would be no dependence of the average size/number of pores on the direction. Where there is an alignment of pores, the analysis demonstrates a statistically significant peak along certain directions.

In one aspect, a green body density can be measured. In an embodiment, the green body density is calculated by measuring the geometric volume of the body, including porosity and the weight of the body. The weight of the body is divided by the volume of the body to arrive at the green body density.

In one aspect, the abrasive article or batch of abrasive articles formed according to the embodiments herein may have suitable homogeneity of microstructure. In one embodiment, the body may be essentially free of one or more Linear Features as viewed in cross-section. For example, the body of the sample in FIG. 13 is essentially free of one or more Linear Features, whereas the body of the sample in FIG. 12 demonstrates a plurality of Linear Features. In certain instances, the Linear Features appear as lines or alignment of elongated pores giving the microstructure the appearance of layers or having lines as viewed in cross-section, which is a plane that is perpendicular to the length of the body.

In a particular embodiment, the abrasive articles can have a linear feature factor of at least 0.320 cm, such as at least 0.3251 cm, or at least 0.3302 cm, or at least 0.3353 cm, or at least 0.3404 cm, or at least cm or at least 0.3454 cm, or at least 0.3505 cm, or at least 0.3556 cm. In still other embodiments, the abrasive articles can have a linear feature factor of less than 2.54 cm, or less than 2.0 cm, or less than 1.5 cm, or less than 1.27 cm, or less than 1.02 cm, or less than 0.76 cm, or less than 0.508 cm, or less than 0.381 cm.

According to another embodiment, the body of an abrasive article may have a porosity. The porosity values are determined by the calculation (100*(1-geometric density/theoretical density)). The body of an abrasive article may have a porosity of at least 1 vol %, such as at least 5 vol %, or at least 10 vol %, or at least 15 vol %, or at least 20 vol %, or at least 22 vol %, or at least 24 vol %, or at least 26 vol %, or at least 28 vol %, or at least 30 vol %. In still other embodiments, the body of an abrasive article may have a porosity of less than 90 vol %, such as less than 80 vol %, or less than 75 vol %, or less than 70 vol %, or less than 60 vol %, or less than 50 vol %, such as less than 48 vol %, or less than 46 vol %, or less than 44 vol %, or less than 42 vol %, or less than 40 vol %. It will be appreciated that the body of an abrasive article can have a porosity within a range, including any of the minimum and maximum values above.

According to another embodiment, the abrasive article may be part of a batch, and wherein the batch of abrasive articles has an average batch porosity of at least 1 vol %, such as at least 5 vol %, or at least 10 vol %, or at least 15 vol %, or at least 20 vol %, or at least 22 vol %, or at least 24 vol %, or at least 26 vol %, or at least 28 vol %, or at least 30 vol %. In still other embodiments, the batch of abrasive articles may have an average batch porosity of less than 90 vol %, such as less than 80 vol %, or less than 75 vol %, or less than 70 vol %, or less than 60 vol %, or less than 50 vol %, such as less than 48 vol %, or less than 46 vol %, or less than 44 vol %, or less than 42 vol %, or less than 40 vol %. It will be appreciated that the batch of abrasive articles can have an average batch porosity within a range, including any of the minimum and maximum values above.

According to another embodiment, the body of an abrasive article may have a porosity standard deviation of less than 1 vol %, such as less than 0.9 vol %, or less than 0.8 vol %, or less than 0.7 vol %, or less than 0.6 vol %, or less than 0.5 vol %. In still other embodiments, the body of an abrasive article may have a porosity standard deviation of at least 0.001 vol %, such as at least 0.002 vol %, or at least 0.005 vol %, or at least 0.01 vol %. It will be appreciated that the body of an abrasive article can have a porosity standard deviation within a range, including any of the minimum and maximum values above.

According to another embodiment, the abrasive article may be part of a batch, and wherein the batch of abrasive articles has a batch porosity standard deviation measured by calculating the standard deviation in porosity of abrasive articles within a batch. The batch of abrasive articles can have a batch porosity standard deviation of less than 1 vol %, such as less than 0.9 vol %, or less than 0.8 vol %, or less than 0.7 vol %, or less than 0.6 vol %, or less than 0.5 vol %. In still other embodiments, the batch of abrasive articles may have a batch porosity standard deviation of at least 0.001 vol %, such as at least 0.002 vol %, or at least 0.005 vol %, or at least 0.01 vol %, or at least 0.05 vol %, or at least 0.1 vol %. It will be appreciated that batch of abrasive articles can have a batch porosity standard deviation within a range, including any of the minimum and maximum values above.

According to another embodiment, the body of an abrasive article or a batch of abrasive articles may have a particular type of porosity having a particular shape. In certain instances, it has been observed that elongated porosity may be created by certain compacting processes. In certain instances, the elongated porosity may be beneficial. However, in other instances, it may not be suitable. In one embodiment, the shape and orientation of the porosity in the body may be controlled by controlling the placement and/or orientation of the body relative to the compacting process.

In one embodiment, the abrasive article or batch of abrasive articles may have porosity having an average aspect ratio (L:W) of not greater than 100 as viewed in cross-section, such as not greater than 90 or not greater than 80 or not greater than 70 or not greater than 60 or not greater than 50 or not greater than 40 or not greater than 30 or not greater than 20 or not greater than 10. In one non-limiting embodiment, the average aspect ratio of the porosity as viewed in cross-section can be at least 1 or at least 1.2 or at least 1.5 or at least 1.8 or at least 2 or at least 2.5 or at least 3 or at least 3.5 or at least 4. It will be appreciated that the average aspect ratio can be within a range, including any of the minimum and maximum values noted above.

The average aspect ratio of the porosity in the body may be evaluated by obtaining 3 or more randomly selected cross-sectional images and using imaging analysis software to isolate the pores as viewed from the cross-sectional images and measure the length and width of the pores. The average length and average width of the pores can be used to calculate the average aspect ratio of the porosity in the body.

In another embodiment, the placement and/or orientation of the abrasive article or batch of abrasive articles in the build bed and the compacting process may be controlled to control the orientation of the porosity in the body. In some instances, some alignment of the porosity may be desired, and the process of placement and/or orientation and the compacting process may be controlled to create some alignment of the porosity in the body. In still another embodiment, the porosity may be substantially randomly oriented porosity as viewed in cross-section.

According to one aspect, the body of an abrasive article or a batch of abrasive articles may have not greater than 80% of the porosity having a longitudinal axis within +−5 degrees of a direction parallel to any surface of the body as viewed in cross-section. For example, turning to FIG. 12, the pores 1202 or the body 1201 are extending generally in the direction 1205, which is substantially parallel to the surface 1203 of the body 1201. In one embodiment, the surface 1203 and direction 1205 may be substantially perpendicular to the direction of force applied by the compacting object during a compaction process, such that the force applied created a certain content of elongated porosity within the body 1201 having longitudinal axes substantially parallel to the surface 1203 and in the direction 1205. According to one non-limiting embodiment, the not greater than 70% of the porosity may have a longitudinal axis within +− (plus or minus) 5 degrees of a direction parallel to any surface of the body, such as not greater than 60% or not greater than 50% or not greater than 40% or not greater than 30% or not greater than 20% or not greater than 10% or not greater than 5%. Still, in another non-limiting embodiment, the percentage of porosity in the body having a longitudinal axis aligned with a direction parallel to any surface of the body may be at least 1% or at least 3% or at least 5% or at least 10% or at least 15% or at least 20% or at least 25% or at least 30% or at least 35% or at least 40% or at least 45% or at least 50% or at least 60% or at least 70% or at least 80%. It will be appreciated that the percentage of porosity in the body having a longitudinal axis aligned with a direction parallel to any surface of the body may be within a range, including any of the minimum and maximum percentages noted above.

According to another embodiment, the abrasive article is part of a batch, and wherein the batch of abrasive articles comprise an average batch Linear Feature Factor that is notably improved as compared to a batch of abrasive articles formed using a poorly controlled process.

According to another embodiment, the abrasive article may be part of a batch, and wherein the batch of abrasive articles comprise an average batch flexural strength within a range of at least 0.05 MPa or at least 0.06 MPa or at least 0.07 MPa or at least 0.08 MPa or at least 0.1 MPa or at least 0.11 MPa or at least 0.15 MPa according to the ASTM standard noted herein. In one non-limiting embodiment, the average batch flexural strength can be not greater than 1 MPa. It will be appreciated that the average batch flexural strength can be within a range, including any of the minimum and maximum values above.

According to one embodiment, the embodiments herein may facilitate formation of a batch of abrasive articles having an average batch flexural strength of at least 0.08 MPa, such as at least 0.1 MPa, or at least 0.11 MPa, or at least 0.15 MPa. Still, in another non-limiting embodiment, the average batch flexural strength can be less than 1 MPa.

It will be appreciated that the average batch flexural strength can be within a range, including any of the minimum and maximum values above.

In still other embodiments, the abrasive article may be part of a batch, and wherein the batch of abrasive articles comprise an average batch flexural strength standard deviation of less than 0.25 MPa, such as less than 0.24 MPa, or less than 0.23 MPa, or less than 0.22 MPa, or less than 0.21 MPa, or less than 0.20 MPa, or less than 0.19 MPa, or less than 0.18 MPa, or less than 0.17 MPa, or less than 0.17 MPa, or less than 0.16 MPa, or less than 0.15 MPa, or less than 0.14 MPa, or less than 0.13 MPa, or less than 0.12 MPa, or less than 0.11 MPa, or less than 0.1 MPa, or less than 0.09 MPa, or less than 0.08 MPa, or less than 0.07 MPa, or less than 0.06 MPa, or less than 0.05 MPa. In one non-limiting embodiment, the average batch flexural strength standard deviation can be at least 0.01 MPa, such as at least 0.02 MPa. It will be appreciated that the average batch flexural strength standard deviation can be within a range, including any of the minimum and maximum values above.

The processes of the embodiments herein are developed by empirical studies that have identified certain elements leading to improved abrasive articles. One non-limiting example of a property of the abrasive articles (green or finally-formed) that may be improved includes batch density variation. According to one embodiment, the process may facilitate formation of a plurality (e.g., a batch) of abrasive articles having a batch density variation of not greater than 2.5% of the average density of the batch or not greater than 2.4% or not greater than 2.3%, or not greater than 2.2%, or not greater than 2.1% or not greater than 2.0% or not greater than 1.9% or not greater than 1.8% or not greater than 1.7% or not greater than 1.6% or not greater than 1.5% or not greater than 1.4% or not greater than 1.3% or not greater than 1.2% or not greater than 1.1% or not greater than 1.0% or not greater than 0.9% or not greater than 0.8%. Still, in another non-limiting embodiment, the batch density variation can be at least 0.001% of an average theoretical density of the batch, such as at least 0.01% or at least 0.1% It will be appreciated that the batch density variation can be within a range, including any of the minimum and maximum percentages noted above. The batch density variation can be measured using the techniques described herein.

According to another embodiment, the abrasive article may be part of a batch, and wherein the batch of abrasive articles comprise an average batch Archimedes density of at least 1.8 g/cc, such as at least 1.85 g/cc, or at least 1.90 g/cc, or at least 1.95 g/cc, or at least 2.0 g/cc. In one non-limiting embodiment, the average batch Archimedes density can be less than 3 g/cc, such as less than 2.9 g/cc, or less than 2.8 g/cc, or less than 2.7 g/cc, or less than 2.6 g/cc, or less than 2.5 g/cc, or less than 2.4 g/cc, or less than 2.3 g/cc, or less than 2.2 g/cc. It will be appreciated that the average Archimedes density can be within a range, including any of the minimum and maximum values above.

According to one embodiment, the embodiments herein may facilitate formation of a batch of abrasive articles having an Archimedes density standard deviation of less than 0.029 g/cc, such as less than 0.028 g/cc, or less than 0.027 g/cc, or less than 0.026 g/cc, or less than 0.025 g/cc, or less than 0.024 g/cc, or less than 0.023 g/cc, or less than 0.022 g/cc, or less than 0.021 g/cc, or less than 0.020 g/cc, or less than 0.019 g/cc, or less than 0.018 g/cc, or less than 0.017 g/cc, or less than 0.016 g/cc, or less than 0.015 g/cc. In one non-limiting embodiment, the Archimedes density standard deviation can be at least 0.001 g/cc, such as at least 0.005 g/cc. It will be appreciated that the Archimedes density standard deviation can be within a range, including any of the minimum and maximum values above.

The method for forming a batch of abrasive articles, as described in the embodiments herein, may also be suitable for minimizing a batch volumetric form factor. Some data indicates that the batch volumetric form factor of the abrasive articles may be impacted by the use of recycled powder, and uncontrolled use of the recycled powder may negatively impact the manufacturing and quality of the product. According to one embodiment, the embodiments herein may facilitate formation of a batch of abrasive articles having a batch volumetric form factor (batch Vff) of not greater than 0.30, such as not greater than 0.25, or not greater than 0.20, or not greater than 0.18, or not greater than 0.16, or not greater than 0.14, or not greater than 0.12, or not greater than 0.10, or not greater than 0.09, or not greater than 0.08, or not greater than 0.07, or not greater than 0.06, or not greater than 0.05, or not greater than 0.04, or not greater than 0.03, or not greater than 0.02, or not greater than 0.01, or not greater than 0.009, or not greater than 0.008, or not greater than 0.007, or not greater than 0.006, or not greater than 0.005. Still, in another non-limiting embodiment, the batch Vff can be at least 0.00001, or at least 0.0001, or at least 0.0005, or at least 0.001, or at least 0.01, or at least 0.1, or at least 0.2, or at least 0.4, or at least 0.6. It will be appreciated that the batch Vff can be within a range including any of the minimum and maximum values noted above, including, for example, but not limited to within a range of at least 0.00001, and not greater than 0.3, such as within a range of at least 0.00001 and not greater than 0.2, or within a range of at least 0.00001 and not greater than 0.05, or even within a range of at least 0.00001 and not greater than 0.01. The batch Vff can be measured as described herein.

According to one embodiment, the process may include using at least 10% of the total volume of powder material in the build box to form a batch of abrasive articles while minimizing at least one of a batch density variation and/or a batch volumetric form factor of the batch of abrasive articles. In another embodiment, the method for forming the batch of abrasive articles may include using at least 15% of the total volume of the powder material in the build box to form the batch, such as at least 20% or at least 25% or at least 30% or at least 35% or at least 40% or at least 45% or at least 50% or at least 55% or at least 60% or at least 65% or at least 70% or at least 75% or at least 80% or at least 85%. Still, in one non-limiting embodiment, the method may include using not greater than 99% of the total volume of powder material in the build box to form a batch of abrasive articles, such as not greater than 95% or not greater than 90% or not greater than 85% or not greater than 80%. It will be appreciated that the volume of powder material used to form the batch of abrasive articles may be within a range including any of the minimum and maximum percentages noted above.

In one non-limiting embodiment, the method for forming an abrasive article may further include controlling the position and/or orientation of two or more abrasive articles of a batch relative to each other in the build box and more particularly with respect to a direction of translation of a compacting object. It will be appreciated that for any of the embodiments herein a compaction object can be configured to traverse one or more layers of powder material and apply a force sufficient to compact the one or more layers and reduce the thickness of the one or more layers. As used herein, a direction of translation of the compacting object is generally in a direction that is parallel to the length of the build box or in a direction that is parallel to a width of the build box.

According to one embodiment, the process can include forming one or more bodies each having a longitudinal axis that is substantially parallel to a direction of translation of a compaction object. Still, in an alternative embodiment, one or more bodies may each have a longitudinal axis that is substantially perpendicular to a direction of translation of a compaction object. Substantially perpendicular is used to mean the same thing as described in other embodiments herein.

In yet another aspect, the abrasive article or batch of abrasive articles made via the methods of the embodiments herein may have improved properties or characteristics. For example, in one embodiment, the abrasive article may have improved feature resolution. According to one embodiment, a green body abrasive article or finally-formed abrasive article may have a feature resolution value that is at least 5% better than a feature resolution value of an article formed using a different binder material and/or different binder process. For example, in one embodiment, the improvement in feature resolution may be at least 8% better or at least 10% better or at least 15% better or at least 20% better or at least 30% better or at least 40% better or at least 50% better as compared to a feature resolution value of a green body using a different binder material or binder process.

In another aspect, the green body abrasive article or batch of green body abrasive articles can include a particular content of binder that may facilitate improved properties and/or performance. The binder material may be partially or fully cured in the green body abrasive article. In one instance, the green body may include an average content of binder material of at least 0.01 wt % for a total weight of the body, such as at least 0.02 wt % or at least 0.05 wt % or at least 0.1 wt % or at least 0.2 wt % or at least 0.53 wt % or at least 1 wt % or at least 2 wt % or at least 3 wt % or at least 4 wt % or at least 5 wt %. Still, in another non-limiting embodiment, the green body or batch of green bodies may have an average weight percent of binder material that is not greater than 30 wt % or not greater than 25 wt % or not greater than 20 wt % or not greater than 15 wt % or not greater than 10 wt % or not greater than 8 wt % or not greater than 6 wt %. It will be appreciated that the average weight percent of the binder material in the green body may be within a range including any of the minimum and maximum percentages noted above.

In yet another embodiment, one or more abrasive articles formed according to the processes herein may have one or more features from the group of 1) a microstructure Feature value greater than 1; 2) a first surface having a first developed interfacial area ratio (Sdr1) and a second surface having a second developed interfacial area ratio (Sdr2), wherein the difference between Sdr1 and Sdr2 is not greater than 25%; 3) an exterior surface having a first developed interfacial area ratio (Sdr) of at least 40%; 4) multiple layers of bond material and abrasives bonded to each other. Any of the foregoing features can have any range of values as disclosed or claimed herein.

In another embodiment, the one or more abrasive articles may each comprise a body having one or more of the following features: 1) a major planar surface having a nWarp of not greater than 50 µm/cm$^2$, wherein nWarp is the warp of the major planar surface normalized for the surface area of the major planar surface; 2) a major planar surface having a nFlatness of not greater than 50 µm/cm$^2$, wherein nFlatness is the flatness of the major planar surface normalized for the surface area of the major planar surface; 3) a major planar surface having a nBow of not greater than 50 µm/cm$^2$, wherein nBow is the bow of the major planar surface normalized for the surface area of the major planar surface; 4) a first major planar surface and a second major planar surface substantially parallel to the first major planar surface, wherein the distance between the first major planar surface and second major planar surface comprises a nDimension variation of not greater than 100 µm/cm$^2$, wherein nDimension variation is the variation in the dimension between the first and second major planar surfaces normalized to the area of the first or second major planar surfaces; 5) or any combination of 1)-4). Any of the foregoing features can have any range of values as disclosed or claimed herein.

In another non-limiting embodiment, the distribution of any one or more features of the abrasive articles can be evaluated. The shape of the distribution for such measured features, particularly dimensional features, may be evaluated via kurtosis.

The methods of the embodiments herein facilitate improved formation of abrasive articles. Notably, the empirical studies conducted by the Applicant facilitate methods that have a superior forming ratio (Add/Sub), which can define the ratio of the material added to form the body versus the material subtracted in any post-forming finishing techniques. The methods of the embodiments herein facilitate a forming ratio that is advantageous compared to conventional forming techniques and/or less sophisticated additive manufacturing techniques.

The improvement in forming ratio is also evident in the limited residual stress and/or subsurface damage on one or more exterior surfaces of the finally-formed abrasive articles. Given the enhancements in the forming process, much less effort, if any, is needed to finish the abrasive articles to suitable shapes and/or tolerances for their intended applications. Accordingly, the amount of residual stress and/or subsurface damage in the finally-formed abrasive articles is less as compared to conventional products or other less sophisticated additive manufacturing techniques.

EMBODIMENTS

Embodiment 1. A method for forming an article comprising:
forming a layer of powder material comprising a precursor bond material and abrasive particles;
compacting at least a portion of the layer to form a compacted layer;
binding at least a portion of the compacted layer; and
repeating steps a)-c) to form a green body abrasive article with the exception that step a) may be repeated itself more than one time before conducting steps b) and c).

Embodiment 2. The method of Embodiment 1, further comprising treating the green body abrasive article to form a finally-formed abrasive article.

Embodiment 3. The method of Embodiment 1, wherein the precursor bond material comprises one of an organic material, an inorganic material, a metal, a metal alloy, a ceramic, an oxide, a carbide, a nitride, a boride, an amorphous material, a crystalline material, or any combination thereof.

Embodiment 4. The method of Embodiment 1, wherein the precursor bond material may be converted chemically or undergo a phase change during processing from a precursor bond material to a bond material of a finally-formed abrasive article.

Embodiment 5. The method of Embodiment 1, wherein the precursor bond material does not necessarily undergo any physical or chemical changes during processing and is present as a bond material in the finally-formed abrasive article.

Embodiment 6. The method of Embodiment 1, wherein the abrasive particles include abrasive particles or superabrasive particles having a Mohs hardness of at least 6 or at least 7 or at least 8 or at least 9.

Embodiment 7. The method of Embodiment 1, wherein the abrasive particles comprise at least one of an oxide, a carbide, a nitride, a boride, diamond, or any combination thereof.

Embodiment 8. The method of Embodiment 1, wherein the abrasive particles comprise an average particle size (D50) of at least 0.1 microns or at least 0.5 microns or at least 0.8 microns or at least 1 micron or at least 2 microns or at least 3 microns or wherein the abrasive particles comprise an average particle size (D50) of at least any integer value up to 500 microns.

Embodiment 9. The method of Embodiment 1, wherein the abrasive particles comprise an average particle size (D50) of not greater than 1000 microns or not greater than 800 microns or not greater than 600 microns or not greater than 500 microns or not greater than 400 microns or not greater than 300 microns or wherein the abrasive particles comprise an average particle size (D50) of not greater than any integer value to 5 microns.

Embodiment 10. The method of Embodiment 1, wherein the green body comprises at least 1 vol % abrasive particles for a total volume of the green body or at least 2 vol % or at least 3 vol % or at least 4 vol % or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % or at least 60 vol % or at least 61 vol % or at least 62 vol % or at least 63 vol % or at least 64 vol % or at least 65 vol % or at least 66 vol % or at least 67 vol % or at least 68 vol % or at least 69 vol % or at least 70 vol % or at least 71 vol % or at least 72 vol % or at least 73 vol % or at least 74 vol % or at least 75 vol % or at least 76 vol % or at least 77 vol % or at least 78 vol % or at least 79 vol % or at least 80 vol %.

Embodiment 11. The method of Embodiment 1, wherein the green body comprises not greater than 90 vol % abrasive particles for a total volume of the green body or not greater than 85 vol % or not greater than 80 vol % or not greater than 75 vol % or not greater than 70 vol % or not greater than 69 vol % or not greater than 68 vol % or not greater than 67 vol % or not greater than 66 vol % or not greater than 65 vol % or not greater than 64 vol % or not greater than 63 vol % or not greater than 62 vol % or not greater than 61 vol % or not greater than 60 vol % or not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol %.

Embodiment 12. The method of Embodiment 1, wherein the green body comprises at least 1 vol % precursor bond material for a total volume of the green body or at least 2 vol % or at least 3 vol % or at least 4 vol % or at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % or at least 21 vol % or at least 22 vol % or at least 23 vol % or at least 24 vol % or at least 25 vol % or at least 26 vol % or at least 27 vol % or at least 28 vol % or at least 29 vol % or at least 30 vol % or at least 31 vol % or at least 32 vol % or at least 33 vol % or at least 34 vol % or at least 35 vol % or at least 36 vol % or at least 37 vol % or at least 38 vol % or at least 39 vol % or at least 40 vol % or at least 41 vol % or at least 42 vol % or at least 43 vol % or at least 44 vol % or at least 45 vol % or at least 46 vol % or at least 47 vol % or at least 48 vol % or at least 49 vol % or at least 50 vol % or at least 51 vol % or at least 52 vol % or at least 53 vol % or at least 54 vol % or at least 55 vol % or at least 56 vol % or at least 57 vol % or at least 58 vol % or at least 59 vol % or at least 60 vol % or at least 61 vol % or at least 62 vol % or at least 63 vol % or at least 64 vol % or at least 65 vol % or at least 66 vol % or at least 67 vol % or at least 68 vol % or at least 69 vol % or at least 70 vol % or at least 71 vol % or at least 72 vol % or at least 73 vol % or at least 74 vol % or at least 75 vol % or at least 76 vol % or at least 77 vol % or at least 78 vol % or at least 79 vol % or at least 80 vol %.

Embodiment 13. The method of Embodiment 1, wherein the green body comprises not greater than 90 vol % precursor bond material for a total volume of the green body or not greater than 85 vol % or not greater than 80 vol % or not greater than 75 vol % or not greater than 70 vol % or not greater than 69 vol % or not greater than 68 vol % or not greater than 67 vol % or not greater than 66 vol % or not greater than 65 vol % or not greater than 64 vol % or not greater than 63 vol % or not greater than 62 vol % or not greater than 61 vol % or not greater than 60 vol % or not greater than 59 vol % or not greater than 58 vol % or not greater than 57 vol % or not greater than 56 vol % or not greater than 55 vol % or not greater than 54 vol % or not greater than 53 vol % or not greater than 52 vol % or not greater than 51 vol % or not greater than 50 vol % or not greater than 49 vol % or not greater than 48 vol % or not greater than 47 vol % or not greater than 46 vol % or not greater than 45 vol % or not greater than 44 vol % or not greater than 43 vol % or not greater than 42 vol % or not greater than 41 vol % or not greater than 40 vol % or not greater than 39 vol % or not greater than 38 vol % or not greater than 37 vol % or not greater than 36 vol % or not greater than 35 vol % or not greater than 34 vol % or not greater than 33 vol % or not greater than 32 vol % or not greater than 31 vol % or not greater than 30 vol % or not greater than 29 vol % or not greater than 28 vol % or not greater than 27 vol % or not greater than 26 vol % or not greater than 25 vol % or not greater than 24 vol % or not greater than 23 vol % or not greater than 22 vol % or not greater than 21 vol % or not greater than 20 vol % or not greater than 19 vol % or not greater than 18 vol % or not greater than 17 vol % or not greater than 16 vol % or not greater than 15 vol % or not greater than 14 vol % or not greater than 13 vol % or not greater than 12 vol % or not greater than 11 vol % or not greater than 10 vol % or not greater than 9 vol % or not greater than 8 vol % or not greater than 7 vol % or not greater than 6 vol % or not greater than 5 vol %.

Embodiment 14. The method of Embodiment 1, further comprising smoothing an upper surface of the layer with a smoothing roller that is configured to contact the upper surface of the layer sufficiently to spread the powder material and smooth the upper surface after forming the layer.

Embodiment 15. The method of Embodiment 1, wherein forming the layer comprises depositing the powder material from a container via agitation of the powder material in the container, which then flows through a screen in the container, and wherein the powder material drops from the container via gravity into a build box or a previously deposited layer of powder material.

Embodiment 16. The method of Embodiment 1, wherein the method of agitation and the screen size is selected based upon the particle size distribution of the powder.

Embodiment 17. The method of Embodiment 1, wherein the powder is a mixture of discrete particles of precursor bond material and discrete abrasive particles.

Embodiment 18. The method of Embodiment 1, wherein the powder is an agglomerated mixture comprising granules containing a mixture of at least precursor bond material, the abrasive particles, and one or more optional additives such as a binder, fillers, and the like.

Embodiment 19. The method of Embodiment 1, wherein compacting is conducted by applying a compacting object, which may be in the form of a roller, that traverses the layer and applies a force sufficient to compact the layer to a compacted layer thickness that is less than the thickness of the layer prior to compaction.

Embodiment 20. The method of Embodiment 19, wherein the compaction object is different from a smoothing roller configured to smooth the surface of the layer.

Embodiment 21. The method of Embodiment 1, further comprising controlling at least one of:
a force applied by a compaction object to the layer or a plurality of layers of powder;
a traverse speed of a compaction object;
average thickness of the layer prior to compaction;
a particle size distribution of the powder;
number of previously formed layers underlying the layer of powder;
the number of compacted layers underlying the layer of powder;
the density of any layers underlying the layer of powder;
the amount of binder in any layers underlying the layer of powder;
the relative dimensions of the layer relative to one or more layers underlying the layer; and
any combination of a)-i).

Embodiment 22. The method of Embodiment 19, further comprising controlling the compaction thickness relative to at least one of:
an average thickness of the layer prior to compaction;
a particle size distribution of the powder in the layer;
a printhead deposition resolution;
any combination of a)-c).

Embodiment 23. The method of Embodiment 21, wherein controlling includes taking into consideration one or more of the elements a)-i) to control the quality of the green body abrasive article and a finally-formed abrasive article formed by treating the green body.

Embodiment 24. The method of Embodiment 1, wherein the method includes binder jetting.

Embodiment 25. The method of Embodiment 1, wherein compaction can be conducted on one layer or a plurality of layers.

Embodiment 26. The method of Embodiment 1, wherein forming includes forming a layer having an average thickness of not greater than 500 microns or not greater than 400 microns or not greater than 300 microns or not greater than 200 microns or not greater than 100 microns or not greater than 90 microns or not greater than 80 microns or not greater than 70 microns or not greater than 60 microns or not greater than 50 microns or not greater than 40 microns or not greater than 30 microns or not greater than 20 microns.

Embodiment 27. The method of Embodiment 1, wherein forming includes forming a layer having an average thickness of at least 1 micron or at least 5 microns or at least 10 microns or at least 15 microns or at least 20 microns or at least 25 microns.

Embodiment 28. The method of Embodiment 1, wherein compacting includes compacting the layer to an average compacted layer thickness of not greater than 400 microns or not greater than 300 microns or not greater than 200 microns or not greater than 100 microns or not greater than 90 microns or not greater than 80 microns or not greater than 70 microns or not greater than 60 microns or not greater than 50 microns or not greater than 40 microns or not greater than 30 microns or not greater than 20 microns or not greater than 15 microns or not greater than 10 microns or not greater than 8 microns or not greater than 5 microns or not greater than 3 microns or not greater than 1 micron or not greater than 0.8 microns.

Embodiment 29. The method of Embodiment 1, wherein compacting includes compacting the layer to an average compacted layer thickness of at least 0.1 microns or at least 0.5 microns or at least 0.8 microns or at least 1 micron or at least 2 microns or at least 3 microns or at least 4 microns or at least 5 microns or at least 6 microns or at least 7 microns or at least 8 microns or at least 9 microns or at least 10 microns or at least 11 microns or at least 12 microns or at least 13 microns or at least 14 microns or at least 15 microns or at least 16 microns or at least 17 microns or at least 18 microns or at least 19 microns or at least 20 microns or at least 21 microns or at least 22 microns or at least 23 microns or at least 24 microns or at least 25 microns or at least 26 microns or at least 27 microns or at least 28 microns or at least 29 microns or at least 30 microns or at least 31 microns or at least 32 microns or at least 33 microns or at least 34 microns or at least 35 microns or at least 36 microns or at least 37 microns or at least 38 microns or at least 39 microns or at least 40 microns or at least 41 microns or at least 42 microns or at least 43 microns or at least 44 microns or at least 45 microns or at least 46 microns or at least 47 microns or at least 48 microns or at least 49 microns or at least 50 microns or at least 51 microns or at least 52 microns or at least 53 microns or at least 54 microns or at least 55 microns or at least 56 microns or at least 57 microns or at least 58 microns or at least 59 microns or at least 60 microns or at least 65 microns or at least 70 microns or at least 75 microns or at least 80 microns or at least 85 microns or at least 90 microns or at least 95 microns or at least 100 microns or at least 110 microns or at least 120 microns or at least 130 microns or at least 140 microns or at least 150 microns or at least 160 microns or at least 170 microns or at least 180 microns or at least 190 microns or at least 200 microns or at least 210 microns or at least 220 microns or at least 230 microns or at least 240 microns or at least 250 microns.

Embodiment 30. The method of Embodiment 1, wherein compacting includes increasing the density of the compacted layer by at least 2% as compared to the layer prior to compacting or at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% or at least 100% or at least 102% or at least 105% or at least 108% or at least 110% or at least 115% or at least 120% or at least 125% or at least 130% or at least 140% or wherein compacting includes increasing the density of the compacted layer by at least 150% as compared to the layer prior to compacting.

Embodiment 31. The method of Embodiment 1, wherein compacting include compacting the layer of powder material by at least 1% to not greater than 95% of the original layer thickness of the layer, such as compaction of at least 2% of the original layer thickness of the layer prior to compaction or at least 3% or at least 4% or at least 5% or at least 6% or at least 7% or at least 8% or at least 9% or at least 10% or at least 11% or at least 12% or at least 13% or at least 14% or at least 15% or at least 16% or at least 17% or at least 18% or at least 19% or at least 20% or at least 21% or at least 22% or at least 23% or at least 24% or at least 25% or at least 26% or at least 27% or at least 28% or at least 29% or at least 30% or at least 31% or at least 32% or at least 33% or at least 34% or at least 35% or at least 36% or at least 37% or at least 38% or at least 39% or at least 40% or at least 41% or at least 42% or at least 43% or at least 44% or at least 45% or at least 46% or at least 47% or at least 48% or at least 49% or at least 50% or at least 51% or at least 52% or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94%.

Embodiment 32. The method of Embodiment 31, wherein compacting include compacting the layer of powder material by at least 1% to not greater than 95% of the original layer thickness of the layer, such as compaction of not greater than 94% of the original layer thickness of the layer prior to compaction or not greater than 93% or not greater than 92% or not greater than 91% or not greater than 90% or not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2%.

Embodiment 33. The method of Embodiment 32, wherein the percentage of compaction is within a range including any of the minimum and maximum values noted in Embodiments 31 and 32.

Embodiment 34. The method of Embodiment 1, further including any other aspects of methods embodied or disclosed herein.

Embodiment 35. The method of Embodiment 1, wherein the green body and/or finally-formed abrasive article includes any one or more features of the green body and/or finally-formed abrasive article embodied or disclosed herein.

Embodiment 36. A method for forming an article comprising:
  forming a layer of powder material comprising a precursor bond material and abrasive particles;
  binding at least a portion of the compacted layer with a printhead having a dispensing resolution of not greater than 55 picoliters; and repeating steps a) and b) to form a green body abrasive article.

Embodiment 37. The method of Embodiment 36, wherein the dispensing resolution of the printhead is not greater than 50 picoliters, or not greater than 45 picoliters or not greater than 40 picoliters or not greater than 35 picoliters or not greater 30 picoliters or not greater than 25 picoliters or not greater than 20 picoliters or not greater than 15 picoliters or not greater than 10 picoliters or not greater than 5 picoliters or not greater than 1 picoliter or not greater than 0.5 picoliters or not greater than 0.1 picoliters.

Embodiment 38. The method of Embodiment 36, wherein the dispensing resolution of the printhead is at least 0.0001 picoliters or at least 0.001 picoliters or at least 0.01 picoliters or at least 0.1 picoliters or at least 0.5 picoliters or at least 1 picoliter.

Embodiment 39. The method of Embodiment 36, further including any other features of methods embodied or disclosed herein.

Embodiment 40. The method of Embodiment 36, wherein the green body and/or a finally-formed abrasive article formed from the green body includes any one or more features of the green body and/or finally-formed abrasive article embodied or disclosed herein.

Embodiment 41. A method for forming an article comprising:
providing a build box configured to hold powder material during an additive manufacturing process, wherein the build box has at least one of:
i. a length of at least 150 mm;
ii. a width of at least 60 mm;
iii. a depth of at least 60 mm;
iv. a combination of any of i., ii., and iii.
b) forming a layer of powder material comprising a precursor bond material and abrasive particles;
c) binding at least a portion of the layer; and
d) repeating steps a) and b) to form a green body abrasive article.

Embodiment 42. The method of Embodiment 41, wherein the length of the build box is at least 160 mm or 170 mm or at least 180 mm or at least 190 mm or at least 200 mm or at least 210 mm or at least 220 mm or at least 230 mm or at least 240 mm or at least 250 mm or at least 260 mm or at least 270 mm or at least 280 mm or at least 290 mm or at least 300 mm or at least 310 mm or at least 320 mm or at least 330 mm or at least 340 mm or at least 350 mm or at least 360 mm or at least 370 mm or at least 380 mm or at least 390 mm or at least 400 mm.

Embodiment 43. The method of Embodiment 41, wherein the length of the build box is not greater than 3000 mm or not greater than 2000 mm or not greater than 1000 mm.

Embodiment 44. The method of Embodiment 41, wherein the width of the build box is at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm.

Embodiment 45. The method of Embodiment 41, wherein the width of the build box is not greater than 2000 mm or not greater than 1500 mm or not greater than 1000 mm.

Embodiment 46. The method of Embodiment 41, wherein the depth of the build box is at least 65 mm or at least 70 mm or at least 80 mm or at least 90 mm or at least 100 mm or at least 110 mm or at least 120 mm or at least 130 mm or at least 140 mm or at least 150 mm or at least 160 mm or at least 170 mm or at least 180 mm or at least 190 mm or at least 200 mm or at least 210 mm or at least 220 mm or at least 230 mm or at least 240 mm or at least 250 mm.

Embodiment 47. The method of Embodiment 41, wherein the depth of the build box is not greater than 2000 mm or not greater than 1500 mm or not greater than 1000 mm.

Embodiment 48. The method of Embodiment 41, wherein the green body has a volume that is at least 1% of the volume of the build box or at least 2% or at least 3% or at least or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% of the volume of the build box.

Embodiment 49. The method of Embodiment 41, wherein the green body has a volume that is at least 1% and not greater than 60% of the volume of the build box.

Embodiment 50. The method of Embodiment 41, further comprising forming a plurality of discrete green body abrasive articles in a single forming process of steps a)-c), wherein the plurality of discrete green body abrasive articles define a batch having a total volume of solid material that is at least 1% of the volume of the build box or at least 2% or at least 3% or at least or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% of the volume of the build box.

Embodiment 51. The method of Embodiment 50, wherein the batch has a volume of at least 1% and not greater than 98% of the volume of the build box.

Embodiment 52. The method of Embodiment 41, further including any other features of methods embodied or disclosed herein.

Embodiment 53. The method of Embodiment 41, wherein the green body and/or a finally-formed abrasive article formed from the green body includes any one or more features of the green body and/or finally-formed abrasive article embodied or disclosed herein.

Embodiment 54. A method for forming an article comprising:
a) forming a layer of powder material comprising a precursor bond material and abrasive particles;
b) binding at least a portion of the layer; and
c) repeating steps a) and b) to form a green body abrasive article having at least one of:
i. a length of at least 6 cm;
ii. a width of at least 2.8 cm;
iii. a solid volume of at least 9 cm$^3$; and
iv. a combination of any one of i., ii., and iii.

Embodiment 55. The method of Embodiment 54, wherein the green body comprises a thickness of at least 1 mm and not greater than 50 cm.

Embodiment 56. The method of Embodiment 54, wherein the green body comprises a thickness of not greater than 0.9 mm and at least 0.1 micron.

Embodiment 57. The method of Embodiment 54, wherein the length of the green body is at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 58. The method of Embodiment 54, wherein the length of the green body is not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 59. The method of Embodiment 54, wherein the width is at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 60. The method of Embodiment 54, wherein the width of the green body is not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 61. The method of Embodiment 54, wherein the green body has a primary aspect ratio (length:width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 62. The method of Embodiment 54, wherein the green body has a primary aspect ratio (length:width) of not greater than 10000:1 or not greater than 5000:1 or not greater than 1000:1 or not greater than 500:1 or not greater than 200:1 or not greater than 100:1 or not greater than 50:1.

Embodiment 63. The method of Embodiment 54, wherein the green body has a secondary aspect ratio (length:thickness) that is the same as any of the ratios for primary aspect ratio provided in Embodiments 61 and 62.

Embodiment 64. The method of Embodiment 54, wherein the green body has a tertiary aspect ratio (width:thickness) that is the same as any of the ratios for primary aspect ratio provided in Embodiments 61 and 62.

Embodiment 65. The method of Embodiment 54, wherein the volume is at least 10 cm$^3$ or at least 11 cm$^3$ or at least 12 cm$^3$ or at least 13 cm$^3$ or at least 14 cm$^3$ or at least 15 cm$^3$ or at least 16 cm$^3$ or at least 17 cm$^3$ or at least 18 cm$^3$ or at least 19 cm$^3$ or at least 20 cm$^3$ or at least 21 cm$^3$ or at least 22 cm$^3$ or at least 23 cm$^3$ or at least 24 cm$^3$ or at least 25 cm$^3$ or at least 26 cm$^3$ or at least 27 cm$^3$ or at least 28 cm$^3$ or at least 29 cm$^3$ or at least 30 cm$^3$ or at least 31 cm$^3$ or at least 32 cm$^3$ or at least 33 cm$^3$ or at least 34 cm$^3$ or at least 35 cm$^3$ or at least 36 cm$^3$ or at least 37 cm$^3$ or at least 38 cm$^3$ or at least 39 cm$^3$ or at least 40 cm$^3$ or at least 42 cm$^3$ or at least 44 cm$^3$ or at least 46 cm$^3$ or at least 48 cm$^3$ or at least 50 cm$^3$.

Embodiment 66. The method of Embodiment 54, wherein the volume is not greater than 5000 cm$^3$ or not greater than 4000 cm$^3$ or not greater than 3000 cm$^3$ or not greater than 2000 cm$^3$ or not greater than 1000 cm$^3$ or not greater than 800 cm$^3$ or not greater than 600 cm$^3$ or not greater than 500 cm$^3$.

Embodiment 67. The method of Embodiment 54, wherein the green body comprises a length, a width, and a thickness, and wherein length>width>thickness.

Embodiment 68. The method of Embodiment 54, further comprising treating the green body abrasive article to form a finally-formed abrasive article.

Embodiment 69. The method of Embodiment 68, wherein the finally-formed abrasive article has any of the features of the green body abrasive article as provided in Embodiments 54-67.

Embodiment 70. The method of Embodiment 54, wherein further including any other features of methods embodied or disclosed herein.

Embodiment 71. The method of Embodiment 54, wherein the green body and/or a finally-formed abrasive article formed from the green body includes any one or more features of the green body and/or finally-formed abrasive article embodied or disclosed herein.

Embodiment 72. A method for forming an article comprising:
a) forming a layer of powder material comprising recycled powder material, wherein the recycled powder material includes precursor bond material, abrasive particles, and an organic material;
b) binding at least a portion of the layer with a binder material; and
c) repeating steps a) and b) to form a green body abrasive article.

Embodiment 73. The method of Embodiment 72, wherein the organic material of the recycled powder material is cured binder material used in a prior binding operation but not part of a green body abrasive article.

Embodiment 74. The method of Embodiment 72, wherein binding includes converting the binder from a liquid to a solid or semi-solid state to bind particles of the powder material.

Embodiment 75. The method of Embodiment 72, wherein binding includes at least one of evaporation, thermal curing, chemical curing, radiation curing, or any combination thereof.

Embodiment 76. The method of Embodiment 72, wherein the binder material includes a liquid vehicle and a polymer material contained therein, wherein the polymer material can be dissolved in the liquid vehicle.

Embodiment 77. The method of Embodiment 76, wherein the liquid vehicle includes one or more organic solvents and/or water.

Embodiment 78. The method of Embodiment 77, wherein the organic solvents include at least one of alcohols (e.g., butanol, ethylene glycol monomethyl ether), ketones, ethers, or any combination thereof.

Embodiment 79. The method of Embodiment 77, wherein the organic solvents have a flash point above 100° C.

Embodiment 80. The method of Embodiment 77, wherein the one or more organic solvents are configured to control drying speed of the liquid vehicle, to control surface tension of the liquid vehicle, to allow dissolution of an ingredient (e.g., of a surfactant).

Embodiment 81. The method of Embodiment 77, wherein the one or more organic solvents include alcohols such as methyl alcohol, ethyl alcohol, n-propyl alcohol, isopropyl alcohol, n-butyl alcohol, sec-butyl alcohol, t-butyl alcohol, and isobutyl alcohol; ketones or ketoalcohols such as acetone, methyl ethyl ketone, and diacetone alcohol; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylolpropane ethoxylate; lower alkyl ethers such as ethylene glycol methyl or ethyl ether, diethylene glycol ethyl ether, triethylene glycol methyl or ethyl ether, ethylene glycol n-butyl ether, diethylene glycol n-butyl ether, diethylene glycol methyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, and dipropylene glycol dimethyl ether; nitrogen-containing compounds such as 2-pyrrolidinone and N-methyl-2-pyrrolidinone; sulfur-containing compounds such as dimethyl sulfoxide, tetramethylene sulfone, and thioglycol; and combinations of any of the foregoing.

Embodiment 82. The method of Embodiment 72, wherein the binder material includes a polymer including at least one of polyvinyl pyrrolidones, polyvinyl caprolactams, polyvinyl alcohols, polyacrylamides, poly(2-ethyl-2-oxazoline) (PEOX), polyvinyl butyrate, copolymers of methyl vinyl ether and maleic anhydride, certain copolymers of acrylic acid and/or hydroxyethyl acrylate, methyl cellulose, natural polymers (e.g., dextrin, guar gum, xanthan gum).

Embodiment 83. The method of Embodiment 72, wherein the binder material may further include one or more free-radically polymerizable or otherwise radiation-curable materials, including at least one of acrylic monomers and/or oligomers and/or epoxy resins, a photoinitiator and/or photocatalysts for curing the free-radically polymerizable or otherwise radiation-curable materials may also be included.

Embodiment 84. The method of Embodiment 72, wherein the organic material in the recycled powder material includes one or more materials from the binder material provided in Embodiments 77-83.

Embodiment 85. The method of Embodiment 72, wherein the recycled powder includes at least 0.1 wt % organic material for a total weight of the recycled powder or at least 0.5 wt % or at least 1 wt % or at least 2 wt % or at least 3 wt % or at least 4 wt % or at least 5 wt % or at least 6 wt % or at least 7 wt % or at least 8 wt % or at least 9 wt % or at least 10 wt %.

Embodiment 86. The method of Embodiment 72, wherein the recycled powder includes not greater than 30 wt % organic material for a total weight of the recycled powder or not greater than 25 wt % or not greater than 20 wt % or not greater than 15 wt % or not greater than 10 wt % or not greater than 8 wt % or not greater than 6 wt % or not greater than 5 wt %.

Embodiment 87. The method of Embodiment 72, wherein the recycled powder is captured as loose powder after.

Embodiment 88. The method of Embodiment 72, further including any other features of methods embodied or disclosed herein.

Embodiment 89. The method of Embodiment 72, wherein the green body and/or a finally-formed abrasive article formed from the green body includes any one or more features of the green body and/or finally-formed abrasive article embodied or disclosed herein.

Embodiment 90. A method for forming an article comprising:
a) forming a layer of powder material comprising a precursor bond material and abrasive particles;
b) binding at least a portion of the layer with a binder material; and
c) repeating steps a) and b) to form a green body abrasive article;
d) removing and capturing loose powder from the green body abrasive article, wherein the loose powder includes at least 0.1 wt % organic material from the binder material for a total weight of the loose powder;
e) using at least a portion of the loose powder in a subsequent operation as recycled powder to conduct steps a)-c) and forming a second green body abrasive article distinct from the green body abrasive article.

Embodiment 91. The method of Embodiment 90, wherein the loose powder includes at least 0.1 wt % organic material for a total weight of the loose powder or at least 0.5 wt % or at least 1 wt % or at least 2 wt % or at least 3 wt % or at least 4 wt % or at least 5 wt % or at least 6 wt % or at least 7 wt % or at least 8 wt % or at least 9 wt % or at least 10 wt %.

Embodiment 92. The method of Embodiment 90, wherein the loose powder includes not greater than 30 wt % organic material for a total weight of the loose powder or not greater than 25 wt % or not greater than 20 wt % or not greater than 15 wt % or not greater than 10 wt % or not greater than 8 wt % or not greater than 6 wt % or not greater than 5 wt %.

Embodiment 93. The method of Embodiment 90, further comprising treating the loose powder to form recycled powder, wherein treating includes thermally treating, chemically treating, mechanically treating, or irradiating the loose powder to change the content of organic material in the loose powder.

Embodiment 94. The method of Embodiment 93, wherein treating includes dissolving and/or washing the organic material from the loose powder.

Embodiment 95. The method of Embodiment 94, wherein treating includes washing the loose powder with an organic material, such as alcohol, to reduce the content of organic material contained in the loose powder.

Embodiment 96. The method of Embodiment 93, wherein treating includes removing at least a portion of the organic material from the loose powder.

Embodiment 97. The method of Embodiment 93, wherein treating includes removing at least 0.1 wt % of the organic material from the loose powder to form a recycled powder to be used in a subsequent operation to form a green body abrasive article.

Embodiment 98. The method of Embodiment 90, further comprising performing steps a)-e) multiple times to form a plurality of green body abrasive articles in a series of operations conducted at different times.

Embodiment 99. The method of Embodiment 90, wherein removing and capturing loose powder includes storing loose powder in a storage container.

Embodiment 100. The method of Embodiment 99, wherein removing and capturing includes a pressure differential applied to loose powder to remove it from a build box and the green body and capture it in a storage container.

Embodiment 101. The method of Embodiment 99, wherein the storage container is environmentally controlled having controlled contents of at least one of humidity, temperature, atmospheric composition and/or contaminates, pressure, and the like.

Embodiment 102. The method of Embodiment 99, further comprising treating the loose powder after a duration in the storage container.

Embodiment 103. The method of Embodiment 99, wherein the loose powder is used in a subsequent operation anywhere from 1 hour to 1 year after the process used to form the green body abrasive article.

Embodiment 104. The method of Embodiment 90, further including any other features of methods embodied or disclosed herein.

Embodiment 105. The method of Embodiment 90, wherein the green body and/or a finally-formed abrasive article formed from the green body includes any one or more features of the green body and/or finally-formed abrasive article embodied or disclosed herein.

Embodiment 106. A method of forming an abrasive article comprising:
 forming a green body abrasive article comprising a precursor bond material and abrasive particles, wherein forming is conducted by:
 creating one or more layers of powder material;
 compacting at least a portion of the one or more layers;
 selectively binding portions of the one or more layers with a binder material;
 converting the binder material to at least partially solidify the binder material and bind portions of powder material from the one or more layers;
 wherein forming the green body abrasive article is conducted at a forming rate of at least 120 cc/hr.

Embodiment 107. The method of Embodiment 106, wherein forming includes binder jetting to form a green body abrasive article.

Embodiment 108. The method of Embodiment 106, wherein the forming rate is at least 130 cc/hr or at least 150 cc/hr or at least 180 cc/hr or at least 200 cc/hr or at least 300 cc/hr or at least 400 cc/hr or at least 500 cc/hr or at least 600 cc/hr or at least 700 cc/hr or at least 800 cc/hr or at least 900 cc/hr or at least 1000 cc/hr or at least 1200 cc/hr or at least 1400 cc/hr or at least 1600 cc/hr or at least 1800 cc/hr or at least 2000 cc/hr or at least 2200 cc/hr or at least 2400 cc/hr or at least 2600 cc/hr or at least 2800 cc/hr or at least 3000 cc/hr.

Embodiment 109. The method of Embodiment 106, wherein the forming rate is within a range of at least 130 cc/hr and not greater than 7000 cc/hr.

Embodiment 110. The method of Embodiment 106, wherein the production efficiency is not greater than 7000 cc/hr or not greater than 6000 cc/hr or not greater than 5000 cc/hr.

Embodiment 111. The method of Embodiment 106, wherein the green body abrasive article comprises at least one of:
 i. a length of at least 6 cm;
 ii. a width of at least 2.8 cm;
 iii. a solid volume of at least 9 $cm^3$; and
 iv. a combination of any one of i., ii., and iii.

Embodiment 112. The method of Embodiment 111, wherein the green body comprises a thickness of at least 1 mm and not greater than 50 cm.

Embodiment 113. The method of Embodiment 111, wherein the green body comprises a thickness of not greater than 0.9 mm and at least 0.1 micron.

Embodiment 114. The method of Embodiment 111, wherein the length of the green body is at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 115. The method of Embodiment 111, wherein the length of the green body is not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 116. The method of Embodiment 111, wherein the width is at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 117. The method of Embodiment 111, wherein the width of the green body is not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 118. The method of Embodiment 111, wherein the volume is at least 10 $cm^3$ or at least 11 $cm^3$ or at least 12 $cm^3$ or at least 13 $cm^3$ or at least 14 $cm^3$ or at least 15 $cm^3$ or at least 16 $cm^3$ or at least 17 $cm^3$ or at least 18 $cm^3$ or at least 19 $cm^3$ or at least 20 $cm^3$ or at least 21 $cm^3$ or at least 22 $cm^3$ or at least 23 $cm^3$ or at least 24 $cm^3$ or at least 25 $cm^3$ or at least 26 $cm^3$ or at least 27 $cm^3$ or at least 28 $cm^3$ or at least 29 $cm^3$ or at least 30 $cm^3$ or at least 31 $cm^3$ or at least 32 $cm^3$ or at least 33 $cm^3$ or at least 34 $cm^3$ or at least 35 $cm^3$ or at least 36 $cm^3$ or at least 37 $cm^3$ or at least 38 $cm^3$ or at least 39 $cm^3$ or at least 40 $cm^3$ or at least 42 $cm^3$ or at least 44 $cm^3$ or at least 46 $cm^3$ or at least 48 $cm^3$ or at least 50 $cm^3$.

Embodiment 119. The method of Embodiment 111, wherein the volume is not greater than 5000 $cm^3$ or not greater than 4000 $cm^3$ or not greater than 3000 $cm^3$ or not greater than 2000 $cm^3$ or not greater than 1000 $cm^3$ or not greater than 800 $cm^3$ or not greater than 600 $cm^3$ or not greater than 500 $cm^3$.

Embodiment 120. The method of Embodiment 106, wherein the green body has a primary aspect ratio (length: width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 121. The method of Embodiment 106, wherein the green body has a primary aspect ratio (length: width) of not greater than 10000:1 or not greater than 5000:1 or not greater than 1000:1 or not greater than 500:1 or not greater than 200:1 or not greater than 100:1 or not greater than 50:1.

Embodiment 122. The method of Embodiment 106, wherein the green body has a secondary aspect ratio (length: thickness) that is the same as any of the ratios for primary aspect ratio provided in Embodiments 120 and 121.

Embodiment 123. The method of Embodiment 106, wherein the green body has a tertiary aspect ratio (width: thickness) that is the same as any of the ratios for primary aspect ratio provided in Embodiments 120 and 121.

Embodiment 124. The method of Embodiment 106, further including any other features of methods embodied or disclosed herein.

Embodiment 125. The method of Embodiment 106, wherein the green body and/or a finally-formed abrasive article formed from the green body includes any one or more features of the green body and/or finally-formed abrasive article embodied or disclosed herein.

Embodiment 126. A method of forming a batch comprising:
forming a plurality of green body abrasive articles defining a batch, wherein each of the green body abrasive articles comprise a precursor bond material and abrasive particles, wherein forming is conducted by:
creating one or more layers of powder material;
selectively binding portions of the one or more layers with a binder material;
converting the binder material to at least partially solidify the binder material and bind portions of powder material from the one or more layers; and
wherein forming the plurality of green body abrasive articles is conducted at a batch forming rate of at least 120 cc/hr.

Embodiment 127. The method of Embodiment 126, wherein a batch is a plurality of green body abrasive articles or finally-formed abrasive articles formed in a single additive manufacturing processing cycle.

Embodiment 128. The method of Embodiment 126, wherein a batch is a plurality of green body abrasive articles or finally-formed abrasive articles formed in a single bindering jetting processing cycle, such that a plurality of discrete green bodies is formed in a single build box at the same time.

Embodiment 129. The method of Embodiment 126, wherein forming includes binder jetting to form the plurality of green body abrasive articles.

Embodiment 130. The method of Embodiment 126, wherein the batch forming rate is at least 130 cc/hr or at least 150 cc/hr or at least 180 cc/hr or at least 200 cc/hr or at least 300 cc/hr or at least 400 cc/hr or at least 500 cc/hr or at least 600 cc/hr or at least 700 cc/hr or at least 800 cc/hr or at least 900 cc/hr or at least 1000 cc/hr or at least 1200 cc/hr or at least 1400 cc/hr or at least 1600 cc/hr or at least 1800 cc/hr or at least 2000 cc/hr or at least 2200 cc/hr or at least 2400 cc/hr or at least 2600 cc/hr or at least 2800 cc/hr or at least 3000 cc/hr.

Embodiment 131. The method of Embodiment 106, wherein the batch forming rate is within a range of at least 130 cc/hr and not greater than 7000 cc/hr.

Embodiment 132. The method of Embodiment 106, wherein the batch forming rate is not greater than 7000 cc/hr or not greater than 6000 cc/hr or not greater than 5000 cc/hr.

Embodiment 133. The method of Embodiment 126, wherein the plurality of green body abrasive articles comprises a minimum batch volume of at least 9 cm$^3$.

Embodiment 134. The method of Embodiment 126, wherein each green body of the plurality of green body abrasive articles of the batch comprises a thickness of at least 1 mm and not greater than 50 cm.

Embodiment 135. The method of Embodiment 126, wherein each green body of the plurality of green body abrasive articles of the batch comprises a thickness of not greater than 0.9 mm and at least 0.1 microns.

Embodiment 136. The method of Embodiment 126, wherein each green body of the plurality of green body abrasive articles of the batch comprises a length of at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 137. The method of Embodiment 126, wherein each green body of the plurality of green body abrasive articles of the batch comprises a length of not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 138. The method of Embodiment 126, wherein each green body of the plurality of green body abrasive articles of the batch comprises a width of at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 139. The method of Embodiment 126, wherein each green body of the plurality of green body abrasive articles of the batch comprises a width of not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 140. The method of Embodiment 126, wherein each green body of the plurality of green body abrasive articles of the batch comprises a primary aspect ratio (length:width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 141. The method of Embodiment 126, wherein each green body of the plurality of green body abrasive articles of the batch comprises a primary aspect ratio (length:width) of not greater than 10000:1 or not greater than 5000:1 or not greater than 1000:1 or not greater than 500:1 or not greater than 200:1 or not greater than 100:1 or not greater than 50:1.

Embodiment 142. The method of Embodiment 126, wherein each green body of the plurality of green body abrasive articles of the batch comprises a secondary aspect ratio (length:thickness) that is the same as any of the ratios for primary aspect ratio provided in Embodiments 140 and 141.

Embodiment 143. The method of Embodiment 126, wherein each green body of the plurality of green body abrasive articles of the batch comprises a tertiary aspect ratio (width:thickness) that is the same as any of the ratios for primary aspect ratio provided in Embodiments 140 and 141.

Embodiment 144. The method of Embodiment 126, wherein the batch comprises a volume of at least 9 cm$^3$ wherein the batch volume is at least 10 cm$^3$ or at least 11 cm$^3$ or at least 12 cm$^3$ or at least 13 cm$^3$ or at least 14 cm$^3$ or at least 15 cm$^3$ or at least 16 cm$^3$ or at least 17 cm$^3$ or at least 18 cm$^3$ or at least 19 cm$^3$ or at least 20 cm$^3$ or at least 21 cm$^3$ or at least 22 cm$^3$ or at least 23 cm$^3$ or at least 24 cm$^3$ or at least 25 cm$^3$ or at least 26 cm$^3$ or at least 27 cm$^3$ or at least 28 cm$^3$ or at least 29 cm$^3$ or at least 30 cm$^3$ or at least 31 cm$^3$ or at least 32 cm$^3$ or at least 33 cm$^3$ or at least 34 cm$^3$ or at least 35 cm$^3$ or at least 36 cm$^3$ or at least 37 cm$^3$ or at least 38 cm$^3$ or at least 39 cm$^3$ or at least 40 cm$^3$ or at least 42 cm$^3$ or at least 44 cm$^3$ or at least 46 cm$^3$ or at least 48 cm$^3$ or at least 50 cm$^3$.

Embodiment 145. The method of Embodiment 126, wherein the batch volume is not greater than 5000 cm$^3$ or not greater than 4000 cm$^3$ or not greater than 3000 cm$^3$ or not greater than 2000 cm³ or not greater than 1000 cm³ or not greater than 800 cm³ or not greater than 600 cm³ or not greater than 500 cm³.

Embodiment 146. The method of Embodiment 126, further including any other features of methods embodied or disclosed herein.

Embodiment 147. The method of Embodiment 126, wherein the batch includes green body abrasive articles having any one or more features of the green bodies and/or finally-formed abrasive articles embodied or disclosed herein.

Embodiment 148. The method of Embodiment 126, wherein the batch of green body abrasive articles comprises a dimensional variation-L of not greater than 0.5% of the length of the bodies or not greater than 0.45% of the length of the bodies or not greater than 0.40% of the length of the bodies or not greater than 0.35% of the length of the bodies or not greater than 0.30% of the length of the bodies or not greater than 0.25% of the length of the bodies or not greater than 0.20% of the length of the bodies.

Embodiment 148. An abrasive article comprising:
a body in the form of a green body abrasive article or a finally-formed abrasive article including abrasive particles contained in a bond material, wherein the body comprises at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3)
and wherein the body further comprises at least one of:
a density variation-L of not greater than 20% of an average density value of the body, wherein density variation-L is measured along a length of the body;
a density variation-W of not greater than 20% of an average density value of the body, wherein density variation-W is measured along a width of the body;
a density variation-T of not greater than 20% of an average density value of the body, wherein density variation-T is measured along a thickness of the body;
or any combination of a)-c).

Embodiment 149. The abrasive article of Embodiment 148, wherein the density variation-L is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 150. The abrasive article of Embodiment 149, wherein the density variation-L is calculated by making multiple measurements of density spaced apart from each other along the length of the body. The density measurements may be evaluated by cross-sectional images taken in planes substantially perpendicular to the length of the body. Alternatively, ultrasonic, or other non-destructive techniques, may be used to create a map of the density variations in the body and used to measure density values and the change in density values of the body along the length of the body. The density variation-L can be the percent difference between an average density value of the body and a density value from a body having the greatest difference, plus or minus, in density from the average density value. The number of density values for a body or batch should be of a suitable statistically relevant sample size.

Embodiment 151. The abrasive article of Embodiment 148, wherein the density variation-W is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 152. The abrasive article of Embodiment 151, wherein the density variation-W is calculated by making multiple measurements of density spaced apart from each other along the width of the body. The density measurements may be evaluated by cross-sectional images taken in planes substantially perpendicular to the width of the body at different positions spaced apart from each other along the dimension of width. Alternatively, ultrasonic, or other non-destructive techniques, may be used to create a map of the density variations in the body and used to measure density values and the change in density values of the body along the width of the body. The density variation-W can be the percent difference between an average density value of the body and a density value from a body having the greatest difference, plus or minus, in density from the average density value. The number of density values for a body or batch should be of a suitable statistically relevant sample size.

Embodiment 153. The abrasive article of Embodiment 148, wherein the density variation-T is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 154. The abrasive article of Embodiment 153, wherein the density variation-T is calculated by making multiple measurements of density spaced apart from each other along the thickness of the body. The density measurements may be evaluated by cross-sectional images taken in planes substantially perpendicular to the thickness of the body at different positions spaced apart from each other along the dimension of thickness. Alternatively, ultrasonic, or other non-destructive techniques, may be used to create a map of the density variations in the body and used to measure density values and the change in density values of the body along the thickness of the body. The density variation-T can be the percent difference between an average density value of the body and a density value from a body having the greatest difference, plus or minus, in density from the average density value. The number of density values for a body or batch should be of a suitable statistically relevant sample size.

Embodiment 155. The abrasive article of Embodiment 148, wherein the body comprises at least one of:
i. a length of at least 6 cm;
ii. a width of at least 2.8 cm;

iii. a solid volume of at least 9 cm³;
iv. or any combination of any one or more of i., ii., and iii.

Embodiment 156. The abrasive article of Embodiment 155, wherein the body comprises a thickness of at least 1 mm and not greater than 50 cm.

Embodiment 157. The abrasive article of Embodiment 155, wherein the body comprises a thickness of not greater than 0.9 mm and at least 0.1 microns.

Embodiment 158. The abrasive article of Embodiment 155, wherein the length of the body is at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 159. The abrasive article of Embodiment 155, wherein the length of the body is not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 160. The abrasive article of Embodiment 155, wherein the width is at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 161. The abrasive article of Embodiment 155, wherein the width of a green body is not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 162. The abrasive article of Embodiment 155, wherein the body has a primary aspect ratio (length:width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 163. The abrasive article of Embodiment 155, wherein the body has a primary aspect ratio (length:width) of not greater than 10000:1 or not greater than 5000:1 or not greater than 1000:1 or not greater than 500:1 or not greater than 200:1 or not greater than 100:1 or not greater than 50:1.

Embodiment 164. The abrasive article of Embodiment 155, wherein the body has a secondary aspect ratio (length:thickness) that is the same as any of the ratios for the primary aspect ratio provided in Embodiments 61 and 62.

Embodiment 165. The abrasive article of Embodiment 155, wherein the body has a tertiary aspect ratio (width:thickness) that is the same as any of the ratios for primary aspect ratio provided in Embodiments 61 and 62.

Embodiment 166. The abrasive article of Embodiment 155, wherein the body comprises a length, a width, and a thickness, and wherein length>width>thickness.

Embodiment 167. The abrasive article of Embodiment 155, wherein the volume is at least 10 cm³ or at least 11 cm³ or at least 12 cm³ or at least 13 cm³ or at least 14 cm³ or at least 15 cm³ or at least 16 cm³ or at least 17 cm³ or at least 18 cm³ or at least 19 cm³ or at least 20 cm³ or at least 21 cm³ or at least 22 cm³ or at least 23 cm³ or at least 24 cm³ or at least 25 cm³ or at least 26 cm³ or at least 27 cm³ or at least 28 cm³ or at least 29 cm³ or at least 30 cm³ or at least 31 cm³ or at least 32 cm³ or at least 33 cm³ or at least 34 cm³ or at least 35 cm³ or at least 36 cm³ or at least 37 cm³ or at least 38 cm³ or at least 39 cm³ or at least 40 cm³ or at least 42 cm³ or at least 44 cm³ or at least 46 cm³ or at least 48 cm³ or at least 50 cm³.

Embodiment 168. The abrasive article of Embodiment 155, wherein the volume is not greater than 5000 cm³ or not greater than 4000 cm³ or not greater than 3000 cm³ or not greater than 2000 cm³ or not greater than 1000 cm³ or not greater than 800 cm³ or not greater than 600 cm³ or not greater than 500 cm³.

Embodiment 169. The abrasive article of Embodiment 148, wherein the body is free of an infiltrant.

Embodiment 170. The abrasive article of Embodiment 155, wherein the body comprises a theoretical density of at least 50% or at least 51% or at least or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%.

Embodiment 171. The abrasive article of Embodiment 155, wherein the body comprises a theoretical density of not greater than 99.9% or not greater than 99.5% or not greater than 99%.

Embodiment 172. The abrasive article of Embodiment 148, wherein the body includes any one or more features of any other body, green body or finally-formed body, embodied or disclosed herein.

Embodiment 173. An abrasive article comprising:
a body in the form of a green body abrasive article or a finally-formed abrasive article including abrasive particles contained in a bond material, wherein the body comprises at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3) and wherein the body further comprises at least one of:
a dimensional variation-L of not greater than 90% of an average dimensional value of the body, wherein dimensional variation-L is measured along a length of the body;
a dimensional variation-W of not greater than 90% of an average dimensional value of the body, wherein dimensional variation-W is measured along a width of the body;
a dimensional variation-T of not greater than 90% of an average dimensional value of the body, wherein dimensional variation-T is measured along a thickness of the body;
or any combination of a)-c).

Embodiment 174. The abrasive article of Embodiment 173, wherein the dimensional variation-L is not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%.

Embodiment 175. The abrasive article of Embodiment 173, wherein the dimensional variation-L is at least 0.0001% or at least 0.001% or at least 0.01% or at least 0.1%.

Embodiment 176. The abrasive article of Embodiment 173, wherein the dimensional variation-W is not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%.

Embodiment 177. The abrasive article of Embodiment 173, wherein the dimensional variation-W is at least 0.0001% or at least 0.001% or at least 0.01% or at least 0.1%.

Embodiment 178. The abrasive article of Embodiment 173, wherein the dimensional variation-T is not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%.

Embodiment 179. The abrasive article of Embodiment 173, wherein the dimensional variation-T is at least 0.0001% or at least 0.001% or at least 0.01% or at least 0.1%.

Embodiment 180. The abrasive article of Embodiment 173, wherein the body comprises at least one of:
  i. a length of at least 6 cm;
  ii. a width of at least 2.8 cm;
  iii. a solid volume of at least 9 cm$^3$;
  iv. or any combination of any one of i., ii., and iii.

Embodiment 181. The abrasive article of Embodiment 180, wherein the body comprises a thickness of at least 1 mm and not greater than 50 cm.

Embodiment 182. The abrasive article of Embodiment 180, wherein the body comprises a thickness of not greater than 0.9 mm and at least 0.1 microns.

Embodiment 183. The abrasive article of Embodiment 180, wherein the length of the body is at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 184. The abrasive article of Embodiment 180, wherein the length of the body is not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 185. The abrasive article of Embodiment 180, wherein the width is at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 186. The abrasive article of Embodiment 180, wherein the width of a green body is not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 187. The abrasive article of Embodiment 180, wherein the body has a primary aspect ratio (length:width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 188. The abrasive article of Embodiment 180, wherein the body has a primary aspect ratio (length:width) of not greater than 10000:1 or not greater than 5000:1 or not greater than 1000:1 or not greater than 500:1 or not greater than 200:1 or not greater than 100:1 or not greater than 50:1.

Embodiment 189. The abrasive article of Embodiment 180, wherein the body has a secondary aspect ratio (length:thickness) that is the same as any of the ratios for the primary aspect ratio provided in Embodiments 61 and 62.

Embodiment 190. The abrasive article of Embodiment 180, wherein the body has a tertiary aspect ratio (width:thickness) that is the same as any of the ratios for primary aspect ratio provided in Embodiments 61 and 62.

Embodiment 191. The abrasive article of Embodiment 180, wherein the body comprises a length, a width, and a thickness, and wherein length>width>thickness.

Embodiment 192. The abrasive article of Embodiment 180, wherein the volume is at least 10 cm$^3$ or at least 11 cm$^3$ or at least 12 cm$^3$ or at least 13 cm$^3$ or at least 14 cm$^3$ or at least 15 cm$^3$ or at least 16 cm$^3$ or at least 17 cm$^3$ or at least 18 cm$^3$ or at least 19 cm$^3$ or at least 20 cm$^3$ or at least 21 cm$^3$ or at least 22 cm$^3$ or at least 23 cm$^3$ or at least 24 cm$^3$ or at least 25 cm$^3$ or at least 26 cm$^3$ or at least 27 cm$^3$ or at least 28 cm$^3$ or at least 29 cm$^3$ or at least 30 cm$^3$ or at least 31 cm$^3$ or at least 32 cm$^3$ or at least 33 cm$^3$ or at least 34 cm$^3$ or at least 35 cm$^3$ or at least 36 cm$^3$ or at least 37 cm$^3$ or at least 38 cm$^3$ or at least 39 cm$^3$ or at least 40 cm$^3$ or at least 42 cm$^3$ or at least 44 cm$^3$ or at least 46 cm$^3$ or at least 48 cm$^3$ or at least 50 cm$^3$.

Embodiment 193. The abrasive article of Embodiment 180, wherein the volume is not greater than 5000 cm$^3$ or not greater than 4000 cm$^3$ or not greater than 3000 cm$^3$ or not greater than 2000 cm$^3$ or not greater than 1000 cm$^3$ or not greater than 800 cm$^3$ or not greater than 600 cm$^3$ or not greater than 500 cm$^3$.

Embodiment 194. The abrasive article of Embodiment 173, wherein the body is free of an infiltrant.

Embodiment 195. The abrasive article of Embodiment 173, wherein the body comprises a theoretical density of at least 50% or at least 51% or at least or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%.

Embodiment 196. The abrasive article of Embodiment 173, wherein the body comprises a theoretical density of not greater than 99.9% or not greater than 99.5% or not greater than 99%.

Embodiment 197. The abrasive article of Embodiment 173, wherein the body includes any one or more features of any other body, green body or finally-formed body, embodied or disclosed herein.

Embodiment 198. The abrasive article of Embodiment 173, wherein the body further comprises at least one of:
a) a density variation-L of not greater than 20% of an average density value of the body, wherein density variation-L is measured along a length of the body;
b) a density variation-W of not greater than 20% of an average density value of the body, wherein density variation-W is measured along a width of the body;
c) a density variation-T of not greater than 20% of an average density value of the body, wherein density variation-T is measured along a thickness of the body;
d) or any combination of a)-c).

Embodiment 199. An abrasive article comprising:
a body in the form of a green body abrasive article or a finally-formed abrasive article including abrasive particles contained in a bond material, wherein the body comprises at least one of: a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3) and wherein the body further comprises at least one of:
a hardness variation-L of not greater than 20% of an average hardness value of the body, wherein hardness variation-L is measured along a length of the body;
a hardness variation-W of not greater than 20% of an average hardness value of the body, wherein hardness variation-W is measured along a width of the body;
a hardness variation-T of not greater than 20% of an average hardness value of the body, wherein hardness variation-T is measured along a thickness of the body;
or any combination of a)-c).

Embodiment 200. The abrasive article of Embodiment 199, wherein the hardness variation-L is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 201. The abrasive article of Embodiment 199, wherein the hardness variation-W is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 202. The abrasive article of Embodiment 199, wherein the hardness variation-T is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 203. The abrasive article of Embodiment 199, wherein the body comprises at least one of:
  i. a length of at least 6 cm;
  ii. a width of at least 2.8 cm;
  iii. a solid volume of at least 9 $cm^3$;
  iv. or any combination of any one of i., ii., and iii.

Embodiment 204. The abrasive article of Embodiment 203, wherein the body comprises a thickness of at least 1 mm and not greater than 50 cm.

Embodiment 205. The abrasive article of Embodiment 203, wherein the body comprises a thickness of not greater than 0.9 mm and at least 0.1 microns.

Embodiment 206. The abrasive article of Embodiment 203, wherein the length of the body is at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 207. The abrasive article of Embodiment 203, wherein the length of the body is not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 208. The abrasive article of Embodiment 203, wherein the width is at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 209. The abrasive article of Embodiment 203, wherein the width of a green body is not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 210. The abrasive article of Embodiment 203, wherein the volume is at least 10 $cm^3$ or at least 11 $cm^3$ or at least 12 $cm^3$ or at least 13 $cm^3$ or at least 14 $cm^3$ or at least 15 $cm^3$ or at least 16 $cm^3$ or at least 17 $cm^3$ or at least 18 $cm^3$ or at least 19 $cm^3$ or at least 20 $cm^3$ or at least 21 $cm^3$ or at least 22 $cm^3$ or at least 23 $cm^3$ or at least 24 $cm^3$ or at least 25 $cm^3$ or at least 26 $cm^3$ or at least 27 $cm^3$ or at least 28 $cm^3$ or at least 29 $cm^3$ or at least 30 $cm^3$ or at least 31 $cm^3$ or at least 32 $cm^3$ or at least 33 $cm^3$ or at least 34 $cm^3$ or at least 35 $cm^3$ or at least 36 $cm^3$ or at least 37 $cm^3$ or at least 38 $cm^3$ or at least 39 $cm^3$ or at least 40 $cm^3$ or at least 42 $cm^3$ or at least 44 $cm^3$ or at least 46 $cm^3$ or at least 48 $cm^3$ or at least 50 $cm^3$.

Embodiment 211. The abrasive article of Embodiment 203, wherein the volume is not greater than 5000 $cm^3$ or not greater than 4000 $cm^3$ or not greater than 3000 $cm^3$ or not greater than 2000 $cm^3$ or not greater than 1000 $cm^3$ or not greater than 800 $cm^3$ or not greater than 600 $cm^3$ or not greater than 500 $cm^3$.

Embodiment 212. The abrasive article of Embodiment 199, wherein the body has a primary aspect ratio (length:width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 213. The abrasive article of Embodiment 199, wherein the body has a primary aspect ratio (length:width) of not greater than 10000:1 or not greater than 5000:1 or not greater than 1000:1 or not greater than 500:1 or not greater than 200:1 or not greater than 100:1 or not greater than 50:1.

Embodiment 214. The abrasive article of Embodiment 199, wherein the body has a secondary aspect ratio (length:thickness) that is the same as any of the ratios for primary aspect ratio provided in Embodiments 61 and 62.

Embodiment 215. The abrasive article of Embodiment 199, wherein the body has a tertiary aspect ratio (width:thickness) that is the same as any of the ratios for primary aspect ratio provided in Embodiments 61 and 62.

Embodiment 216. The abrasive article of Embodiment 199, wherein the body comprises a length, a width, and a thickness, and wherein length>width>thickness.

Embodiment 217. The abrasive article of Embodiment 199, wherein the body is free of an infiltrant.

Embodiment 218. The abrasive article of Embodiment 199, wherein the body comprises a theoretical density of at least 50% or at least 51% or at least or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%.

Embodiment 219. The abrasive article of Embodiment 199, wherein the body comprises a theoretical density of not greater than 99.9% or not greater than 99.5% or not greater than 99%.

Embodiment 220. The abrasive article of Embodiment 199, wherein the body includes any one or more features of any other body, green body or finally-formed body, embodied or disclosed herein.

Embodiment 221. The abrasive article of Embodiment 199, wherein the body further comprises at least one of:
a) a density variation-L of not greater than 20% of an average density value of the body, wherein density variation-L is measured along a length of the body;
b) a density variation-W of not greater than 20% of an average density value of the body, wherein density variation-W is measured along a width of the body;
c) a density variation-T of not greater than 20% of an average density value of the body, wherein density variation-T is measured along a thickness of the body;
d) or any combination of a)-c).

Embodiment 222. The abrasive article of Embodiment 199, wherein the body further comprises at least one of:
a dimensional variation-L of not greater than 90% of an average dimensional value of the body, wherein dimensional variation-L is measured along a length of the body;
a dimensional variation-W of not greater than 90% of an average dimensional value of the body, wherein dimensional variation-W is measured along a width of the body;
a dimensional variation-T of not greater than 90% of an average dimensional value of the body, wherein dimensional variation-T is measured along a thickness of the body;
or any combination of a)-c).

Embodiment 223. An abrasive article comprising:
a body in the form of a green body abrasive article or a finally-formed abrasive article including abrasive particles contained in a bond material, wherein the body comprises at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3) and wherein the body further comprises at least one of:
a MOR variation-L of not greater than 20% of an average MOR value of the body, wherein MOR variation-L is measured along a length of the body;
a MOR variation-W of not greater than 20% of an average MOR value of the body, wherein MOR variation-W is measured along a width of the body;
a MOR variation-T of not greater than 20% of an average MOR value of the body, wherein MOR variation-T is measured along a thickness of the body;
a MOE variation-L of not greater than 20% of an average MOE value of the body, wherein MOE variation-L is measured along a length of the body;
a MOE variation-W of not greater than 20% of an average MOE value of the body, wherein MOE variation-W is measured along a width of the body;
a MOE variation-T of not greater than 20% of an average MOE value of the body, wherein MOE variation-T is measured along a thickness of the body;
or any combination of a)-f).

Embodiment 224. The abrasive article of Embodiment 223, wherein the MOR variation-L is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 225. The abrasive article of Embodiment 223, wherein the MOR variation-W is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 226. The abrasive article of Embodiment 223, wherein the MOR variation-T is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 227. The abrasive article of Embodiment 223, wherein the MOE variation-L is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 228. The abrasive article of Embodiment 223, wherein the MOE variation-W is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 229. The abrasive article of Embodiment 223, wherein the MOE variation-T is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 230. The abrasive article of Embodiment 223, wherein the body includes any one or more features of any other body, green body or finally-formed body, embodied or disclosed herein.

Embodiment 231. The abrasive article of Embodiment 223, wherein the body further comprises at least one of:
a) a density variation-L of not greater than 20% of an average density value of the body, wherein density variation-L is measured along a length of the body;
b) a density variation-W of not greater than 20% of an average density value of the body, wherein density variation-W is measured along a width of the body;
c) a density variation-T of not greater than 20% of an average density value of the body, wherein density variation-T is measured along a thickness of the body;
d) or any combination of a)-c).

Embodiment 232. The abrasive article of Embodiment 223, wherein the body further comprises at least one of:
a dimensional variation-L of not greater than 90% of an average dimensional value of the body, wherein dimensional variation-L is measured along a length of the body;
a dimensional variation-W of not greater than 90% of an average dimensional value of the body, wherein dimensional variation-W is measured along a width of the body;
a dimensional variation-T of not greater than 90% of an average dimensional value of the body, wherein dimensional variation-T is measured along a thickness of the body;
or any combination of a)-c).

Embodiment 233. An abrasive article comprising:
a body in the form of a green body abrasive article or a finally-formed abrasive article including abrasive particles contained in a bond material, wherein the body comprises at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3) and wherein the body further comprises at least one of:
a major planar surface having a nWarp of not greater than 50 $\mu m/cm^2$, wherein nWarp is the warp of the major planar surface normalized for the surface area of the major planar surface;
a major planar surface having a nFlatness of not greater than 50 $\mu m/cm^2$, wherein nFlatness is the flatness of the major planar surface normalized for the surface area of the major planar surface;
a major planar surface having a nBow of not greater than 50 $\mu m/cm^2$, wherein nBow is the bow of the major planar surface normalized for the surface area of the major planar surface;
a first major planar surface and a second major planar surface substantially parallel to the first major planar surface, wherein the distance between the first major planar surface and second major planar surface comprises a nDimension variation of not greater than 100 $\mu m/cm^2$, wherein nDimension variation is the variation in the dimension between the first and second major planar surfaces normalized to the area of the first or second major planar surfaces;
or any combination of a)-d).

Embodiment 234. The abrasive article of Embodiment 233, wherein nWarp is not greater than 40 $\mu m/cm^2$ or not greater than 30 $\mu m/cm^2$ or not greater than 20 $\mu m/cm^2$ or not greater than 10 $\mu m/cm^2$ or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3 $\mu m/cm^2$ or not greater than 2 $\mu m/cm^2$ or not greater than 1 $\mu m/cm^2$ or not greater than 0.9 $\mu m/cm^2$ or not greater than 0.8 $\mu m/cm^2$ or not greater than 0.7 $\mu m/cm^2$ or not greater than 0.6 $\mu m/cm^2$ or not greater than 0.5 $\mu m/cm^2$ or not greater than 0.4 $\mu m/cm^2$ or not greater than 0.3 $\mu m/cm^2$ or not greater than 0.2 $\mu m/cm^2$ or not greater than 0.1 $\mu m/cm^2$ or not greater than 0.09 $\mu m/cm^2$ or not greater than 0.08 $\mu m/cm^2$ or not greater than 0.07 $\mu m/cm^2$ or not greater than 0.06 $\mu m/cm^2$ or not greater than 0.05 $\mu m/cm^2$ or not greater than 0.04 $\mu m/cm^2$ or not greater than 0.03 $\mu m/cm^2$ or not greater than 0.02 $\mu m/cm^2$ or not greater than 0.01 $\mu m/cm^2$.

Embodiment 235. The abrasive article of Embodiment 233, wherein nWarp is at least 0.0001 $\mu m/cm^2$ or at least 0.0005 $\mu m/cm^2$ or at least 0.001 $\mu m/cm^2$ or at least 0.005 $\mu m/cm^2$ or at least 0.01 $\mu m/cm^2$ or at least 0.1 $\mu m/cm^2$.

Embodiment 236. The abrasive article of Embodiment 233, wherein nFlatness is not greater than 40 $\mu m/cm^2$ or not greater than 30 $\mu m/cm^2$ or not greater than 20 $\mu m/cm^2$ or not greater than 10 $\mu m/cm^2$ or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3 $\mu m/cm^2$ or not greater than 2 $\mu m/cm^2$ or not greater than 1 $\mu m/cm^2$ or not greater than 0.9 $\mu m/cm^2$ or not greater than 0.8 $\mu m/cm^2$ or not greater than 0.7 $\mu m/cm^2$ or not greater than 0.6 $\mu m/cm^2$ or not greater than 0.5 $\mu m/cm^2$ or not greater than 0.4 $\mu m/cm^2$ or not greater than 0.3 $\mu m/cm^2$ or not greater than 0.2 $\mu m/cm^2$ or not greater than 0.1 $\mu m/cm^2$ or not greater than 0.09 $\mu m/cm^2$ or not greater than 0.08 $\mu m/cm^2$ or not greater than 0.07 $\mu m/cm^2$ or not greater than 0.06 $\mu m/cm^2$ or not greater than 0.05 $\mu m/cm^2$ or not greater than 0.04 $\mu m/cm^2$ or not greater than 0.03 $\mu m/cm^2$ or not greater than 0.02 $\mu m/cm^2$ or not greater than 0.01 $\mu m/cm^2$.

Embodiment 237. The abrasive article of Embodiment 233, wherein n Warp is at least 0.0001 $\mu m/cm^2$ or at least 0.0005 $\mu m/cm^2$ or at least 0.001 $\mu m/cm^2$ or at least 0.005 $\mu m/cm^2$ or at least 0.01 $\mu m/cm^2$ or at least 0.1 $\mu m/cm^2$.

Embodiment 238. The abrasive article of Embodiment 233, wherein nBow is not greater 40 $\mu m/cm^2$ or not greater than 30 $\mu m/cm^2$ or not greater than 20 $\mu m/cm^2$ or not greater than 10 $\mu m/cm^2$ or not greater than 9 $\mu m/cm^2$ or not greater than 8 $\mu m/cm^2$ or not greater than 7 $\mu m/cm^2$ or not greater than 6 $\mu m/cm^2$ or not greater than 5 $\mu m/cm^2$ or not greater than 4 $\mu m/cm^2$ or not greater than 3 $\mu m/cm^2$ or not greater than 2 $\mu m/cm^2$ or not greater than 1 $\mu m/cm^2$ or not greater than 0.9 $\mu m/cm^2$ or not greater than 0.8 $\mu m/cm^2$ or not greater than 0.7 $\mu m/cm^2$ or not greater than 0.6 $\mu m/cm^2$ or not greater than 0.5 $\mu m/cm^2$ or not greater than 0.4 $\mu m/cm^2$ or not greater than 0.3 $\mu m/cm^2$ or not greater than 0.2 $\mu m/cm^2$ or not greater than 0.1 $\mu m/cm^2$ or not greater than 0.09 $\mu m/cm^2$ or not greater than 0.08 $\mu m/cm^2$ or not greater than 0.07 $\mu m/cm^2$ or not greater than 0.06 $\mu m/cm^2$ or not greater than 0.05 $\mu m/cm^2$ or not greater than 0.04 $\mu m/cm^2$ or not greater than 0.03 $\mu m/cm^2$ or not greater than 0.02 $\mu m/cm^2$ or not greater than 0.01 $\mu m/cm^2$.

Embodiment 239. The abrasive article of Embodiment 233, wherein nBow is at least 0.0001 $\mu m/cm^2$ or at least 0.0005 $\mu m/cm^2$ or at least 0.001 $\mu m/cm^2$ or at least 0.005 $\mu m/cm^2$ or at least 0.01 $\mu m/cm^2$ or at least 0.1 $\mu m/cm^2$.

Embodiment 240. The abrasive article of Embodiment 233, wherein nDimension variation is not greater than 90 μm/cm² or not greater than 80 μm/cm² or not greater than 70 μm/cm² or not greater than 60 μm/cm² or not greater than 50 μm/cm² or not greater than 40 μm/cm² or not greater than 30 μm/cm² or not greater than 20 μm/cm² or not greater than 10 μm/cm² or not greater than 9 μm/cm² or not greater than 8 μm/cm² or not greater than 7 μm/cm² or not greater than 6 μm/cm² or not greater than 5 μm/cm² or not greater than 4 μm/cm² or not greater than 3 μm/cm² or not greater than 2 μm/cm² or not greater than 1 μm/cm² or not greater than 0.9 μm/cm² or not greater than 0.8 μm/cm² or not greater than 0.7 μm/cm² or not greater than 0.6 μm/cm² or not greater than 0.5 μm/cm² or not greater than 0.4 μm/cm² or not greater than 0.3 μm/cm² or not greater than 0.2 μm/cm² or not greater than 0.1 μm/cm² or not greater than 0.09 μm/cm² or not greater than 0.08 μm/cm² or not greater than 0.07 μm/cm² or not greater than 0.06 μm/cm² or not greater than 0.05 μm/cm² or not greater than 0.04 μm/cm² or not greater than 0.03 μm/cm² or not greater than 0.02 μm/cm² or not greater than 0.01 μm/cm².

Embodiment 241. The abrasive article of Embodiment 233, wherein nDimension variation is at least 0.0001 μm/cm² or at least 0.0005 μm/cm² or at least 0.001 μm/cm² or at least 0.005 μm/cm² or at least 0.01 μm/cm² or at least 0.1 μm/cm² or at least 1 μm/cm² or at least 5 μm/cm².

Embodiment 242. The abrasive article of Embodiment 233, wherein the body comprises at least one of:
i. a length of at least 6 cm;
ii. a width of at least 2.8 cm;
iii. a solid volume of at least 9 cm³;
iv. or any combination of any one of i., ii., and iii.

Embodiment 243. The abrasive article of Embodiment 242, wherein the body comprises a thickness of at least 1 mm and not greater than 50 cm.

Embodiment 244. The abrasive article of Embodiment 242, wherein the body comprises a thickness of not greater than 0.9 mm and at least 0.1 microns.

Embodiment 245. The abrasive article of Embodiment 242, wherein the length of the body is at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 246. The abrasive article of Embodiment 242, wherein the length of the body is not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 247. The abrasive article of Embodiment 242, wherein the width is at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 248. The abrasive article of Embodiment 242, wherein the width is not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 249. The abrasive article of Embodiment 242, wherein the volume is at least 10 cm³ or at least 11 cm³ or at least 12 cm³ or at least 13 cm³ or at least 14 cm³ or at least 15 cm³ or at least 16 cm³ or at least 17 cm³ or at least 18 cm³ or at least 19 cm³ or at least 20 cm³ or at least 21 cm³ or at least 22 cm³ or at least 23 cm³ or at least 24 cm³ or at least 25 cm³ or at least 26 cm³ or at least 27 cm³ or at least 28 cm³ or at least 29 cm³ or at least 30 cm³ or at least 31 cm³ or at least 32 cm³ or at least 33 cm³ or at least 34 cm³ or at least 35 cm³ or at least 36 cm³ or at least 37 cm³ or at least 38 cm³ or at least 39 cm³ or at least 40 cm³ or at least 42 cm³ or at least 44 cm³ or at least 46 cm³ or at least 48 cm³ or at least 50 cm³.

Embodiment 250. The abrasive article of Embodiment 242, wherein the volume is not greater than 5000 cm³ or not greater than 4000 cm³ or not greater than 3000 cm³ or not greater than 2000 cm³ or not greater than 1000 cm³ or not greater than 800 cm³ or not greater than 600 cm³ or not greater than 500 cm³.

Embodiment 251. The abrasive article of Embodiment 233, wherein the body has a primary aspect ratio (length: width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 252. The abrasive article of Embodiment 233, wherein the body has a primary aspect ratio (length: width) of not greater than 10000:1 or not greater than 5000:1 or not greater than 1000:1 or not greater than 500:1 or not greater than 200:1 or not greater than 100:1 or not greater than 50:1.

Embodiment 253. The abrasive article of Embodiment 233, wherein the body has a secondary aspect ratio (length: thickness) that is the same as any of the ratios for the primary aspect ratio.

Embodiment 254. The abrasive article of Embodiment 233, wherein the body has a tertiary aspect ratio (width: thickness) that is the same as any of the ratios for the primary aspect ratio.

Embodiment 255. The abrasive article of Embodiment 233, wherein the body comprises a length, a width, and a thickness, and wherein length>width>thickness.

Embodiment 256. The abrasive article of Embodiment 233, wherein the body is free of an infiltrant.

Embodiment 257. The abrasive article of Embodiment 233, wherein the body comprises a theoretical density of at least 50% or at least 51% or at least or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%.

Embodiment 258. The abrasive article of Embodiment 233, wherein the body comprises a theoretical density of not greater than 99.9% or not greater than 99.5% or not greater than 99%.

Embodiment 259. The abrasive article of Embodiment 233, wherein the body includes any one or more features of any other body, green body or finally-formed body, embodied or disclosed herein.

Embodiment 260. The abrasive article of Embodiment 233, wherein the body comprises at least one of:
- a MOR variation-L of not greater than 20% of an average MOR value of the body, wherein MOR variation-L is measured along a length of the body;
- a MOR variation-W of not greater than 20% of an average MOR value of the body, wherein MOR variation-W is measured along a width of the body;
- a MOR variation-T of not greater than 20% of an average MOR value of the body, wherein MOR variation-T is measured along a thickness of the body;
- a MOE variation-L of not greater than 20% of an average MOE value of the body, wherein MOE variation-L is measured along a length of the body;
- a MOE variation-W of not greater than 20% of an average MOE value of the body, wherein MOE variation-W is measured along a width of the body;
- a MOE variation-T of not greater than 20% of an average MOE value of the body, wherein MOE variation-T is measured along a thickness of the body;
- or any combination of a)-f).

Embodiment 261. The abrasive article of Embodiment 233, wherein the body further comprises at least one of:
- a) a density variation-L of not greater than 20% of an average density value of the body, wherein density variation-L is measured along a length of the body;
- b) a density variation-W of not greater than 20% of an average density value of the body, wherein density variation-W is measured along a width of the body;
- c) a density variation-T of not greater than 20% of an average density value of the body, wherein density variation-T is measured along a thickness of the body; and
- d) any combination of a)-c).

Embodiment 262. The abrasive article of Embodiment 233, wherein the body further comprises at least one of:
- a dimensional variation-L of not greater than 90% of an average dimensional value of the body, wherein dimensional variation-L is measured along a length of the body;
- a dimensional variation-W of not greater than 90% of an average dimensional value of the body, wherein dimensional variation-W is measured along a width of the body;
- a dimensional variation-T of not greater than 90% of an average dimensional value of the body, wherein dimensional variation-T is measured along a thickness of the body; and
- any combination of a)-c).

Embodiment 263. A batch of abrasive articles comprising:
- a plurality of bodies in the form of two or more green body abrasive articles or two or more finally-formed abrasive articles, the plurality of bodies including abrasive particles contained in a bond material, wherein each body comprises at least one of:
- a microstructure Feature greater than 1;
- a first surface having a first developed interfacial area ratio (Sdr1) and a second surface having a second developed interfacial area ratio (Sdr2), wherein the difference between Sdr1 and Sdr2 is not greater than 25%;
- an exterior surface having a first developed interfacial area ratio (Sdr) of at least 40%; and
- or a combination of any one of 1), 2), and 3) wherein the plurality of bodies comprises at least one of:
  - a) a batch density variation of not greater than 20% of an average density value of the batch;
  - b) a batch dimensional variation-L of not greater than 90% of an average length value of the batch, wherein dimensional variation-L is measured along a length of each of the bodies in the batch;
  - c) a batch hardness variation of not greater than 20% of an average density value of the batch;
  - d) a batch MOR variation of not greater than 20% of an average MOR value of the batch;
  - e) a batch MOE variation of not greater than 20% of an average MOE value of the batch;
  - f) a batch nWarp standard deviation of not greater than 10, wherein batch nWarp variation is the standard deviation of nWarp for all bodies of the same shape in a batch;
  - g) a batch nFlatness standard deviation of not greater than 10, wherein batch nFlatness variation is the standard deviation of nFlatness for all bodies of the same shape in a batch;
  - h) a batch nBow standard deviation of not greater than 10, wherein batch nBow standard deviation is the standard deviation of nBow for all bodies of the same shape in a batch;
  - i) a batch nDimensional standard deviation of not greater than 50, wherein batch nDimensional standard deviation is the standard deviation of nDimension variation for all bodies of the same shape in a batch;
  - j) or any combination of a)-i).

Embodiment 264. The abrasive article of Embodiment 263, wherein the batch density variation is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 265. The abrasive article of Embodiment 263, wherein the batch density variation is at least 0.00001% or at least 0.0001%.

Embodiment 266. The abrasive article of Embodiment 264, wherein the batch density variation is calculated by measuring the density of each body of the plurality of bodies made via a single operation, wherein the batch density variation is a measure of the percent difference between an average density value of the batch and a density value from a body having the greatest difference, plus or minus, in density from the average density value of the batch. Note that multiple density values can be taken for each body of the plurality of bodies in the batch, and any of the density values taken from a body is relevant for comparison and calculation of the batch density variation. Each density value of the body may be averaged to create an average body density value for each discrete body in the batch. The average batch density value can be calculated by averaging the average density values for each body of the batch. The number of density values for a body or batch should be of a suitable statistically relevant sample size.

Embodiment 267. The abrasive article of Embodiment 263, wherein the batch dimensional variation-L is not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%.

Embodiment 268. The abrasive article of Embodiment 263, wherein the batch dimensional variation-L is at least 0.0001% or at least 0.001% or at least 0.01% or at least 0.1%.

Embodiment 269. The abrasive article of Embodiment 267, wherein the batch dimensional variation-L is calculated by measuring the length of each body of the plurality of bodies made via a single operation, wherein the batch dimensional variation-L is the percent difference between an average length of same-shaped bodies of a batch and a length value of a body having the greatest difference, plus or minus, in length from the average length value of the batch. Note that multiple length values can be taken for each body of the plurality of bodies in the batch, and any of the length values taken from a body is relevant for comparison and calculation of the batch dimensional variation-L. More than one length measurement may be made on an individual body and averaged to create an average length value for each discrete body in the batch. An average length value of the batch can be calculated by averaging the average length values for each same-shaped body of the batch. The number of length values for a body or the batch should be of a suitable statistically relevant sample size.

Embodiment 270. The abrasive article of Embodiment 263, wherein the batch hardness variation is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 271. The abrasive article of Embodiment 263, wherein the batch hardness variation is at least 0.00001% or at least 0.0001%.

Embodiment 272. The abrasive article of Embodiment 270, wherein the batch hardness variation is calculated by measuring the hardness of each body of the plurality of bodies made via a single operation, wherein the batch hardness variation is a measure of the percent difference between an average hardness value of the batch and a hardness value from a body having the greatest difference, plus or minus, in hardness from the average hardness value of the batch. Note that multiple hardness values can be taken for each body of the plurality of bodies in the batch, and any of the hardness values taken from a body is relevant for comparison and calculation of the batch hardness variation. Each hardness value of the body may be averaged to create an average body hardness value for each discrete body in the batch. The average batch hardness value can be calculated by averaging the average hardness values for each body of the batch. The number of hardness values for a body or batch should be of a suitable statistically relevant sample size.

Embodiment 273. The abrasive article of Embodiment 263, further comprising a batch dimensional variation-W, of not greater than 90% of an average width value of the bodies of the batch, wherein dimensional variation-W is measured along a width of each of the bodies in the batch, wherein the batch dimensional variation-W is not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%.

Embodiment 274. The abrasive article of Embodiment 273, wherein the batch dimensional variation-W is calculated by measuring the width of each body of the plurality of bodies made via a single operation, wherein the batch dimensional variation-W is the percent difference between an average width of same-shaped bodies of a batch and a width value of a body having the greatest difference, plus or minus, in width from the average width value of the batch. Note that multiple width values can be taken for each body of the plurality of bodies in the batch, and any of the width values taken from a body is relevant for comparison and calculation of the batch dimensional variation-W. More than one width measurement may be made on an individual body and averaged to create an average width value for each discrete body in the batch. An average width value of the batch can be calculated by averaging the average width values for each same-shaped body of the batch. The number of width values for a body or the batch should be of a suitable statistically relevant sample size.

Embodiment 275. The abrasive article of Embodiment 263, further comprising a batch dimensional variation-T, of not greater than 90% of an average thickness value of the bodies of the batch, wherein dimensional variation-T is measured along a thickness of each of the bodies in the batch, wherein the batch dimensional variation-T is not greater than 89% or not greater than 88% or not greater than 87% or not greater than 86% or not greater than 85% or not greater than 84% or not greater than 83% or not greater than 82% or not greater than 81% or not greater than 80% or not greater than 79% or not greater than 78% or not greater than 77% or not greater than 76% or not greater than 75% or not greater than 74% or not greater than 73% or not greater than 72% or not greater than 71% or not greater than 70% or not greater than 69% or not greater than 68% or not greater than 67% or not greater than 66% or not greater than 65% or not greater than 64% or not greater than 63% or not greater than 62% or not greater than 61% or not greater than 60% or not greater than 59% or not greater than 58% or not greater than 57% or not greater than 56% or not greater than 55% or not greater than 54% or not greater than 53% or not greater than 52% or not greater than 51% or not greater than 50% or not greater than 49% or not greater than 48% or not greater than 47% or not greater than 46% or not greater than 45% or not greater than 44% or not greater than 43% or not greater than 42% or not greater than 41% or not greater than 40% or not greater than 39% or not greater than 38% or not greater than 37% or not greater than 36% or not greater than 35% or not greater than 34% or not greater than 33% or not greater than 32% or not greater than 31% or not greater than 30% or not greater than 29% or not greater than 28% or not greater than 27% or not greater than 26% or not greater than 25% or not greater than 24% or not greater than 23% or not greater than 22% or not greater than 21% or not greater than 20% or not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1%.

Embodiment 276. The abrasive article of Embodiment 275, wherein the batch dimensional variation-T is calculated by measuring the thickness of each body of the plurality of bodies made via a single operation, wherein the batch dimensional variation-T is the percent difference between an average thickness of same-shaped bodies of a batch and a thickness value of a body having the greatest difference, plus or minus, in thickness from the average thickness value of the batch. Note that multiple thickness values can be taken for each body of the plurality of bodies in the batch, and any of the thickness values taken from a body is relevant for comparison and calculation of the batch dimensional variation-T. More than one thickness measurement may be made on an individual body and averaged to create an average thickness value for each discrete body in the batch. An average thickness value of the batch can be calculated by averaging the average thickness values for each same-shaped body of the batch. The number of thickness values for a body or the batch should be of a suitable statistically relevant sample size.

Embodiment 277. The abrasive article of Embodiment 263, wherein the batch MOR variation is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 278. The abrasive article of Embodiment 277, wherein the batch MOR variation is at least 0.00001% or at least 0.0001%.

Embodiment 279. The abrasive article of Embodiment 277, wherein the batch MOR variation is calculated by measuring the MOR of each body of the plurality of bodies made via a single operation, wherein the batch MOR variation is a measure of the percent difference between an average MOR value of the batch and a MOR value from a body having the greatest difference, plus or minus, in MOR from the average MOR value of the batch. The number of MOR values for a batch should be of a suitable statistically relevant sample size.

Embodiment 280. The abrasive article of Embodiment 263, wherein the batch MOE variation is not greater than 19% or not greater than 18% or not greater than 17% or not greater than 16% or not greater than 15% or not greater than 14% or not greater than 13% or not greater than 12% or not greater than 11% or not greater than 10% or not greater than 9% or not greater than 8% or not greater than 7% or not greater than 6% or not greater than 5% or not greater than 4% or not greater than 3% or not greater than 2% or not greater than 1% or not greater than 0.5% or not greater than 0.3% or not greater than 0.1%.

Embodiment 281. The abrasive article of Embodiment 280, wherein the batch MOE variation is at least 0.00001% or at least 0.0001%.

Embodiment 282. The abrasive article of Embodiment 280, wherein the batch MOE variation is calculated by measuring the MOE of each body of the plurality of bodies made via a single operation, wherein the batch MOE variation is a measure of the percent difference between an average MOE value of the batch and a MOE value from a body having the greatest difference, plus or minus, in MOE from the average MOE value of the batch. The number of MOE values for a batch should be of a suitable statistically relevant sample size.

Embodiment 283. The abrasive article of Embodiment 263, wherein the batch nWarp standard deviation is not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01.

Embodiment 284. The abrasive article of Embodiment 283, wherein the batch nWarp standard deviation is at least 0.0005 or at least 0.001 or at least 0.005 or at least 0.01 or at least 0.1.

Embodiment 285. The abrasive article of Embodiment 263, wherein the batch nFlatness standard deviation is not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01.

Embodiment 286. The abrasive article of Embodiment 285, wherein the batch nFlatness standard deviation is at least 0.0005 or at least 0.001 or at least 0.005 or at least 0.01 or at least 0.1.

Embodiment 287. The abrasive article of Embodiment 263, wherein the batch nBow standard deviation is not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01.

Embodiment 288. The abrasive article of Embodiment 287, wherein the batch nBow standard deviation is at least 0.0005 or at least 0.001 or at least 0.005 or at least 0.01 or at least 0.1.

Embodiment 289. The abrasive article of Embodiment 263, wherein the batch nDimensional variation standard deviation is not greater than 40 or not greater than 30 or not greater than 20 or not greater than 10 or not greater than 9 or not greater than 8 or not greater than 7 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.09 or not greater than 0.08 or not greater than 0.07 or not greater than 0.06 or not greater than 0.05 or not greater than 0.04 or not greater than 0.03 or not greater than 0.02 or not greater than 0.01.

Embodiment 290. The abrasive article of Embodiment 263, wherein the batch nDimensional variation standard deviation is at least 0.005 or at least 0.001 or at least 0.005 or at least 0.01 or at least 0.1 or at least 1 or at least 5.

Embodiment 291. The abrasive article of Embodiment 263, wherein the finally-formed abrasive articles of the batch have a residual stress in an exterior surface from post-forming operations that is at least 1% less than residual stress in conventionally-formed abrasive articles or wherein the residual stress is at least 2% less or at least 3% less or at least 4% less or at least 5% less or at least 6% less or at least 7% less or at least 8% less or at least 9% less or at least 10% less or at least 11% less or at least 12% less or at least 13% less or at least 14% less or at least 15% less or at least 16% less or at least 17% less or at least 18% less or at least 19% less or at least 20% less or at least 25% less or at least 30% less or at least 35% less or at least 40% less or at least 45% less or at least 50% less or at least 55% less or at least 60% less or at least 65% less or at least 70% less or at least 75% less or at least 80% less or at least 85% less or at least 90% less or at least 95% less or at least 100% less.

Embodiment 292. The abrasive article of Embodiment 263, wherein the residual stress is not greater than 500% less than residual stress in conventionally-formed abrasive articles or not greater than 400% less or not greater than 300% less or not greater than 200% less or not greater than 100% or not greater than 90% less.

Embodiment 293. The abrasive article of Embodiment 263, wherein each body of the plurality of bodies comprises at least one of:
  i. a length of at least 6 cm;
  ii. a width of at least 2.8 cm; and
  iii. any combination of any one of i. and ii.

Embodiment 294. The abrasive article of Embodiment 293, wherein each body of the plurality of bodies comprises a thickness of at least 1 mm and not greater than 50 cm.

Embodiment 295. The abrasive article of Embodiment 293, wherein each body of the plurality of bodies comprises a thickness of not greater than 0.9 mm and at least 0.1 microns.

Embodiment 296. The abrasive article of Embodiment 293, wherein the length of each body is at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm or at least 18 cm or at least 20 cm.

Embodiment 297. The abrasive article of Embodiment 293, wherein the length of each body is not greater than 100 cm or not greater than 90 cm or not greater than 80 cm or not greater than 70 cm or not greater than 60 cm or not greater than 50 cm or not greater than 40 cm or not greater than 30 cm or not greater than 25 cm.

Embodiment 298. The abrasive article of Embodiment 293, wherein the width of each body is at least 3 cm or at least 3.5 cm or at least 4 cm or at least 4.5 cm or at least 5 cm or at least 5.5 cm or at least 6 cm or at least 6.5 cm or at least 7 cm or at least 7.5 cm or at least 8 cm or at least 8.5 cm or at least 9 cm or at least 9.5 cm or at least 10 cm or at least 10.5 cm or at least 11 cm or at least 12 cm or at least 13 cm or at least 14 cm or at least 15 cm.

Embodiment 299. The abrasive article of Embodiment 293, wherein with width of each body is not greater than 500 cm or not greater than 450 cm or not greater than 400 cm or not greater than 350 cm or not greater than 300 cm or not greater than 250 cm or not greater than 200 cm or not greater than 150 cm or not greater than 100 cm.

Embodiment 300. The abrasive article of Embodiment 263, wherein the volume of the plurality of bodies of the batch includes a batch volume is at least 10 cm$^3$ or at least 11 cm$^3$ or at least 12 cm$^3$ or at least 13 cm$^3$ or at least 14 cm$^3$ or at least 15 cm$^3$ or at least 16 cm$^3$ or at least 17 cm$^3$ or at least 18 cm$^3$ or at least 19 cm$^3$ or at least 20 cm$^3$ or at least 21 cm$^3$ or at least 22 cm$^3$ or at least 23 cm$^3$ or at least 24 cm$^3$ or at least 25 cm$^3$ or at least 26 cm$^3$ or at least 27 cm$^3$ or at least 28 cm$^3$ or at least 29 cm$^3$ or at least 30 cm$^3$ or at least 31 cm$^3$ or at least 32 cm$^3$ or at least 33 cm$^3$ or at least 34 cm$^3$ or at least 35 cm$^3$ or at least 36 cm$^3$ or at least 37 cm$^3$ or at least 38 cm$^3$ or at least 39 cm$^3$ or at least 40 cm$^3$ or at least 42 cm$^3$ or at least 44 cm$^3$ or at least 46 cm$^3$ or at least 48 cm$^3$ or at least 50 cm$^3$.

Embodiment 301. The abrasive article of Embodiment 263, wherein the volume of the plurality of bodies of the batch includes a batch volume is not greater than 5000 cm$^3$ or not greater than 4000 cm$^3$ or not greater than 3000 cm$^3$ or not greater than 2000 cm³ or not greater than 1000 cm³ or not greater than 800 cm³ or not greater than 600 cm³ or not greater than 500 cm³.

Embodiment 302. The abrasive article of Embodiment 263, wherein each body of the plurality of bodies has a primary aspect ratio (length:width) of at least 1:1 or at least 1.1:1 or at least 1.2:1 or at least 1.3:1 or at least 1.4:1 or at least 1.5:1 or at least 1.8:1 or at least 2:1 or at least 3:1 or at least 4:1 or at least 5:1 or at least 6:1 or at least 7:1 or at least 8:1 or at least 9:1 or at least 10:1.

Embodiment 303. The abrasive article of Embodiment 263, wherein each body of the plurality of bodies has a primary aspect ratio (length:width) of not greater than 10000:1 or not greater than 5000:1 or not greater than 1000:1 or not greater than 500:1 or not greater than 200:1 or not greater than 100:1 or not greater than 50:1.

Embodiment 304. The abrasive article of Embodiment 263, wherein each body of the plurality of bodies has a secondary aspect ratio (length:thickness) that is the same as any of the ratios for primary aspect ratio provided in Embodiments 302 and 303.

Embodiment 305. The abrasive article of Embodiment 263, wherein each body of the plurality of bodies has a tertiary aspect ratio (width:thickness) that is the same as any of the ratios for primary aspect ratio provided in Embodiments 302 and 303.

Embodiment 306. The abrasive article of Embodiment 263, wherein each body of the plurality of bodies has a length, a width, and a thickness, and wherein length>width>thickness.

Embodiment 307. The abrasive article of Embodiment 263, wherein each body of the plurality of bodies is free of an infiltrant.

Embodiment 308. The abrasive article of Embodiment 263, wherein each body of the plurality of bodies has a theoretical density of at least 50% or at least 51% or at least or at least 53% or at least 54% or at least 55% or at least 56% or at least 57% or at least 58% or at least 59% or at least 60% or at least 61% or at least 62% or at least 63% or at least 64% or at least 65% or at least 66% or at least 67% or at least 68% or at least 69% or at least 70% or at least 71% or at least 72% or at least 73% or at least 74% or at least 75% or at least 76% or at least 77% or at least 78% or at least 79% or at least 80% or at least 81% or at least 82% or at least 83% or at least 84% or at least 85% or at least 86% or at least 87% or at least 88% or at least 89% or at least 90% or at least 91% or at least 92% or at least 93% or at least 94% or at least 95% or at least 96% or at least 97% or at least 98% or at least 99%.

Embodiment 309. The abrasive article of Embodiment 263, wherein each body of the plurality of bodies has a theoretical density of not greater than 99.9% or not greater than 99.5% or not greater than 99%.

Embodiment 310. The abrasive article of Embodiment 263, wherein each body of the plurality of bodies can include any one or more features of any other body, green body or finally-formed body, embodied or disclosed herein.

Embodiment 311. A finally-formed abrasive article comprising:
a body including abrasive particles contained in a bond material, wherein the body comprises at least one of:
a microstructure Feature greater than 1;
a first surface having a first developed interfacial area ratio (Sdr1) and a second surface having a second developed interfacial area ratio (Sdr2), wherein the difference between Sdr1 and Sdr2 is not greater than 25%;
an exterior surface having a first developed interfacial area ratio (Sdr) of at least 40%; and
or a combination of any one of 1), 2), and 3) and wherein the body comprises at least one of:
a residual stress in an exterior surface that is at least 1% less than a residual stress in conventionally-formed abrasive article;
subsurface damage or residual stress that extends for at least 0.01% and not greater than 200% of an average particle size (D50) of the abrasive particles; and
a combination of a) and b).

Embodiment 312. The finally-formed abrasive article of Embodiment 311, wherein the residual stress is at least 2% less or at least 3% less or at least 4% less or at least 5% less or at least 6% less or at least 7% less or at least 8% less or at least 9% less or at least 10% less or at least 11% less or at least 12% less or at least 13% less or at least 14% less or at least 15% less or at least 16% less or at least 17% less or at least 18% less or at least 19% less or at least 20% less or at least 25% less or at least 30% less or at least 35% less or at least 40% less or at least 45% less or at least 50% less or at least 55% less or at least 60% less or at least 65% less or at least 70% less or at least 75% less or at least 80% less or at least 85% less or at least 90% less or at least 95% less or at least 100% less.

Embodiment 313. The finally-formed abrasive article of Embodiment 311, wherein the residual stress is not greater than 500% less than residual stress in conventionally-formed abrasive articles or not greater than 400% less or not greater than 300% less or not greater than 200% less or not greater than 100% or not greater than 90% less.

Embodiment 314. The finally-formed abrasive article of Embodiment 311, wherein the subsurface damage or residual stress extends for a distance below an exterior surface of the body for at least 0.05% of the D50 of the abrasive particles or at least 0.08% or at least 0.1% or at least 0.5% or at least 1% or at least 2% or at least 3% or at least 4% or at least 5% or at least 6% or at least 7% or at least 8% or at least 9% or at least 10% or at least 11% or at least 12% or at least 13% or at least 14% or at least 15% or at least 18% or at least 20% or at least 22% or at least 25% or at least 28% or at least 30% or at least 32% or at least 35% or at least 38% or at least 40% or at least 42% or at least 45% or at least 48% or at least 50% or at least 52% or at least 55% or at least 58% or at least 60% or at least 62% or at least 65% or at least 67% or at least 68% or at least 70% or at least 72% or at least 75% or at least 78% or at least 80% or at least 82% or at least 85% or at least 88% or at least 90% or at least 92% or at least 95% or at least 98% or at least 100% or at least 102% or at least 105% or at least 108% or at least 110% or at least 115% or at least 120% or at least 125% or at least 130% or at least 140% or at least 150% or at least 160% or at least 170% or at least 180% of the D50 of the abrasive particles.

Embodiment 315. The finally-formed abrasive article of Embodiment 311, wherein the subsurface damage or residual stress extends for a distance below an exterior surface of the body for not greater than 190% of the D50 of the abrasive particles or not greater than 180% or not greater than 170% or not greater than 160% or not greater than 150% or not greater than 140% or not greater than 130% or not greater than 120% or not greater than 110% or not greater than 100% or not greater than 90% or not greater than 80% or not greater than 70% or not greater than 60% or not greater than 50% or not greater than 40% or not greater than 30% or not greater than 20% or not greater than 10% of the D50 of the abrasive particles.

Embodiment 316. The finally-formed abrasive article of Embodiment 311, wherein the body includes any one or more features of any other finally-formed body embodied or disclosed herein.

Embodiment 317. The abrasive article or method of forming an article according to any of the Embodiments herein, wherein body or method for forming the body defines a forming ratio (Add/Sub) of at least 10, wherein "Add" defines the volume of solid material (cm³) formed via additive processes used to form the body and "Sub" defines the volume (cm³) of solid material formed via a subtractive process to finish the finally-formed body, wherein the forming ratio is at least 20 or at least 50 or at least 80 or at least 100 or at least 200 or at least 300 or at least 400 or at least 500 or at least 600 or at least 700 or at least 800 or at least 1000 or at least 5000 or at least 10000.

Embodiment 318. The abrasive article of any one of the Embodiments herein, wherein the abrasive articles are formed via binder jetting.

Embodiment 319. The abrasive article or method of forming an article according to any of the Embodiments herein, wherein reference to a length may be a reference to a diameter of a circular shape or surface or reference to a primary axis of an elliptical shape or surface.

Embodiment 320. The abrasive article or method of forming an article according to any of the Embodiments herein, wherein reference to a width may be a reference to a diameter of a circular shape or surface that is substantially perpendicular to a diameter defining the length or reference to a lateral (secondary) axis of an elliptical shape or surface that extends substantially perpendicular to the primary axis.

Embodiment 321. The abrasive article or method of forming an article according to any of the Embodiments herein, wherein the finally-formed abrasive article can have any one or more features of a green body as embodied or disclosed herein.

Embodiment 322. The abrasive articles of any of the Embodiments herein, wherein the green body or finally-formed abrasive article can be formed via any one or more methods embodied or disclosed herein.

Embodiment 323. The abrasive article or method of forming an article according to any of the Embodiments herein, wherein the Microstructure Feature is greater than 1 or at least 2 or at least 3 or at least 4 or at least 5 or at least 6 or at least 7.

Embodiment 324. The abrasive article or method of forming an article according to any of the Embodiments herein, wherein the body comprises a Microstructure Feature not greater than 10 or not greater than 9 or not greater than 8 or not greater than 7 or not greater than 6 or not greater than 5 or not greater than 4 or not greater than 3.

Embodiment 325. The abrasive article or method of forming an article according to any of the Embodiments herein, the Microstructure Feature comprises a Spacing Value of at least 0.01 or at least 0.03, or at least 0.04, or at least 0.06, or at least 0.08, or at least 0.1, or at least 0.2, at least 0.3, or at least 0.4, or at least 0.5 or at least 0.6, or at least 0.7, or at least 0.8, or at least 0.9, or at least 1, at least 1.1, or at least 1.3, or at least 1.4, or at least 1.5, or at least 1.6, or at least 1.8, or at least 1.9, or at least 2, or at least 2.1, or at least 2.3, or at least 2.5, or at least 2.6, or at least 2.8, or at least 3, or at least 3.1, or at least 3.3, or at least 3.5, or at least 3.6, or at least 3.8, or at least 4, at least 4.2, or at least 4.5, or at least 4.7, or at least 5, or at least 6, or at least 7, or at least 8, or at least 9, or at least 10, or at least 11, or at least 12, or at least 15, or at least 20, or at least 30, or at least, or at least 80, or at least 100, or at least 200, or at least 300, or at least 400, or at least 500.

Embodiment 326. The abrasive article or method of forming an article according to any of the Embodiments herein, wherein the Microstructure Feature comprises a Spacing Value of not greater than 2000, or not greater than 1000, or not greater than 500, or not greater than 400, or not greater than 300, or not greater than 200, or not greater than 100, or not greater than 80, or not greater than 50, or not greater than 40, or not greater than 30, or not greater than 20, or not greater than 10, or not greater than 9.8, not greater than 9.6, not greater than 9.5, not greater than 9.3, or not greater than 9, or not greater than 8.8, not greater than 8.6, not greater than 8.4, not greater than 8.2, or not greater than 8, or not greater than 7.8, not greater than 7.6, not greater than 7.4, not greater than 7.2, or not greater than 7, or not greater than 6.8, not greater than 6.6, not greater than 6.4, not greater than 6.2, or not greater than 6, or not greater than 5.8, not greater than 5.6, not greater than 5.5, not greater than 5.2, or not greater than 5, or not greater than 4.8, not greater than 4.6, not greater than 4.4, not greater than 4.2, or not greater than 4, or not greater than 3.8, not greater than 3.6, not greater than 3.4, not greater than 3.2, or not greater than 3, or not greater than 2.8, not greater than 2.6, not greater than 2.4, not greater than 2.2, or not greater than 2, or not greater than 1.8, or not greater than 1.6, or not greater than 1.5, or not greater than 1.4, or not greater than 1.3, or not greater than 1.2, or not greater than 1, or not greater than 0.8, not greater than 0.6, not greater than 0.4, not greater than 0.2, or not greater than 0.1.

Embodiment 327. The abrasive article or method of forming an article according to any of the Embodiments herein, wherein the body comprises a total porosity of not greater than 10 vol % for a total volume of the body or not greater than 8 vol % or not greater than 7 vol % or not greater than 6 vol % or not greater than 5 vol % or not greater than 4 vol % or not greater than 3 vol % or not greater than 2 vol % or not greater than 1 vol %.

Embodiment 328. The abrasive article or method of forming an article according to any of the Embodiments herein, wherein the body is a fixed abrasive such as a bonded abrasive article comprising abrasive particles contained in a three-dimensional volume of bond material, wherein the bond material substantially surrounds a majority of the abrasive particles.

Embodiment 329. The abrasive article or method of forming an article according to any of the Embodiments herein, wherein the body is a fixed abrasive such as a single-layered abrasive article wherein a substantially single layer of abrasive particles is contained in a layer of bond material.

Embodiment 330. The abrasive article or method of forming an article according to any of the Embodiments herein, wherein the body comprises an abrasive agglomerate that can be shaped or unshaped, wherein the abrasive agglomerate includes a controlled content of bond material, abrasive particles, and optional porosity.

Embodiment 331. The abrasive article or method of forming an article according to any of the Embodiments herein, wherein the body comprises an abrasive preform having a shape including abrasive regions arranged in a predetermined distribution relative to each other, wherein the abrasive regions are joined by one or more bond regions, which may optionally include bond material that can be the same as or distinct from the composition of the abrasive regions, and wherein the abrasive preform is configured to be incorporated into a fixed abrasive article, such as a bonded abrasive or coated abrasive article.

Embodiment 332. The abrasive article or method of forming an article according to any of the Embodiments herein, wherein the body comprises a first surface having a first developed interfacial area ratio (Sdr1) and a second surface having a second developed interfacial area ratio (Sdr2), wherein the difference between Sdr1 and Sdr2 is not greater than 25%.

Embodiment 333. The abrasive article or method of forming an article according to any of the Embodiments herein, wherein Sdr1 is at least 40% or at least 42% or at least 44% or at least 46% or at least 48% or at least 50% or at least 52% or at least 54% or at least 56% or at least 58% or at least 60% or at least 62% or at least 64% or at least 66% or at least 68% or at least 70%.

Embodiment 334. The abrasive article or method of forming an article according to any of the Embodiments herein, wherein Sdr1 is not greater than 140%, or not greater than 135% or not greater than 130% or not greater than 125% or not greater than 120% or not greater than 115% or not greater than 110% or not greater than 105% or not greater than 100% or not greater than 95% or not greater than 90% or not greater than 85% or not greater than 80%.

Embodiment 335. The abrasive article or method of forming an article according to any of the Embodiments herein, wherein Sdr2 is not greater than 110% or not greater than 105% or not greater than 100% or not greater than 95% or not greater than 90% or not greater than 85% or not greater than 80% or not greater than 75%.

Embodiment 336. The abrasive article or method of forming an article according to any of the Embodiments herein, wherein Sdr2 is at least 5%, at least 10%, at least 15%, at least 20%, at least 25%, at least 30%, at least 35%, at least 40%, or at least 45%.

Embodiment 337. The abrasive article or method of forming an article according to any of the Embodiments herein, wherein the difference between Sdr1 and Sdr2 is at least 1% or at least 2% or at least 3% or at least 4% or at least 5% or at least 6% or at least 7% or at least 8% or at least 9% or at least 10%.

Embodiment 338. The abrasive article or method of forming an article according to any of the Embodiments herein, wherein the difference between Sdr1 and Sdr2 is not greater than 25% or not greater than 24% or not greater than 23% or not greater than 22%, or not greater than 21% or not greater than 20% or not greater than 19% or not greater than 18% or not greater than 17% or not greater than 16% or not greater than 15% or not greater than 14% or not greater than 13% or not greater than 12% or not greater than 10% or not greater than 9% or not greater than 8% or not greater than 7% or not greater than 6% or not greater than 5% or not greater than 4% or not greater than 3%.

Embodiment 339. The abrasive article or method of forming an article according to any of the Embodiments herein, wherein a ratio of Sdr1 to Sdr2 is not greater than 1:2 or not greater than 1:1.9 or not greater than 1:1.8 or not greater than 1:1.7 or not greater than 1:1.6 or not greater than 1:1.5 or not greater than 1:1.4 or not greater than 1:1.3 or at least 1:1.01 or at least 1:1.02 or at least 1:1.03.

Embodiment 340. The abrasive article or method of forming an article according to any of the Embodiments herein, wherein the first surface and the second surface are oriented to each other by an angle of at least 2°, at least 5°, at least 8°, at least 10°, at least 12°, at least 15°, at least 18°, at least 19°, at least 20°, at least 22°, at least 25°, at least 27°, at least 30°, at least 33°, at least 35°, at least 37°, at least 40°, at least 41°, at least 43°, at least 45°, at least 47°, at least 48°, at least 50°, at least 52°, at least 55°, at least 58°, at least 60°, at least 62°, at least 64°, at least 66°, at least 68°, at least 70°, at least 72°, at least 74°, at least 76°, at least 78°, at least 80°, at least 82°, at least 85°, at least 88°, or at least 90° or at most 180°, at most 178°, at most 176°, at most 174°, at most 172°, at most 170°, at most 168°, at most 166°, at most 164°, at most 162°, at most 160°, at most 158°, at most 156°, at most 154°, at most 152°, at most 150°, at most 147°, at most 145°, at most 143°, at most 140°, at most 138°, at most 135°, at most 133°, at most 130°, at most 127°, at most 124°, at most 121°, at most 118°, at most 115°, at most 112°, at most 109°, at most 105°, at most 102°, at most 99°, at most 96°, at most 93°, at most 90°, such as at most 88°, at most 86°, at most 84°, at most 82°, at most 80°, at most 78°, at most 75°, at most 74°, at most 72°, at most 70°, at most 68°, at most 66°, at most 64°, at most 62°, at most 60°, at most 58°, at most 66°, at most 64°, at most 62°, at most 60°, at most 58°, at most 55°, at most 54°, at most 52°, at most 50°, at most 48°, at most 46°, at most 44°, at most 42°, at most 40°, at most 38°, at most 36°, at most 34°, at most 32°, or at most 30°.

Embodiment 341. The abrasive article or method of forming an article according to any of the Embodiments herein, wherein the first surface is oriented orthogonal to the second surface.

Embodiment 342. The abrasive article or method of forming an article according to any of the Embodiments herein, wherein the first surface has a first surface roughness (Sa1) of at least 1 micron or at least 1.5 microns or at least 2 microns or at least 2.5 microns or at least 3 microns or at least 3.5 microns or at least 4 microns or at least 4.5 microns or at least 5 microns.

Embodiment 343. The abrasive article or method of forming an article according to any of the Embodiments herein, wherein the first surface has a first surface roughness (Sa1) of not greater than 28 microns, not greater than 25 microns, not greater than 22 microns, not greater than 18 microns, or not greater than 15 microns.

Embodiment 344. The abrasive article or method of forming an article according to any of the Embodiments herein, wherein the second surface has a second surface roughness (Sa2) of not greater than 25 microns, not greater than 23 microns, not greater than 21 microns, not greater than 19 microns, not greater than 17 microns, or not greater than 15 microns, or not greater than 14 microns, or not greater than 13 microns.

Embodiment 345. The abrasive article or method of forming an article according to any of the Embodiments herein, wherein the second surface has a second surface roughness (Sa2) of at least 1 micron, at least 2 microns, at least 3 microns, at least 4 microns, or at least 5 microns.

Embodiment 346. The abrasive article or method of forming an article according to any of the Embodiments herein, wherein the difference between Sa1 and Sa2 is not greater than 6 microns or not greater than 5.5 microns or not greater than 5 microns or not greater than 4.5 microns or not greater than 4 microns or not greater than 3.5 microns or not greater than 3 microns.

Embodiment 347. The abrasive article or method of forming an article according to any of the Embodiments herein, wherein the fixed abrasive article is a wheel or an abrasive super finishing stick.

Embodiment 348. The abrasive article or method of forming an article according to any of the Embodiments herein, wherein the body, a green body abrasive article or finally-formed abrasive article, further comprises at least one of:

a major planar surface having a nWarp of not greater than 50 μm/cm², wherein nWarp is the warp of the major planar surface normalized for the surface area of the major planar surface;

a major planar surface having a nFlatness of not greater than 50 μm/cm², wherein nFlatness is the flatness of the major planar surface normalized for the surface area of the major planar surface;

a major planar surface having a nBow of not greater than 50 μm/cm², wherein nBow is the bow of the major planar surface normalized for the surface area of the major planar surface;

a first major planar surface and a second major planar surface substantially parallel to the first major planar surface, wherein the distance between the first major planar surface and second major planar surface comprises a nDimension variation of not greater than 100 μm/cm², wherein nDimension variation is the variation in the dimension between the first and second major planar surfaces normalized to the area of the first or second major planar surfaces;

or any combination of a)-d).

Embodiment 349. A plurality of abrasive articles made via additive manufacturing and using recycled raw material powder, wherein the plurality of abrasive articles comprises at least one of:

a batch density variation of not greater than 10% average theoretical density;

an Archimedes batch density standard deviation of less than 0.03 g/cc;

an average batch flexural strength of at least 0.08 MPa;

a batch flexural strength standard deviation of less than 0.25 MPa;

a batch dimensional variation-L of less than 0.5% of the average length as measured by (batch length standard deviation/average batch length)×100%;

a batch dimensional variation-W of less than 1.2% of the average width as measured by (batch width standard deviation/average batch width)×100%;

a normalized batch dimensional variation-T of less than 9% as measured by (batch thickness standard deviation/average batch thickness)×100%; or any combination of a)-g).

Embodiment 350. The plurality of abrasive articles of Embodiment 349, wherein the plurality of abrasive articles includes green body abrasive articles or sintered abrasive particles.

Embodiment 351. The plurality of abrasive articles of Embodiment 349, wherein each abrasive article of the plurality of abrasive articles comprises a body having at least one of: a microstructure Feature value greater than 1;

a first surface having a first developed interfacial area ratio (Sdr1) and a second surface having a second developed interfacial area ratio (Sdr2), wherein the difference between Sdr1 and Sdr2 is not greater than 25%;

an exterior surface having a first developed interfacial area ratio (Sdr) of at least 40%;

multiple layers of bond material and abrasives bonded to each other; and or a combination of any one of 1), 2), 3), and 4).

Embodiment 352. The plurality of abrasive articles of Embodiment 349, wherein each abrasive article of the plurality of abrasive articles comprises a body having a Linear Feature Factor that is less than a Linear Feature Factor from a body formed through an uncontrolled recycling process.

Embodiment 353. The plurality of abrasive articles of Embodiment 349, wherein the abrasive article comprises a linear feature factor of at least 0.320 cm and less than 2.54 cm.

Embodiment 353. The plurality of abrasive articles of Embodiment 349, wherein the batch density variation is not greater than 2.5% of the average density of the batch or not greater than 2.4% or not greater than 2.3%, or not greater than 2.2%, or not greater than 2.1% or not greater than 2.0% or not greater than 1.9% or not greater than 1.8% or not greater than 1.7% or not greater than 1.6% or not greater than 1.5% or not greater than 1.4% or not greater than 1.3% or not greater than 1.2% or not greater than 1.1% or not greater than 1.0% or not greater than 0.9% or not greater than 0.8%.

Embodiment 354. The plurality of abrasive articles of Embodiment 349, wherein the batch density variation is at least 0.001% or at least 0.01% or at least 0.1%.

Embodiment 355. The plurality of abrasive articles of Embodiment 349, wherein the batch of abrasive articles has an average batch Archimedes density of at least 1.8 g/cc or at least 1.85 g/cc or at least 1.90 g/cc or at least 1.95 g/cc or at least 2.0 g/cc.

Embodiment 356. The plurality of abrasive articles of Embodiment 349, wherein the batch of abrasive articles has an average batch Archimedes density of less than 3 g/cc or less than 2.9 g/cc or less than 2.8 g/cc or less than 2.7 g/cc or less than 2.6 g/cc or less than 2.5 g/cc or less than 2.4 g/cc or less than 2.3 g/cc or less than 2.2 g/cc.

Embodiment 357. The plurality of abrasive articles of Embodiment 349, wherein the batch of abrasive articles has an Archimedes density standard deviation of less than 0.029 g/cc or less than 0.028 g/cc or less than 0.027 g/cc or less than 0.026 g/cc or less than 0.025 g/cc or less than 0.024 g/cc or less than 0.023 g/cc or less than 0.022 g/cc or less than 0.021 g/cc or less than 0.020 g/cc or less than 0.019 g/cc or less than 0.018 g/cc or less than 0.017 g/cc or less than 0.016 g/cc or less than 0.015 g/cc.

Embodiment 358. The plurality of abrasive articles of Embodiment 349, wherein the batch of abrasive articles has an Archimedes density standard deviation of at least 0.001 or at least 0.005.

Embodiment 359. The plurality of abrasive articles of Embodiment 349, wherein the batch of abrasive articles has an average batch flexural strength of at least 0.05 MPa or at least 0.06 MPa or at least 0.07 MPa or at least 0.08 MPa or at least 0.1 MPa or at least 0.11 MPa or at least 0.15 MPa.

Embodiment 360. The plurality of abrasive articles of Embodiment 349, wherein the batch of abrasive articles has an average batch flexural strength of less than 1 MPa.

Embodiment 361. The plurality of abrasive articles of Embodiment 349, wherein the batch of abrasive articles has a batch flexural strength standard deviation of less than 0.24 MPa or less than 0.23 MPa or less than 0.22 MPa or less than 0.21 MPa, or less than 0.20 MPa or less than 0.19 MPa or less than 0.18 MPa or less than 0.17 MPa or less than 0.17 MPa or less than 0.16 MPa or less than 0.15 MPa or less than 0.14 MPa or less than 0.13 MPa or less than 0.12 MPa or less than 0.11 MPa or less than 0.1 MPa or less than 0.09 MPa or less than 0.08 MPa or less than 0.07 MPa or less than 0.06 MPa or less than 0.05 MPa.

Embodiment 362. The plurality of abrasive articles of Embodiment 349, wherein the batch of abrasive articles has a flexural strength standard deviation of at least 0.01 MPa or at least 0.02 MPa.

Embodiment 363. The plurality of abrasive articles of Embodiment 349, wherein the batch of abrasive articles has an average length of at least 10 mm or at least 20 mm or at least 30 mm or at least 40 mm or at least 50 mm or at least 60 mm or at least 70 mm or at least 80 mm or at least 90 mm or at least 100 mm or at least 110 mm or at least 120 mm or at least 130 mm.

Embodiment 364. The plurality of abrasive articles of Embodiment 349, wherein the batch of abrasive articles has an average length of not greater than 500 mm or not greater than 400 mm or not greater than 300 mm or not greater than 200 mm or not greater than 150 mm.

Embodiment 365. The plurality of abrasive articles of Embodiment 349, wherein the batch of abrasive articles has an average width of at least 1 mm or at least 2 mm or at least 3 mm or at least 4 mm or at least 6 mm or at least 8 mm or at least 10 mm or at least 15 mm or at least 20 mm or at least 30 mm.

Embodiment 366. The plurality of abrasive articles of Embodiment 349, wherein the batch of abrasive articles has an average width of not greater than 150 mm or not greater than 120 mm or not greater than 100 mm or not greater than 80 mm or not greater than 60 mm or not greater than 50 mm.

Embodiment 367. The plurality of abrasive articles of Embodiment 349, wherein the batch of abrasive articles has an average thickness of at least 1 mm or at least 2 mm or at least 3 mm or at least 4 mm or at least 5 mm or at least 6 mm or at least 7 mm or at least 8 mm or at least 9 mm or at least 10 mm or at least 12 mm or at least 15 mm or at least 20 mm.

Embodiment 368. The plurality of abrasive articles of Embodiment 349, wherein the batch of abrasive articles has an average thickness of not greater than 150 mm or not greater than 120 mm or not greater than 100 mm or not greater than 80 mm or not greater than 60 mm or not greater than 50 mm.

Embodiment 369. The plurality of abrasive articles of Embodiment 349, wherein the batch of abrasive articles has a batch dimensional variation-L of less than 0.3 mm or less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm.

Embodiment 370. The plurality of abrasive articles of Embodiment 349, wherein the batch of abrasive articles has a batch dimensional variation-L of at least 0.01 mm.

Embodiment 371. The plurality of abrasive articles of Embodiment 349, wherein the batch of abrasive articles has a batch dimensional variation-L of not greater than 0.5% of the average length of the bodies or not greater than 0.45% of the average length of the bodies or not greater than 0.40% of the average length of the bodies or not greater than 0.35% of the average length of the bodies or not greater than 0.30% of the average length of the bodies or not greater than 0.25% of the average length of the bodies or not greater than 0.20% of the average length of the bodies.

Embodiment 372. The plurality of abrasive articles of Embodiment 349, wherein the batch of abrasive articles has a batch dimensional variation-L of at least 0.001% of the average length of the bodies.

Embodiment 373. The plurality of abrasive articles of Embodiment 349, wherein the batch of abrasive articles has a batch dimensional variation-W of less than 0.3 mm or less than 0.25 mm or less than 0.2 mm or less than 0.15 mm or less than 0.1 mm.

Embodiment 374. The plurality of abrasive articles of Embodiment 349, wherein the batch of abrasive articles has a batch dimensional variation-W of at least 0.001 mm.

Embodiment 375. The plurality of abrasive articles of Embodiment 349, wherein the batch of abrasive articles has a batch dimensional variation-W of less than 1.2% of the width of the bodies or less than 1.1% of the width of the bodies or less than 1.0% of the width of the bodies or less than 0.9% of the width of the bodies or less than 0.8% of the width of the bodies or less than 0.7% of the width of the bodies or less than 0.6% of the width of the bodies.

Embodiment 376. The plurality of abrasive articles of Embodiment 349, wherein the batch of abrasive articles has a batch dimensional variation-W of at least 0.001% of the width of the bodies.

Embodiment 377. The plurality of abrasive articles of Embodiment 349, wherein the batch of abrasive articles has a batch Dimensional variation-T of less than 0.3 mm or less than 0.29 mm or less than 0.28 mm or less than 0.27 mm or less than 0.26 mm or less than 0.25 mm or less than 0.24 mm or less than 0.23 mm or less than 0.22 mm or less than 0.21 mm or less than 0.20 mm or less than 0.19 mm or less than 0.18 mm or less than 0.17 mm.

Embodiment 378. The plurality of abrasive articles of Embodiment 349, wherein the batch of abrasive articles has a batch dimensional variation-T of at least 0.001 mm.

Embodiment 379. The plurality of abrasive articles of Embodiment 349, wherein the batch of abrasive articles has a batch dimensional variation-T of less than 0.9 mm or less than 0.85 mm or less than 0.80 mm or less than 0.75 mm or less than 0.70 mm or less than 0.65 mm or less than 0.60 mm or less than 0.55 mm or less than 0.50 mm or less than 0.45 mm or less than 0.40 mm or less than 0.35 mm or less than 0.30 mm or less than 0.25 mm or less than 0.20 mm or less than 0.15 mm or less than 0.10 mm or less than 0.05 mm.

Embodiment 380. The plurality of abrasive articles of Embodiment 349, wherein the batch of abrasive articles has a batch dimensional variation-T of at least 0.001 mm.

Embodiment 381. The plurality of abrasive articles of Embodiment 349, wherein the batch of abrasive articles has a batch volume standard deviation of less than 23.5 mm3 or less than 22 mm3 or less than 21 mm3 or less than 20 mm3 or less than 19 mm3 or less than 18 mm3 or less than 17 mm3 or less than 16 mm3 or less than about 15 mm3.

Embodiment 382. The plurality of abrasive articles of Embodiment 349, wherein the batch of abrasive articles has a batch volume standard deviation of at least 1 $mm^3$ or at least 2 $mm^3$ or at least 3 $mm^3$ or at least 4 $mm^3$ or at least 5 $mm^3$ or at least 6 $mm^3$ or at least 7 $mm^3$ or at least 8 $mm^3$ or at least 9 $mm^3$ or at least 10 $mm^3$ or at least 11 $mm^3$ or at least 12 $mm^3$ or at least 13 $mm^3$ or at least 14 $mm^3$ or at least about 15 $mm^3$.

Embodiment 383. The plurality of abrasive articles of Embodiment 349, wherein the batch of abrasive articles shrinks by at least 1 vol % during sintering or at least 2 vol % or at least 3 vol % or at least 4 vol % or at least 5 vol % or at least 6 vol % or at least 7 vol % or at least 8 vol % or at least 9 vol % or at least 10 vol %.

Embodiment 384. The plurality of abrasive articles of Embodiment 349, wherein the batch of abrasive articles shrinks by less than 15 vol % during sintering or less than 14 vol % or less than 13 vol % or less than 12 vol %.

Embodiment 385. The plurality of abrasive articles of Embodiment 349, wherein the batch of abrasive articles has an average porosity of at least 1 vol % or at least 5 vol % or at least 10 vol % or at least 15 vol % or at least 20 vol % or at least 25 vol %.

Embodiment 386. The plurality of abrasive articles of Embodiment 349, wherein the batch of abrasive articles has an average batch porosity of at least less than 50 vol % or less than 48 vol % or less than 46 vol % or less than 44 vol % or less than 42 vol % or less than 40 vol %.

Embodiment 387. The plurality of abrasive articles of Embodiment 349, wherein the batch of abrasive articles has a batch porosity standard deviation of less than 1 vol % or less than 0.9 vol % or less than 0.8 vol % or less than 0.7 vol % or less than 0.6 vol % or less than 0.5 vol %.

Embodiment 388. The plurality of abrasive articles of Embodiment 349, wherein the batch of abrasive articles has a batch porosity standard deviation of at least 0.001 vol % or at least 0.01 vol % or at least 0.05 vol % or at least 0.1 vol %.

Embodiment 389. The plurality of abrasive articles of Embodiment 349, wherein each abrasive article comprises a body, the body further comprising at least one of:
- a major planar surface having a nWarp of not greater than 50 μm/cm$^2$, wherein nWarp is the warp of the major planar surface normalized for the surface area of the major planar surface;
- a major planar surface having a nFlatness of not greater than 50 μm/cm$^2$, wherein nFlatness is the flatness of the major planar surface normalized for the surface area of the major planar surface;
- a major planar surface having a nBow of not greater than 50 μm/cm$^2$, wherein nBow is the bow of the major planar surface normalized for the surface area of the major planar surface;
- a first major planar surface and a second major planar surface substantially parallel to the first major planar surface, wherein the distance between the first major planar surface and second major planar surface comprises a nDimension variation of not greater than 100 μm/cm$^2$, wherein nDimension variation is the variation in the dimension between the first and second major planar surfaces normalized to the area of the first or second major planar surfaces;
- or any combination of a)-d).

Embodiment 390. A method for forming a green abrasive article via additive manufacturing comprising:
a) forming a layer of powder material, wherein the powder material includes a recycled powder; and
b) selectively binding a portion of the layer; and
c) repeating steps a) and b) to form a green abrasive article.

Embodiment 391. The method for abrasive articles of Embodiment 390, wherein the recycled powder comes from depowdered and/or dispensed powder material used in a prior additive manufacturing process.

Embodiment 392. The method for abrasive articles of Embodiment 390, wherein the recycled powder includes some content of organic material.

Embodiment 393. The method for abrasive articles of Embodiment 392, wherein the organic material is a binder material used in a prior additive manufacturing process.

Embodiment 394. The method for abrasive articles of Embodiment 390, wherein the powder material includes a powder blend including the recycled powder and virgin powder.

Embodiment 395. The method for abrasive articles of Embodiment 394, wherein the powder blend includes a ratio of the recycled powder and virgin powder in a controlled amount based on a powder characteristic of the recycled powder, virgin powder, or powder blend.

Embodiment 396. The method for abrasive articles of Embodiment 394, wherein further comprising controlling a content of the recycled powder in the powder blend based upon at least one of the content of the organic material in the recycled powder, a flowability characteristic of the blend, a flowability characteristic of the recycled powder, a flowability characteristic of the virgin powder, a relative humidity of the blend, a relative humidity of the recycled powder, a relative humidity of the virgin powder, or a combination thereof.

Embodiment 397. The method for abrasive articles of Embodiment 394, further comprising calculating an amount of binder to selectively deposit into the layer based upon a content of recycled powder in the powder blend.

Embodiment 398. The method for abrasive articles of Embodiment 394, further comprising changing the amount of binder to apply to a layer of the powder blend based on the amount of recycled powder.

Embodiment 399. The method for abrasive articles of Embodiment 394, wherein the powder blend comprises a blend ratio (Pr/Pv) of the weight of the recycled powder (Pr) and the weight of the virgin powder (Pv) that is at least 0.01 or at least 0.02 or at least 0.03 or at least 0.04 or at least 0.05 or at least 0.06 or at least 0.07 or at least 0.08 or at least or at least 0.09 or at least 0.10 or at least 0.12 or at least 0.15 or at least 0.18 or at least 0.20 or at least 0.22 or at least 0.25 or at least 0.28 or at least 0.30 or at least 0.32 or at least 0.35 or at least or at least 0.38 or at least 0.40 or at least 0.5 or at least 0.6 or at least 0.7 or at least 0.8 or at least 0.9 or at least 1 or at least 1.1 or at least 1.2 or at least 1.5 or at least 2.0 or at least 3.0 or at least 4.0 or at least 5.0 or at least 6.0 or at least 7.0 or at least 8.0 or at least 9.0 or at least 10.0.

Embodiment 400. The method for abrasive articles of Embodiment 394, wherein the blend comprises a blend ratio (Pr/Pv) of the weight of the recycled powder (Pr) and the weight of the virgin powder (Pv) that is not greater than 1000 or not greater than 800 or not greater than 500 or not greater than 200 or not greater than 100 or not greater than 90 or not greater than 80 or not greater than 70 or not greater than 60 or not greater than 50 or not greater than 40 or not greater than 30 or not greater than 20 or not greater than 15 or not greater than 10 or not greater than 8 or not greater than 6 or not greater than 5 or not greater than 4 or not greater than 3 or not greater than 2 or not greater than 1 or not greater than 0.9 or not greater than 0.8 or not greater than 0.7 or not greater than 0.6 or not greater than 0.5 or not greater than 0.4 or not greater than 0.3 or not greater than 0.2.

Embodiment 401. The method for abrasive articles of Embodiment 394, further comprising:
capturing depowdered and/or dispensed powder from a prior additive manufacturing process as recycled powder;
treating the recycled powder to remove some organic materials from the recycled powder to form treated recycled powder; and
using the treated recycled powder in a subsequent additive manufacturing process.

Embodiment 402. The method for abrasive articles of Embodiment 401, wherein using the treated recycled powder includes blending the treated recycled powder with virgin powder.

Embodiment 403. The method for abrasive articles of Embodiment 401, wherein treating includes removing a certain content of organic material from the recycled powder.

Embodiment 404. The method for abrasive articles of Embodiment 401, wherein treating includes thermally treating, chemically treating, mechanically treating, or irradiating the loose powder to change the content of organic material in the loose powder.

Embodiment 405. The method for abrasive articles of Embodiment 401, wherein treating includes dissolving and/or washing the organic material from the recycled powder.

Embodiment 406. The method for abrasive articles of Embodiment 401, wherein treating includes washing the recycled powder with an organic material, such as alcohol, to reduce the content of organic material contained in the recycled powder.

Embodiment 407. The method for abrasive articles of Embodiment 401, wherein treating includes removing at least a portion of the organic material from the recycled powder.

Embodiment 408. The method for abrasive articles of Embodiment 401, wherein treating includes removing at least 0.1 wt % of the organic material from the recycled powder to form a treated recycled powder configured to be used in a subsequent operation to form a green body abrasive article.

Embodiment 409. The method for abrasive articles of Embodiment 401, further comprising removing at least 0.2 wt % of the organic material from the recycled powder to create the treated recycled powder or at least 0.3 wt % or at least 0.5 wt % or at least 1 wt % or at least 1.5 wt % or at least 2 wt % or at least 3 wt % or at least 4 wt % or at least 5 wt %.

Embodiment 410. The method for abrasive articles of Embodiment 401, further comprising removing not greater than 99.9 wt % of the organic material from the recycled powder to create the treated recycled powder or not greater than 99 wt % or not greater than 98 wt % or not greater than 97 wt % or not greater than 96 wt % or not greater than 95 wt % or not greater than 90 wt % or not greater than 85 wt % or not greater than 80 wt % or not greater than 70 wt % or not greater than 60 wt % or not greater than 50 wt % or not greater than 40 wt % or not greater than 30 wt % or not greater than 20 wt % or not greater than 10 wt %.

Embodiment 411. The method for abrasive articles of Embodiment 401, wherein the recycled powder includes organic material, wherein the organic material includes cured binder material used in a prior binding operation.

Embodiment 412. The method for abrasive articles of Embodiment 401, further comprising:
measuring or calculating a relative humidity or flow characteristic of the treated recycled powder; and
blending the treated recycled powder and the virgin powder based on the measuring or calculating of the relative humidity or flow characteristic of the treated recycled powder.

Embodiment 413. The method for abrasive articles of Embodiment 401, wherein the treated recycled powder includes at least 0.1 wt % organic material for a total weight of the recycled powder or at least 0.5 wt %, or at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %.

Embodiment 414. The method for abrasive articles of Embodiment 401, wherein the treated recycled powder includes not greater than 30 wt % organic material for a total weight of the recycled powder or not greater than 25 wt %, or not greater than 20 wt %, or not greater than 15 wt %, or not greater than 10 wt %, or not greater than 8 wt %, or not greater than 6 wt %, or not greater than 5 wt %.

Embodiment 415. The method for abrasive articles of Embodiment 394, further comprising:
a) forming a layer of powder material comprising a precursor bond material and abrasive particles;
b) binding at least a portion of the layer with a binder material; and
c) repeating steps a) and b) to form a green body abrasive article;
d) removing and capturing loose powder from the green body abrasive article, wherein the loose powder includes at least 0.1 wt % organic material from the binder material for a total weight of the loose powder;
e) using at least a portion of the loose powder in a subsequent operation as recycled powder to conduct steps a)-c) and forming a second green body abrasive article distinct from the green body abrasive article.

Embodiment 416. The method for forming abrasive articles of Embodiment 401, further comprising storing data related to one or more powder characteristics of the recycled powder, and optionally further comprising using a computer program to evaluate one or more process controls of the additive manufacturing process, wherein the one or more process controls for certain processes are selected based on the one or more powder characteristics of the recycled powder, blend and/or virgin powder.

Embodiment 417. The method for abrasive articles of Embodiment 394, wherein the abrasive articles are part of a batch, and wherein the batch of abrasive articles comprise an average batch flexural strength standard deviation of at least 0.005 or at least 0.01 or at least 0.015 or at least 0.020 and not greater than 0.25 or not greater than 0.2 or not greater than 0.15 or not greater than 0.1 or not greater than 0.05.

Embodiment 418. The method for abrasive articles of Embodiment 394, wherein the abrasive articles are part of a batch, and wherein the batch of abrasive articles comprise an average batch density standard deviation of at least 0.001 or at least 0.002 or at least 0.003 or at least 0.004 or at least 0.005 or at least 0.006 and not greater than 0.03 or not greater than 0.025 or not greater than 0.02 or not greater than 0.015.

Embodiment 419. The method for abrasive articles of Embodiment 394, wherein the body comprises a theoretical density of not greater than 99.9% or not greater than 99.5% or not greater than 99% or not greater than 96% or not greater than 94% or not greater than 90% or not greater than 85% or not greater than 80% or not greater than 75% or not greater than 70% or not greater than 65% or not greater than 60% or not greater than 55% or not greater than 50%.

Embodiment 420. The method for abrasive articles of Embodiment 394, further comprising a Linear Feature Factor of at least 0.320 cm, such as at least 0.3251 cm, or at least 0.3302 cm, or at least 0.3353 cm, or at least 0.3404 cm, or at least cm or at least 0.3454 cm, or at least 0.3505 cm, or at least 0.3556 cm.

Embodiment 421. The method for abrasive articles of Embodiment 394, further comprising a Linear Feature Factor of at least less than 2.54 cm, or less than 2.0 cm, or less than 1.5 cm, or less than 1.27 cm, or less than 1.02 cm, or less than 0.76 cm, or less than 0.508 cm, or less than 0.381 cm.

Embodiment 422. The method for abrasive articles of Embodiment 394, wherein further comprising:
a) compacting at least a portion of the layer to form a compacted layer; and
b) binding at least a portion of the compacted layer.

Embodiment 423. The batch of Embodiment 126, wherein the batch of green body abrasive articles comprises a dimensional variation-L of at least 0.001% of the length of the bodies.

Embodiment 424. The batch of Embodiment 126, wherein the batch of green body abrasive articles comprises a dimensional variation-w of less than 1.2% of the width of the bodies or less than 1.1% of the width of the bodies or less than 1.0% of the width of the bodies or less than 0.9% of the width of the bodies or less than 0.8% of the width of the bodies or less than 0.7% of the width of the bodies or less than 0.6% of the width of the bodies.

Embodiment 425. The batch of Embodiment 126, wherein the batch of green body abrasive articles comprises a dimensional variation-W of at least 0.001% of the width of the bodies.

Embodiment 426. The batch of Embodiment 126, wherein the batch of green body abrasive articles comprises a dimensional variation-T of less than 9% of the thickness of the bodies or less than 8% of the thickness of the bodies or less than 7% of the thickness of the bodies or less than 6% of the thickness of the bodies or less than 5% of the thickness of the bodies or less than 4% of the thickness of the bodies or less than 3% of the thickness of the bodies or less than 2% of the thickness of the bodies or less than 1% of the thickness of the bodies.

Embodiment 427. The batch of Embodiment 126, wherein the batch of green body abrasive articles comprises a dimensional variation-T of at least 0.001% of the thickness of the bodies.

Embodiment 428. The batch of Embodiment 126, wherein the batch of green body abrasive articles comprises a volume standard deviation of less than 7% of the volume of the bodies or less than 6% of the volume of the bodies or less than 5% of the volume of the bodies or less than 4% of the volume of the bodies or less than 3% of the volume of the bodies or less than 2% of the volume of the bodies or less than 1% of the volume of the bodies.

Embodiment 429. The batch of Embodiment 126, wherein the batch of green body abrasive articles comprises a volume standard deviation of at least 0.001% of the volume of the bodies.

EXAMPLES

The following non-limiting examples illustrate the present invention.

Example 1

A mixture is prepared by combining two individual dry powder materials: a precursor bond material and abrasive particles. The precursor bond material is a oxide-containing material that forms a vitreous phase material upon further processing.

The additive manufacturing process is conducted according to the embodiments described herein. The additive manufacturing process may be characterized as a binder jetting operation, wherein layers of the powder material are deposited into a build box, the layers are smoothed, compacted, and selectively bound with a binder material to form a batch of green body abrasive articles contained a bed of depowdered and/or dispensed powder. Each of the green body abrasive articles has any one or more of the features claimed in the embodiments herein. The batch of green body abrasive articles has any one or more of the features claimed in the embodiments herein. The green body abrasive article is converted to finally-formed abrasive article via heating as provided below. Example 1 was formed using an ExOne Innovent+. The printing conditions are summarized in Table 1.

TABLE 1

| Parameter | Samples S1 |
|---|---|
| Saturation (%) | 10-200% |
| Layer Thickness [μm] | 1-1000 |
| Foundation Layer Count | 1-200 |
| Oscillator on Delay (sec) | 0-5 |
| Binder Set Time (sec) | 0-600 |
| Dry Time (sec) | 1-120 |
| Target Bed Temperature (° C.) | 20-100 |
| Recoat Speed (mm/s) | 1-500 |
| Smoothing Roller Speed (rpm) | 1-1000 |
| Smoothing Roller Speed (mm/s) | 1-150 |
| Binder Droplet Volume (pL) | 10-80 |
| Binder Droplet Frequency (Hz) | 955-10,000 |
| Compaction Roller Speed (mm/s) | 0-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm$^3$. The green body abrasive article has a thickness of at least 1 cm.

After forming, the green body is heated at a rate of 5° C./min up to a temperature of 375° C. under air, and held for one hour at 375° C. to remove the binder. Thereafter, the air is replaced with argon and the body is heated at a ramp rate of 5° C./min up to a maximum temperature of 1500° C. The temperature is held for four hours at 1500° C., and cooling is conducted at a rate of 5° C./minute.

Example 2

A mixture is prepared by combining two individual dry powder materials: a precursor bond material and abrasive particles. The precursor bond material is a metal-containing material.

The process for forming the green body abrasive article of Example 2 is conducted using an ExOne25 Pro. Printing conditions are provided in Table 2 below.

TABLE 2

| Parameter | Samples S2 |
|---|---|
| Saturation (%) | 10-200% |
| Layer Thickness [μm] | 1-1000 |
| Foundation Layer Count | 0-200 |
| Oscillator on Delay (sec)Dispenser Delay | 0-20 |
| Dispense coverage parameter (% of bed length for dispensing powder material) | 0-100% |
| Binder Set Time (sec) | 0-30 |
| Recoater Dry Speed (mm/s) | 1-120 |
| Target Bed Temperature (° C.) | 20-100 |
| Recoat Speed (mm/s) | 1-200 |
| Smoothing Roller Rotation Rate(rpm) | 1-1000 |
| Smoothing Roller Speed (mm/s) | 1-200 |
| Binder Droplet Volume (pL) | 10-80 |
| Binder Droplet Frequency (Hz) | 955-10,000 |
| Compaction Roller Speed (mm/s) | 1-150 |
| Compaction thickness Δ (μm) | 5-300 |

The build box has dimensions of length of at least 150 mm, a width of at least 60 mm, and a depth of at least 60 mm. The forming process creates a green body abrasive article having dimensions of a length of at least 6 cm and/or a width of at least 2.8 cm and/or a solid volume of at least 9 cm³. The green body abrasive article has a thickness of at least 1 cm.

Comparative Example 1

Figure 16:
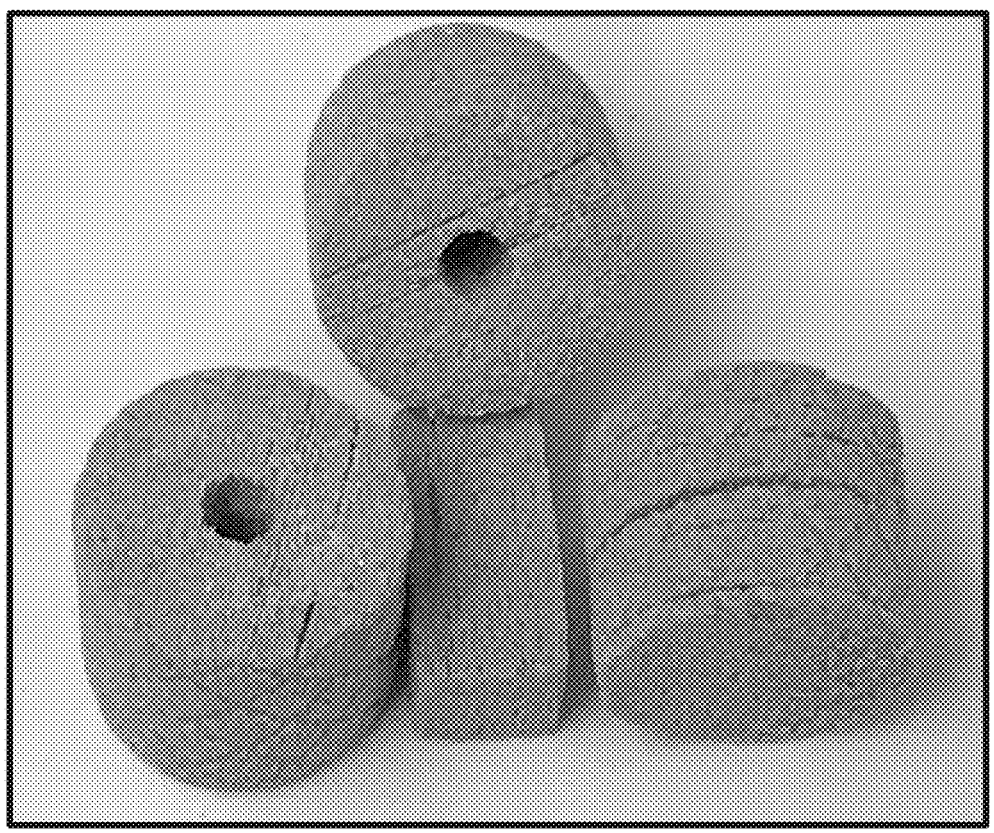
FIG. 16 includes images of a comparative sample.

A sample was prepared using a binder jetting operation as generally described in Example 1. However, the powder material was 20 wt % of SP1086 glass powder from Specialty Glass Inc., in Oldsmar, Florida and 80 wt % of 200/230 Mesh, D76 diamond powder from Pinnacle Abrasives (Santa Rosa, CA). The binder used was PM-B-SR1-04 from ExOne. The forming conditions are detailed below in Table 3 and were formed using a Innovent ExOne Printer. FIG. 16 includes an image of CS1 samples.

TABLE 3

| Parameter | Samples CS1 |
| --- | --- |
| Saturation (%) | 70 |
| Layer Thickness [μm] | 100 |
| Foundation Layer Count | 5 |
| Oscillator on Delay (sec) | 2 |
| Binder Set (sec) | 1 |
| Dry Time (sec) | 45 |
| Target Temperature (° C.) | 60 |
| Recoat Speed (rpm) | 10 |
| Oscillator Speed (rpm) | 2800 |
| Roller Speed (rpm) | 60 |
| Roller Speed (mm/s) | 1 |

The body was then cured in an ambient atmosphere oven for 2 hours at 195° C. After curing and cooling to 23° C. the cured bodies are placed into a furnace and burned out at 400° C. for 2 hours, followed by sintering at 700° C. for 4 hours, to produce comparative sample CS1.

Sdr and Surface Roughness

The Sdr and surface roughness (Sa) of transverse surfaces and other surfaces of representative samples ("Sample") and Sample CS1 were measured and detailed below in Table 4.

TABLE 4

| Sample | Sdr[%] Transverse | Sdr[%] Top | Sdr[%] Difference | Sa[microns] Transverse | Sa[microns] Top |
| --- | --- | --- | --- | --- | --- |
| Sample | 76.5 | 64.7 | 11.8 | 11 | 9.112 |
| CS1 | 130 | 100 | 30 | | |

Notably, Sample had a much smaller transverse Sdr and Sdr difference than CS1.

Recylcing and Density-Preparation

Batches of samples were prepared according to the procedures outlined in Example 1 according to Tables 5A-5C. Batches 3A, 3B, and 5 and comparative batches 2A-D have a rectangular prismatic shape having target green body dimensions of 44.5 mm×16.5 mm×7.3 mm. Batch 4 has a shape and dimensions as provided in the illustrated embodiment of FIG. 20. Batches 6, 7, and 8 had a rectangular prismatic shape having target dimensions of 5 cm×1.8 cm×1 cm. The powder material used for deposition included a bond material and abrasive particles. The powder material included 76.8 wt % cBN (average particle size 8 microns) and 23.2 wt % glass bond (average particle size 126 microns).

TABLE 5A

| Parameter | Batch 3a | Batch 3b | Batch 4 | Batch 5 |
| --- | --- | --- | --- | --- |
| Machine | ExOne Innovent+ | ExOne Innovent+ | ExOne Innovent+ | ExOne Innovent+ |
| Powder | Recycled | Recycled | Recycled | Recycled |
| Compaction thickness Δ (μm) | 50 | 50 | 0 | 50 |
| Saturation (%) | 36.6% | 36.6% | 36.6% | 36.6% |
| Layer Thickness [μm] | 200 | 200 | 200 | 200 |
| Foundation Layer Count | 0 | 0 | 0 | 0 |
| Oscillator on Delay (sec) | 2 | 2 | 2 | 2 |
| Binder Set Time (sec) | 50 | 50 | 50 | 50 |
| Dry Time (sec) | 20 | 20 | 20 | 20 |
| Target Bed Temperature (° C.) | 50 | 50 | 50 | 50 |
| Recoat Speed (mm/s) | 70 | 70 | 70 | 70 |
| Smoothing Roller Speed (rpm) | 300 | 300 | 300 | 300 |
| Smoothing Roller Speed (mm/s) | 5 | 5 | 5 | 5 |
| Binder Droplet Volume (pL) | 80 | 80 | 80 | 80 |
| Binder Droplet Frequency (Hz) | 3740 | 3740 | 3740 | 3740 |
| Compaction Roller Speed (mm/s) | 5 | 5 | 5 | 5 |

TABLE 5B

| Parameter | Comparative Batch 2A | Comparative Batch 2B | Comparative Batch 2C | Comparative Batch 2D |
| --- | --- | --- | --- | --- |
| Machine | Innovent+ | Innovent+ | Innovent+ | Innovent+ |
| Powder | Virgin Only | Virgin Only | Virgin Only | Virgin Only |
| Compaction thickness Δ (μm) | 50 | 50 | 50 | 50 |
| Saturation (%) | 36.6% | 36.6% | 36.6% | 36.6% |
| Layer Thickness [μm] | 200 | 200 | 200 | 200 |
| Foundation Layer Count | 0 | 0 | 0 | 0 |
| Oscillator on Delay (sec) | 2 | 2 | 2 | 2 |
| Binder Set Time (sec) | 50 | 50 | 50 | 50 |
| Dry Time (sec) | 20 | 20 | 20 | 20 |
| Target Bed Temperature (° C.) | 50 | 50 | 50 | 50 |
| Recoat Speed (mm/s) | 70 | 70 | 70 | 70 |
| Smoothing Roller Speed (rpm) | 300 | 300 | 300 | 300 |
| Smoothing Roller Speed (mm/s) | 5 | 5 | 5 | 5 |
| Binder Droplet Volume (pL) | 80 | 80 | 80 | 80 |
| Binder Droplet Frequency (Hz) | 3740 | 3740 | 3740 | 3740 |
| Compaction Roller Speed (mm/s) | 5 | 5 | 5 | 5 |

TABLE 5C

| Parameter | Batch 6 | Batch 7 | Batch 8 |
| --- | --- | --- | --- |
| Machine | Innovent+ | Innovent+ | Innovent+ |
| Powder | Recycled | Powder Blend: 50:50 Virgin:Recycled | Powder Blend: 50:50 Virgin:Recycled |
| Compaction thickness Δ (μm) | 50 | 0 | 50 |
| Saturation (%) | 36.6% | 36.6% | 36.6% |
| Layer Thickness [μm] | 200 | 200 | 200 |
| Foundation Layer Count | 0 | 0 | 0 |
| Oscillator on Delay (sec) | 2 | 2 | 200 |
| Binder Set Time (sec) | 50 | 50 | 50 |

TABLE 5C-continued

| Parameter | Batch 6 | Batch 7 | Batch 8 |
|---|---|---|---|
| Dry Time (sec) | 20 | 20 | 20 |
| Target Bed Temperature (° C.) | 50 | 50 | 50 |
| Recoat Speed (mm/s) | 70 | 70 | 70 |
| Smoothing Roller Speed (rpm) | 300 | 300 | 300 |
| Smoothing Roller Speed (mm/s) | 5 | 5 | 5 |
| Binder Droplet Volume (pL) | 80 | 80 | 80 |
| Binder Droplet Frequency (Hz) | 3740 | 3740 | 3740 |
| Compaction Roller Speed (mm/s) | 5 | 5 | 5 |

Recycling and Density—Green Body Density

Green body density was measured for each of the samples in each of the batches 3A, 3B, and 4-8, and comparative batches 2A-D. Details on the batches are provided in Table 6.

Batch 5 had a notably and unexpectedly greater batch density variation and batch density variation as a percentage of average density. The batch density variation as a percentage of the average density can be calculated by (batch density variation)/(batch average density)×100. Approximate values are being confirmed.

TABLE 6

| Batch | No. of samples | Powder Type | Batch Average Density (g/cc) | Batch Density Variation (Std. Dev. in g/cc) | Batch Density Variation as a % of Average Density |
|---|---|---|---|---|---|
| 5 | 5 | Depowdered | 1.726 | 0.046 | 2.67% |
| CS2A | 5 | Virgin Only | 1.783 | 0.016 | 0.90% |
| CS2B | 5 | Virgin Only | 1.812 | 0.011 | 0.61% |
| CS2C | 5 | Virgin Only | 1.808 | 0.005 | 0.28% |
| CS2D | 5 | Virgin Only | 1.822 | 0.009 | 0.49% |
| 8 | 8 | Powder Blend: 50:50 Virgin:Recycled | 1.77 | 0.012 | 0.68% |

Recycling and Density—Sintered Body Density

Batches 3A, 3B, 4, and 5, and comparative batches 2A-D were sintered under nitrogen at a maximum temperature of 1,000° C. for approximately 4 hours. Empirical data is provided in Table 7. Approximate values are being confirmed.

TABLE 7

| Batch | No. of samples in the batch | Powder Type | Average Density | Batch Density Variation | Batch Density Variation as a % of Average Density |
|---|---|---|---|---|---|
| 5 | 5 | Depowdered | 2.037 | 0.031 | 1.52% |
| CS2A | 5 | Virgin | 2.132 | 0.005 | 0.23% |
| CS2B | 5 | Virgin | 2.131 | 0.013 | 0.61% |
| CS2C | 5 | Virgin | 2.119 | 0.007 | 0.33% |
| CS2D | 5 | Virgin | 2.138 | 0.002 | 0.09% |
| 8 | 8 | Powder Blend: 50:50 Virgin:Recycled | Approximately 2.05-2.13 | Approximately 0.002-0.025 | Approximately 0.10%-1.45% |

Recycling and Flexural Strength

Flexural modulus was measured for the sintered batches, the results of which are provided in Table 8.

TABLE 8

| Sample | Powder Type | Batch Flexural Strength Variation (Std. Dev. In MPa) |
|---|---|---|
| 6 | Only Recycled | 0.276 |
| 8 | Powder Blend: 50:50 Virgin:Recycled | 0.047 |

Additional flexural modulus data is provided in Table 9 for two batches representative of embodiments herein and having different compaction processes.

TABLE 9

| Sample | Compaction thickness Δ (μm) | Powder Type | Flexural Strength (MPa) | Flexural Strength Std Dev |
|---|---|---|---|---|
| 7 | 0 | Powder Blend: 50:50 Virgin:Recycled | 0.07 | 0.026 |
| 8 | 50 | Powder Blend: 50:50 Virgin:Recycled | 0.17 | 0.047 |

Recycling and Dimensional Stability—Green

Batch volume standard deviation for certain batches is provided in Table 10 below. Approximate values are being confirmed.

TABLE 10

| Batch | No. of samples in the batch | Powder | Batch Volume Standard Deviation (mm³) |
|---|---|---|---|
| 5 | 5 | Depowdered | 24.89 |
| CS2A | 5 | Virgin only | 16.4 |
| CS2B | 5 | Virgin only | 19.1 |
| CS2C | 5 | Virgin only | 32.3 |
| CS2D | 5 | Virgin only | 22.6 |
| 8 | 8 | Powder Blend: 50:50 Virgin:Recycled | Approximately 15-23.5 |

Recycling and Dimensional Variability—Sintered

Further details of sintered samples of certain batches are provided in Table 11. Approximate values are being confirmed.

TABLE 11

| Sample | No. of samples | Powder | Volume Standard Deviation (mm³) | Shrinkage |
|---|---|---|---|---|
| 5 | 5 | Depowdered | 38.37 | 10.25% |
| CS2A | 5 | Virgin only | 26.42 | 9.89% |
| CS2B | 5 | Virgin only | 25.03 | 8.62% |
| CS2C | 5 | Virgin only | 29.41 | 8.98% |
| CS2D | 5 | Virgin only | 13.32 | 8.40% |
| 8 | 8 | Powder Blend: 50:50 Virgin:Recycled | Approximately 12-35 | Approximately 8-10% |

Recyling and Porosity

TABLE 12

| Sample | No. of samples | Powder Type | Average batch porosity (vol % for a total volume of the sample) | Batch Porosity Standard Deviation (vol %) |
|---|---|---|---|---|
| 5 | 5 | Depowdered | 37.5 | 1.0 |
| CS2A | 5 | Virgin only | 34.6 | 0.2 |
| CS2B | 5 | Virgin only | 34.6 | 0.4 |
| CS2C | 5 | Virgin only | 35.0 | 0.2 |
| CS2D | 5 | Virgin only | 34.4 | 0.1 |
| 8 | 8 | Powder Blend: 50:50 Virgin:Recycled | Approximately 33-36.5 | 0.1-0.8 |

Linear Feature Factor

Figure 18:
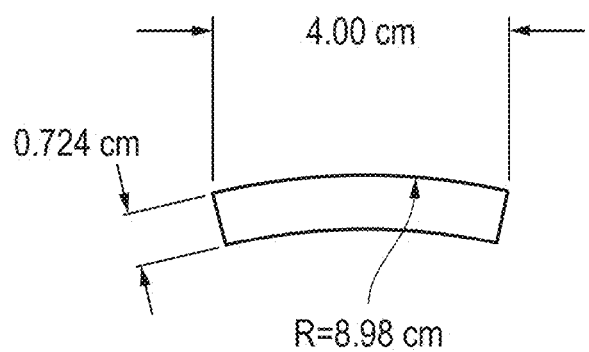
FIG. 18 includes an image of an abrasive segment.
Figure 19:
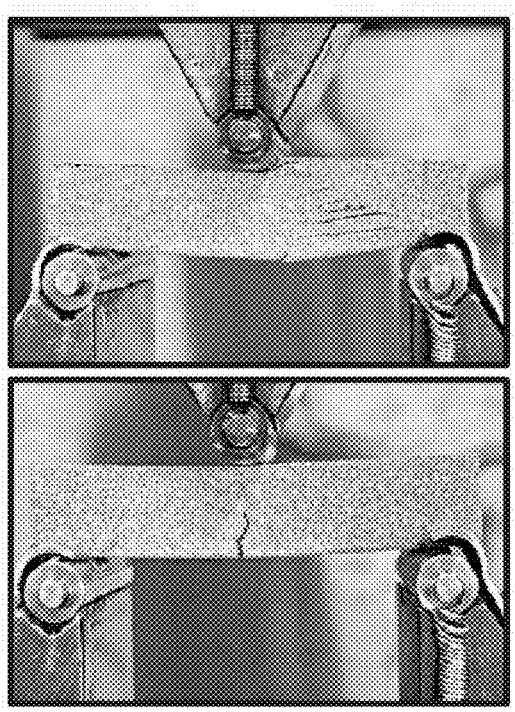
FIG. 19 includes images of abrasive articles undergoing flexural strength testing.
Figure 19:
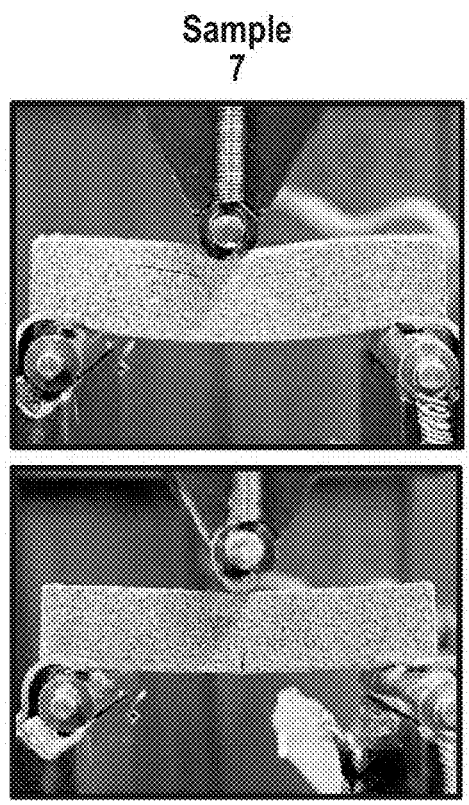

Two batches of samples were each made using the materials as provided in Example 1 and using the parameters of Table 12. Samples were sintered under nitrogen at a maximum temperature of 1,000° C. for approximately 4 hours. Samples had the dimensions shown in FIG. 18.

TABLE 13

| Parameter | Comparative Sample 18 | Sample 18 |
|---|---|---|
| Machine | Innovent+ | Innovent+ |
| Compaction thickness Δ (μm) | 0 | 150 |
| Saturation (%) | 36.6% | 36.6% |
| Layer Thickness [μm] | 200 | 200 |
| Foundation Layer Count | 0 | 0 |
| Oscillator on Delay (sec) | 2 | 2 |
| Binder Set Time (sec) | 50 | 50 |
| Dry Time (sec) | 20 | 20 |
| Target Bed Temperature (° C.) | 50 | 50 |
| Recoat Speed (mm/s) | 70 | 70 |
| Smoothing Roller Speed (rpm) | 300 | 300 |
| Smoothing Roller Speed (mm/s) | 5 | 5 |
| Binder Droplet Volume (pL) | 80 | 80 |
| Binder Droplet Frequency (Hz) | 3740 | 3740 |
| Compaction Roller Speed (mm/s) | 5 | 5 |

Figure 20A:
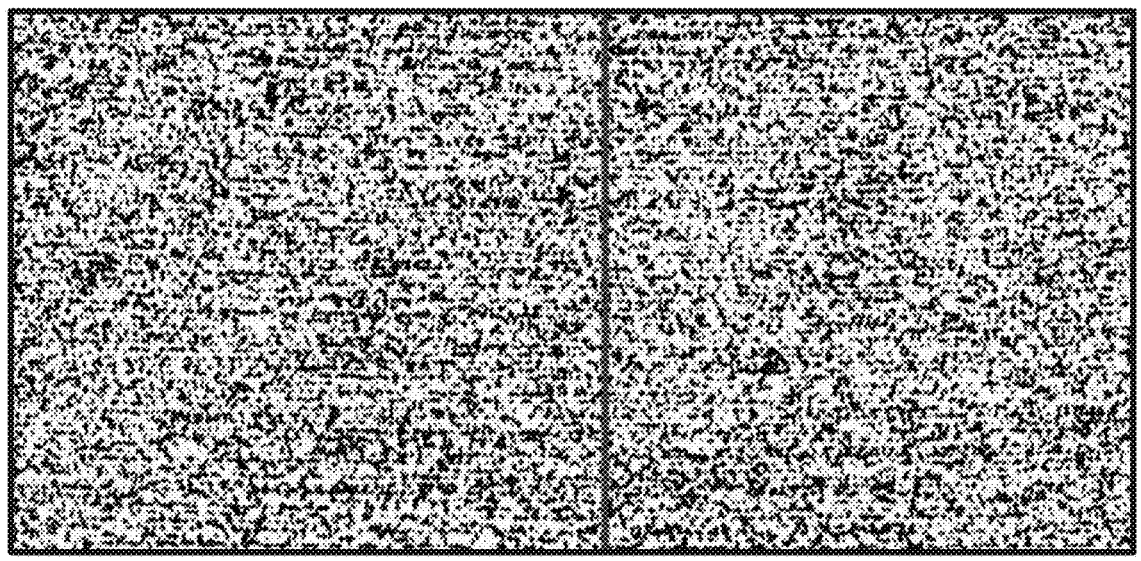
FIG. 20A includes a cross-section of an abrasive article.
Figure 20B:
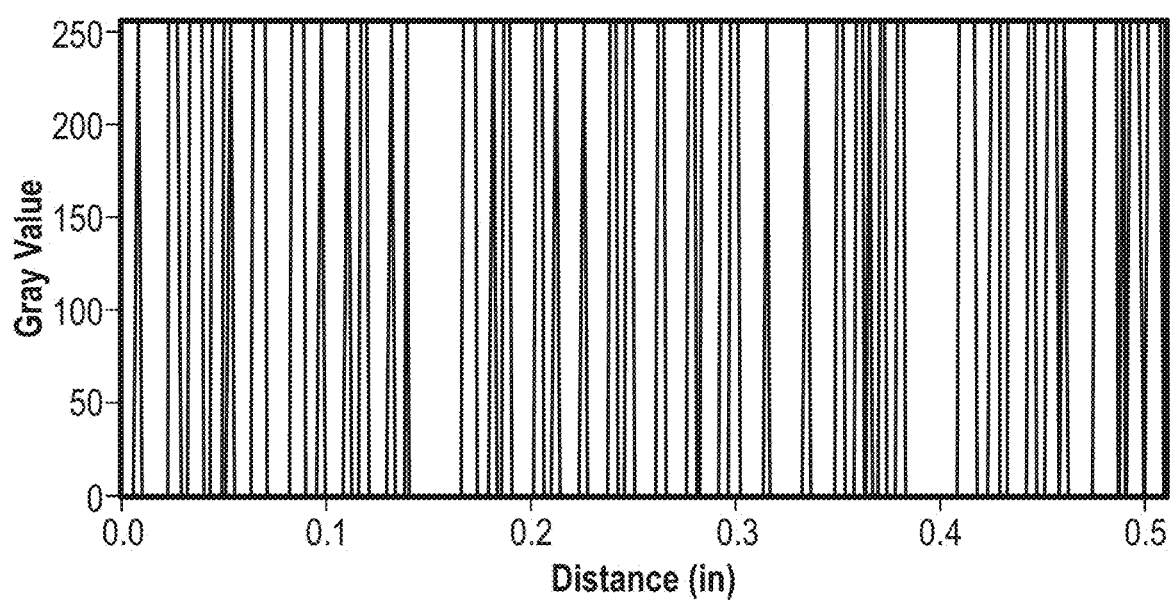
FIG. 20B includes an image of a pore spacing distribution from image 20A.

A cross-sectional image of each sample within the batch was taken at a suitable magnification, such that a cross-sectional image appears as provided in FIG. 20a (below). Multiple cross-sections are taken in different planes and evaluated. For each cross-sectional image, at least 10 lines are drawn across each image perpendicular to any evident lines in the microstructure, such as shown in FIG. 20a (below). In particular, if a direction of compaction of the sample is evident, the lines are drawn perpendicular to the known compaction direction. An example of such a line can be seen in FIG. 20a (below). A threshold black and white image is created from each cross-sectional image using an appropriate thresholding value to separate pores from solid material. From the thresholded image, a gray value vs. distance plot is created as provided in FIG. 20b (second image below). The data is then used to generate a distribution of spacing distance for each sample image. The standard deviation of each distribution is calculated and reported as a linear feature factor. The smaller the standard deviation of spacing distance, the more regular the distance between the pores and the greater the evidence of linear porosity (i.e., a less homogenous microstructure). The linear feature factor for comparative batch 18 was 0.0125 inches (0.3175 cm). The linear feature factor for batch 18 was 0.0145 inches (0.368 cm).

Figure 17:
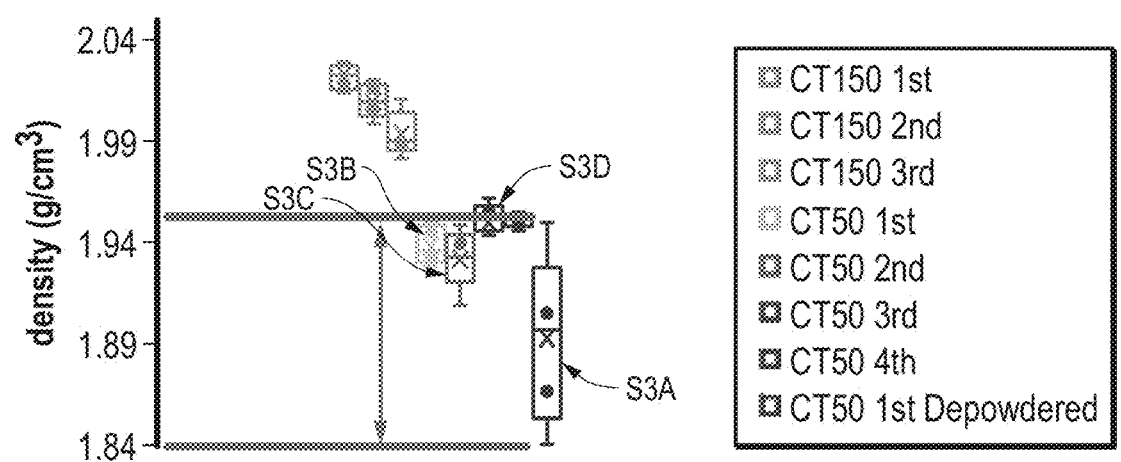
FIG. 17 includes a plot of density variation of abrasive articles formed according to an embodiment.

The material left after the abrasive articles have been separated from the loose powder may be recycled and used to form another abrasive article. However, the loose powder has been subjected to the most post-processing, including in some instances, blasting with an air gun, brushing and/or vibration to remove the loose powder from the part. FIG. 17 includes a plot demonstrating the density variation of Samples S3A abrasive articles formed from a powder material made entirely of recycled powder material. By comparison, the other samples in the plot (e.g., Samples S3B, S3C, S3D) were formed using the same process but with only virgin powder material. The density variation of Sample S3A was unexpectedly greater than the samples formed with the virgin powder material. As such, in one embodiment, recycling of powder material in an additive manufacturing process may including treating of the recycled powder, such as by blending with virgin material and/or treating the recycled powder to change its characteristics as described in embodiments herein.

According to the embodiments herein, abrasive articles may be created that have a controlled difference in surface features (e.g., Sdr, etc.) between two surfaces, notably two different exterior surfaces of the abrasive articles. Research into the process variables that may be used to control difference in such surface features are complex and not predictable. Certain surface features, such as the difference in Sdr are understood to be related to build direction and orientation of the body during the forming process. Accordingly, the empirical data generated demonstrates that it is possible to engineer abrasive articles having selective surface features on various surfaces by controlling the build direction and build parameters. Such surface features are thought to be technically beneficial with respect to improved abrasive performance and/or anchoring of the abrasive articles with a bond system or other component for formation of a fixed abrasive article.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include a range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A plurality of abrasive articles made via additive manufacturing, wherein the plurality of abrasive articles comprises a powder blend including virgin raw material powder and recycled raw material powder comprising recycled abrasive particles and recycled precursor bond material, wherein the recycled abrasive particles comprise one or more materials oxides, carbides, nitrides, borides, and diamonds, and the recycled precursor bond material comprises oxides, wherein the recycled raw material powder is not greater than 95 wt % of a total weight of the powder blend, and wherein the plurality of abrasive articles comprises a batch flexural strength standard deviation of less than 0.25 MPa.

2. The plurality of abrasive articles of claim 1, wherein plurality of abrasive articles includes an Archimedes batch density standard deviation of less than 0.03 g/cc.

3. The plurality of abrasive articles of claim 1, wherein each abrasive article of the plurality of abrasive articles comprises a body having at least one of:
   1) A microstructure Feature greater than 1;
   2) A first surface having a first developed interfacial area ratio (Sdr1) and a second surface having a second developed interfacial area ratio (Sdr2), wherein the difference between Sdr1 and Sdr2 is not greater than 25%;
   3) An exterior surface having a first developed interfacial area ratio (Sdr) of at least 40%;
   4) Multiple layers of bond material and abrasives bonded to each other; or
   5) any combination of 1), 2), 3), or 4).

4. The plurality of abrasive articles of claim 1, wherein the recycled raw material powder comprises a different particle size distribution, relative humidity, chemistry, flow characteristics, or any combination thereof, as compared to the virgin raw material powder.

5. The plurality of abrasive articles of claim 1, wherein the abrasive article comprises a Linear Feature Factor of at least 0.320 cm and less than 2.54 cm.

6. The plurality of abrasive articles of claim 1, wherein the batch of abrasive articles has a batch flexural strength standard deviation of less than 0.24 MPa and at least 0.01 MPa.

7. The plurality of abrasive articles of claim 6, wherein the batch of abrasive articles has an Archimedes density standard deviation of less than 0.029 g/cc and at least 0.001 g/cc.

8. The plurality of abrasive articles of claim 1, wherein the batch of abrasive articles has a batch volume standard deviation of at least 1 mm$^3$ and less than 35 mm$^3$.

9. The plurality of abrasive articles of claim 1, wherein the batch of abrasive articles has a batch porosity standard deviation of less than 0.8 vol % and at least 0.001 vol %.

10. The plurality of abrasive articles of claim 1, wherein an average batch flexural strength is at least 0.08 MPa and not greater than 1.0 MPa.

11. The plurality of abrasive articles of claim 1, wherein the plurality of abrasive articles comprises at least one of:
    a) a batch dimensional variation-L is at least 0.001% and not greater than 0.5% of the average length as measured by (batch length standard deviation/average batch length)×100%;
    b) a batch dimensional variation-W is less than 1.2% of the average width as measured by (batch width standard deviation/average batch width)×100%;
    c) a normalized batch dimensional variation-T is less than 9% as measured by (batch thickness standard deviation/average batch thickness)×100%; or
    d) any combination of a, b, or c.

12. The plurality of abrasive article of claim 1, comprising at least 5 wt % of the recycled raw material powder for the total weight of the recycled raw material powder and the virgin powder.

13. The plurality of abrasive articles of claim 1, comprising at least 10 wt % and no greater than 90 wt % of the recycled raw material powder for the total weight of the recycled raw material powder and the virgin raw material powder.

14. The plurality of abrasive articles of claim 13, comprising no greater than 85 wt % of the recycled raw material powder for the total weight of the recycled raw material powder and the virgin raw material powder.

15. The plurality of abrasive articles of claim 1, wherein the plurality of abrasive articles comprises:
    a) an Archimedes density standard deviation of less than 0.029 g/cc and at least 0.001 g/cc; and
    b) a batch flexural strength standard deviation of less than 0.24 MPa and at least 0.01 MPa.

16. The plurality of abrasive articles of claim 1, wherein the virgin raw material powder comprises abrasive particles and precursor bond material.

17. The plurality of abrasive articles of claim 16, wherein the articles comprise a first particle size distribution and the bond precursor material comprise a second particle size distribution different than the first particle size distribution.

18. The plurality of abrasive articles of claim 1, wherein the recycled abrasive particles comprise a first particle size distribution and the recycled bond precursor material comprise a second particle size distribution different than the first particle size distribution.

19. The plurality of abrasive articles of claim 1, wherein the plurality of abrasive articles comprises green body abrasive articles, wherein each green body of the green body abrasive articles comprises at least 1 vol % and not greater than 90 vol % of abrasive particles and at least 1 vol % and not greater than 90 vol % of bond precursor material for a volume of each green body.

20. The plurality of abrasive articles of claim 1, further comprising at least 0.1 wt % organic material within the recycled raw material powder.

* * * * *